(12) United States Patent
Uchida et al.

(10) Patent No.: US 9,939,127 B2
(45) Date of Patent: *Apr. 10, 2018

(54) ILLUMINATION DEVICE

(71) Applicants: Sharp Kabushiki Kaisha, Osaka-shi, Osaka (JP); TOHOKU UNIVERSITY, Sendai-shi, Miyagi (JP)

(72) Inventors: Tatsuo Uchida, Sendai (JP); Yoshito Suzuki, Sendai (JP); Tohru Kawakami, Sendai (JP); Takahiro Ishinabe, Sendai (JP); Katsunori Ehara, Sendai (JP); Yoshihiro Hashimoto, Osaka (JP); Toshiki Matsuoka, Osaka (JP); Kozo Nakamura, Osaka (JP); Yasuhisa Itoh, Osaka (JP); Yoshitaka Yamamoto, Osaka (JP); Yutaka Ishii, Osaka (JP); David Montgomery, Oxford (GB)

(73) Assignees: Sharp Kabushiki Kaisha, Sakai (JP); TOHOKU UNIVERSITY, Miyagi (JP)

( * ) Notice: Subject to any disclaimer, the term of this patent is extended or adjusted under 35 U.S.C. 154(b) by 616 days.

This patent is subject to a terminal disclaimer.

(21) Appl. No.: 14/417,254

(22) PCT Filed: Jul. 26, 2013

(86) PCT No.: PCT/JP2013/070379
§ 371 (c)(1),
(2) Date: Jan. 26, 2015

(87) PCT Pub. No.: WO2014/017652
PCT Pub. Date: Jan. 30, 2014

(65) Prior Publication Data
US 2015/0211709 A1 Jul. 30, 2015

(30) Foreign Application Priority Data

Jul. 27, 2012 (JP) .................................. 2012-167663
Jul. 2, 2013 (WO) .................. PCT/JP2013/068124

(51) Int. Cl.
*F21V 5/04* (2006.01)
*F21K 99/00* (2016.01)
(Continued)

(52) U.S. Cl.
CPC .................. *F21V 5/04* (2013.01); *F21K 9/60* (2016.08); *F21V 5/008* (2013.01);
(Continued)

(58) Field of Classification Search
CPC . F21V 5/008; F21V 5/04; F21V 5/048; G02B 19/0014; G02B 19/0061; F21K 9/60
See application file for complete search history.

(56) References Cited

U.S. PATENT DOCUMENTS 6,478,453 B2 * 11/2002 Lammers ................ F21S 6/002
353/23
7,083,299 B2 * 8/2006 Chapman ................ F21L 4/027
362/188
(Continued)

FOREIGN PATENT DOCUMENTS

JP 2010-085493 A 4/2010
WO 2008/016908 A2 2/2008

OTHER PUBLICATIONS

Official Communication issued in International Patent Application No. PCT/JP2013/070379, dated Sep. 17, 2013.

*Primary Examiner* — Alan Cariaso
(74) *Attorney, Agent, or Firm* — Keating & Bennett, LLP

(57) ABSTRACT

A lighting device (100) includes: a surface light source (1); a first lens (L1) having a first focal point (F1), the first lens being provided on the light exit surface side of the surface light source; and a second lens (L2) having a second focal point (F2), the second lens being provided on a light exit surface side of the first lens, the surface light source, the first lens, and the second lens being configured such that a first virtual image (I1) is formed by the first lens and a second virtual image (I2) is formed by the second lens, wherein the first virtual image (I1) is formed between the second focal point (F2) and the first lens, and the second focal point (F2) is on a side opposite to the light source side relative to a predetermined focal position f'.

20 Claims, 40 Drawing Sheets

(51) Int. Cl.
*G02B 19/00* (2006.01)
*F21V 5/00* (2018.01)
*F21K 9/60* (2016.01)
*F21Y 115/10* (2016.01)

(52) U.S. Cl.
CPC ..... *G02B 19/0014* (2013.01); *G02B 19/0061* (2013.01); *F21Y 2115/10* (2016.08)

(56) References Cited

U.S. PATENT DOCUMENTS

| | | | |
|---|---|---|---|
| 7,175,299 B2 | 2/2007 | Uke et al. | |
| 7,798,678 B2 | 9/2010 | Destain | |
| 8,047,684 B2 * | 11/2011 | Chang | F21V 5/008 |
| | | | 362/268 |
| 8,292,472 B2 * | 10/2012 | Huang | F21V 5/04 |
| | | | 362/327 |
| 8,632,216 B2 * | 1/2014 | Duong | H01L 33/58 |
| | | | 362/244 |
| 9,217,552 B2 * | 12/2015 | Uchida | G02B 19/0014 |
| 2006/0139580 A1 * | 6/2006 | Conner | G02B 27/0994 |
| | | | 353/98 |
| 2012/0300467 A1 * | 11/2012 | Chen | G02B 19/0009 |
| | | | 362/311.01 |

* cited by examiner

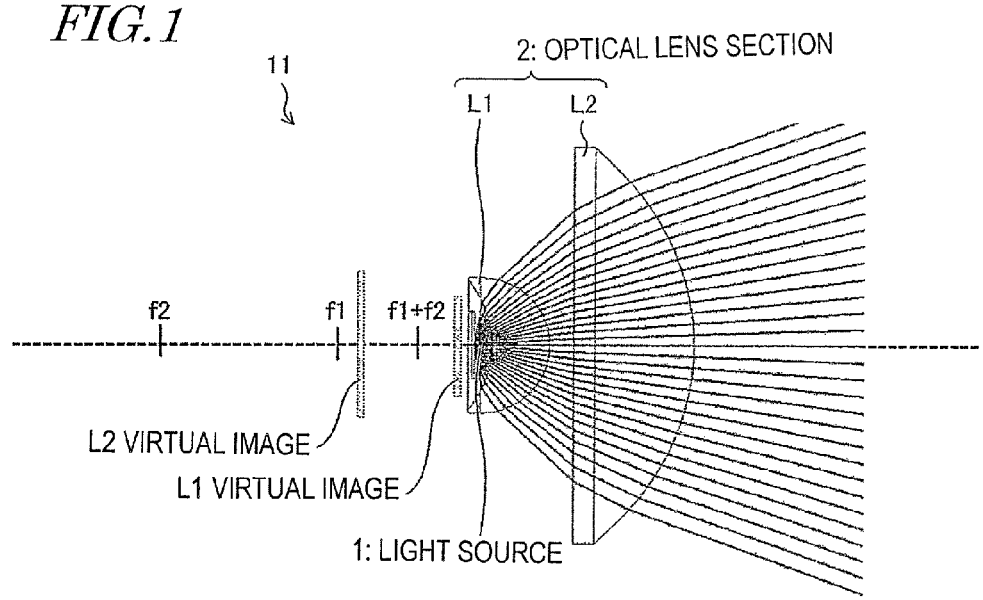
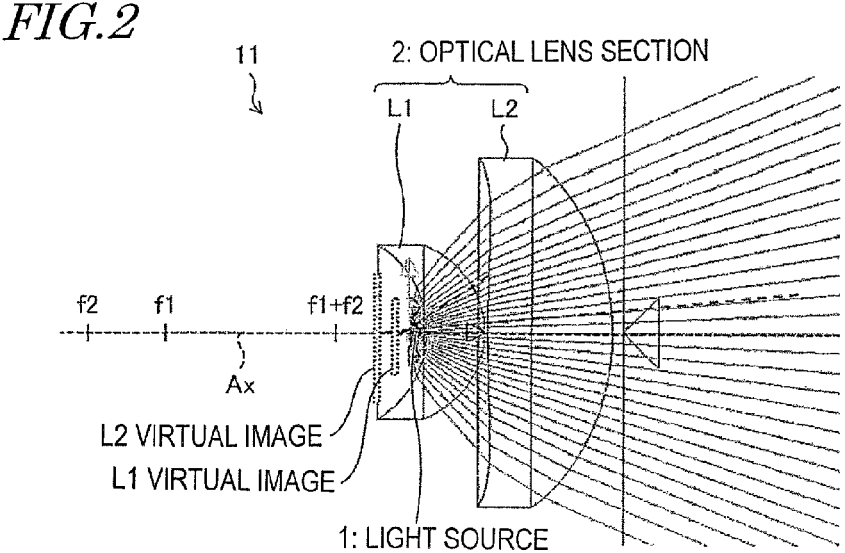

FIG.4
(a)
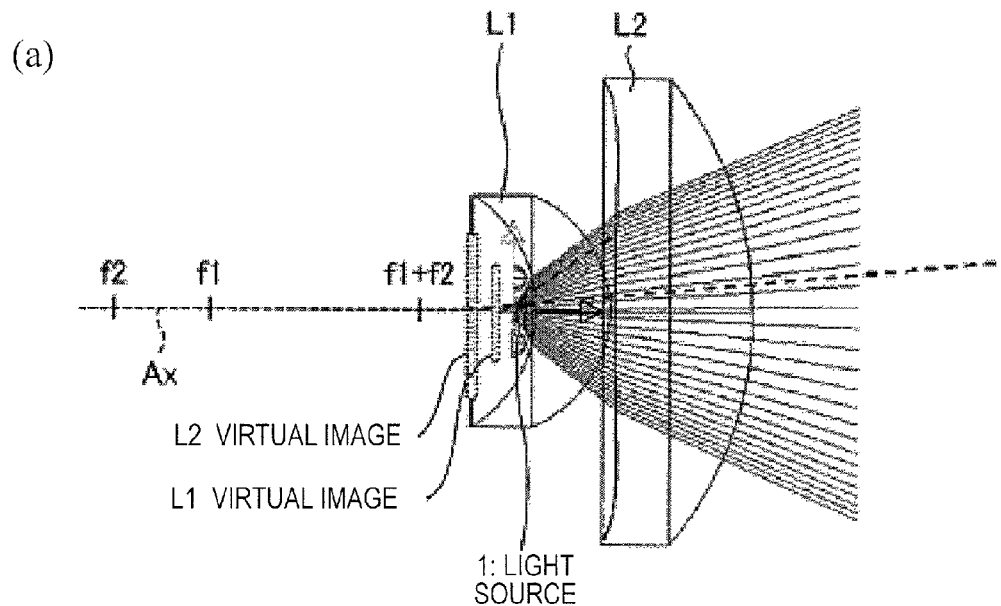
(b)
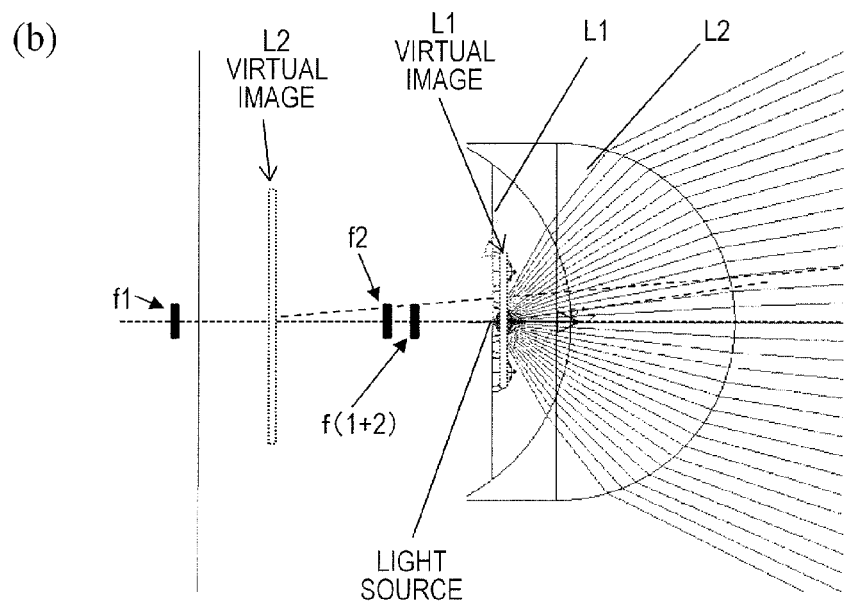

FIG.5
(a)
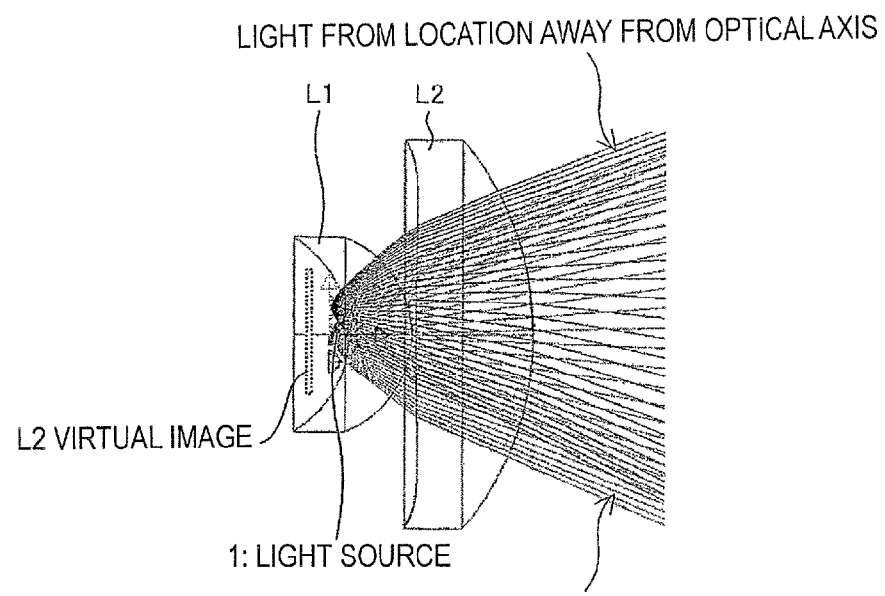
(b)
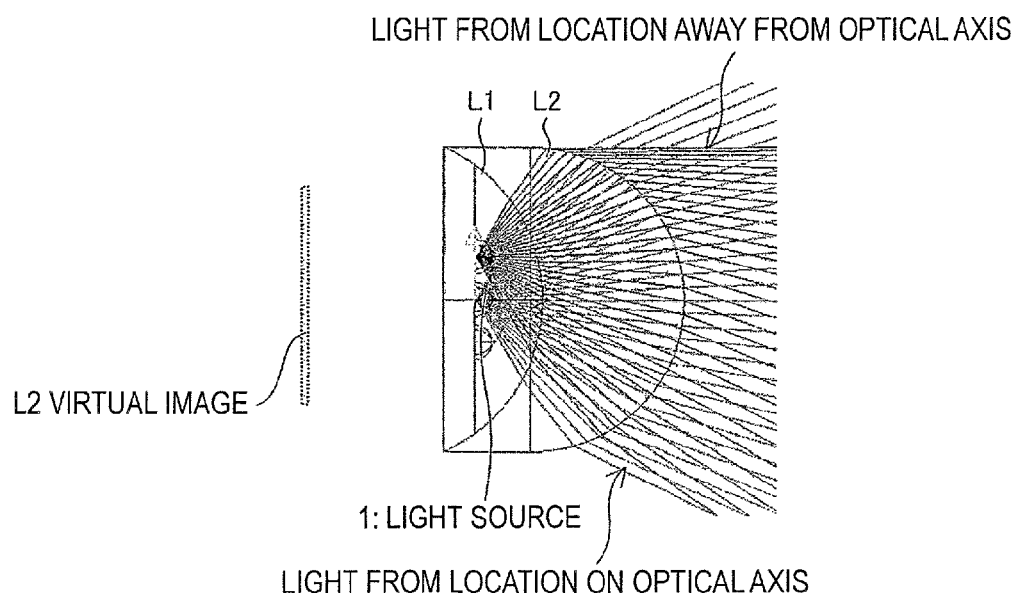

FIG.9
(a)
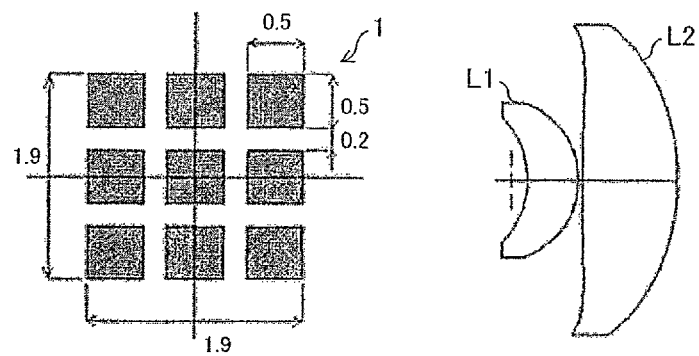
(b)
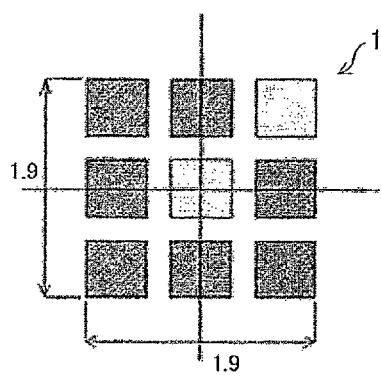
(c)
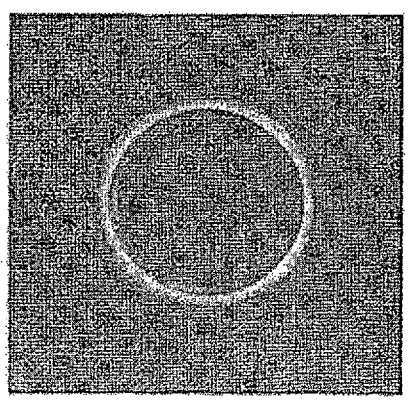

FIG.10
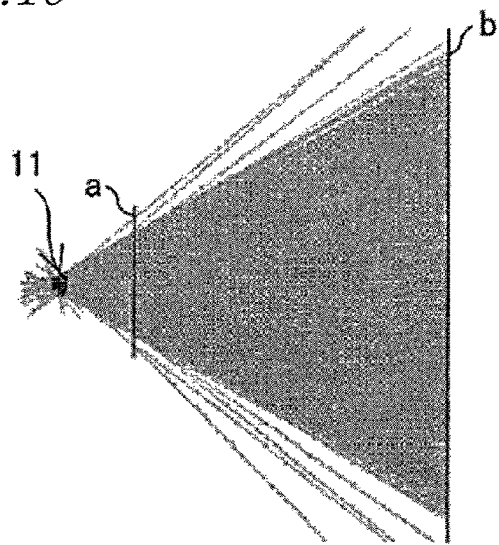
FIG.11
(a) TWO-DIMENSIONAL ILLUMINANCE DISTRIBUTION AT 1 M AHEAD
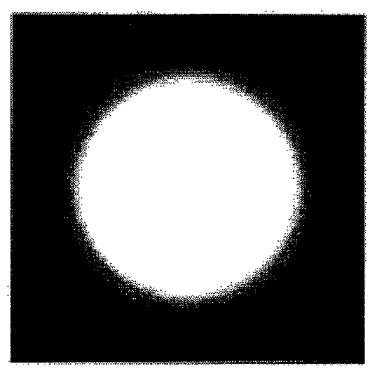 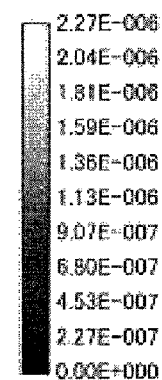
(b) TWO-DIMENSIONAL ILLUMINANCE DISTRIBUTION AT 5 M AHEAD
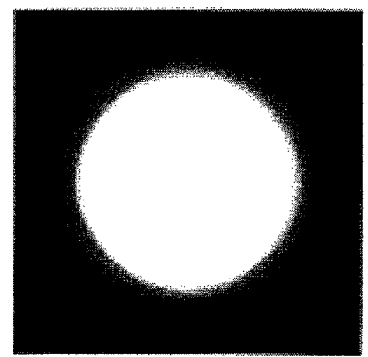 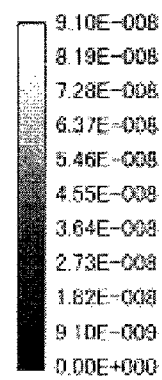

FIG.12
(a)
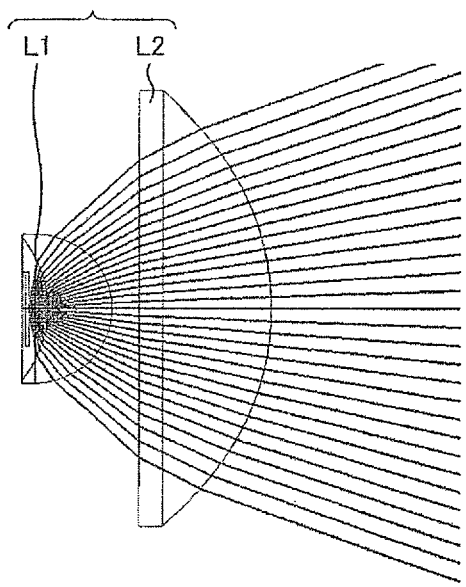
(b)
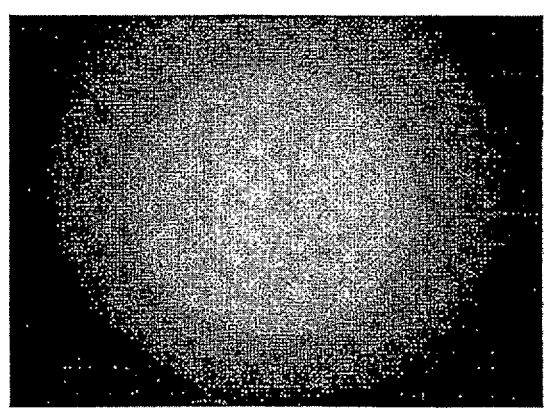

FIG.13
(a)
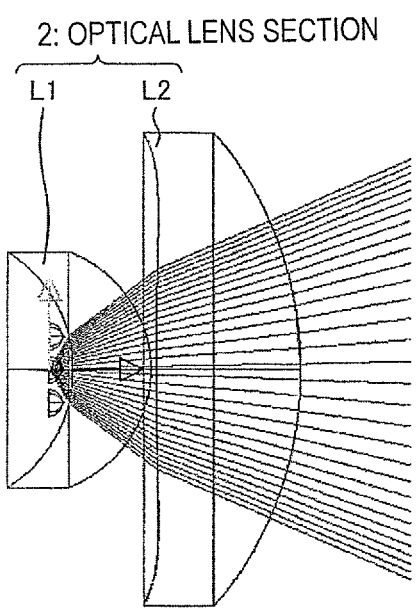
(b)
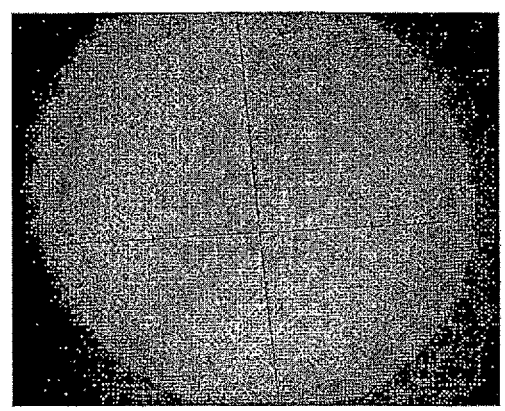

FIG.18
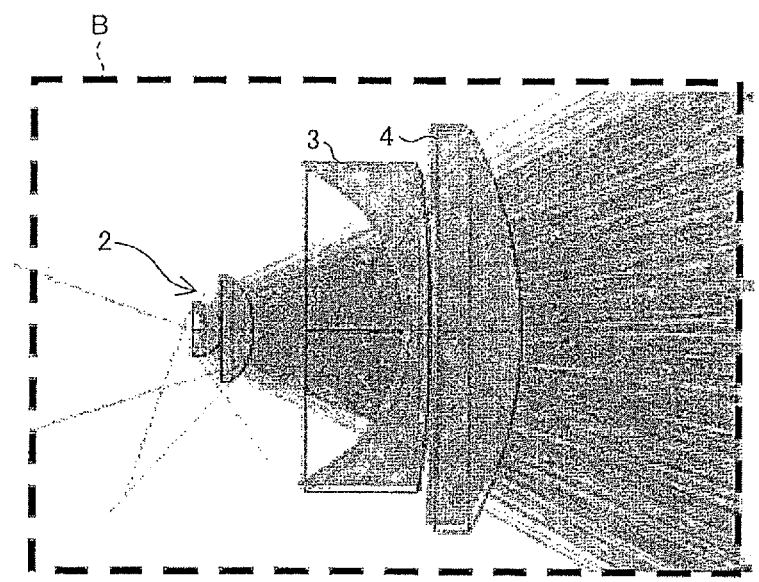
FIG.19
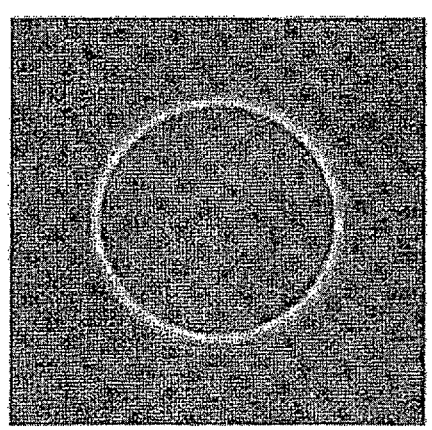 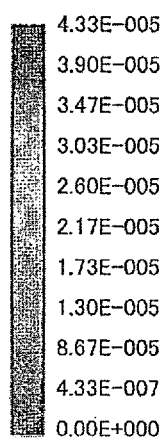

FIG.29
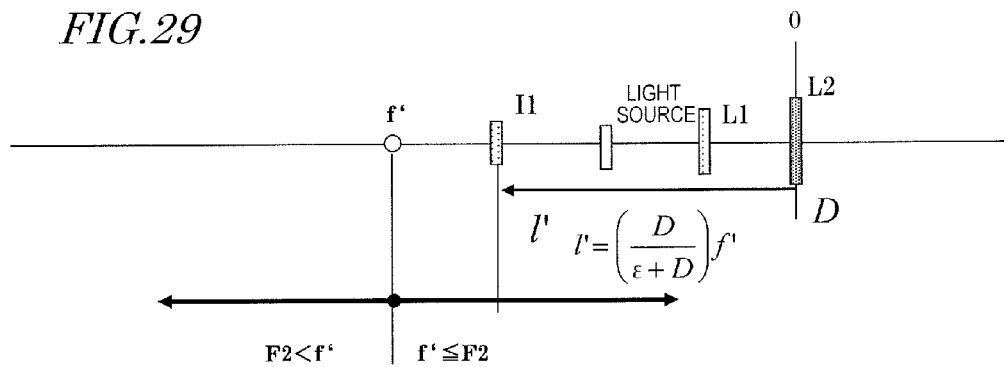
FIG.30
(a)
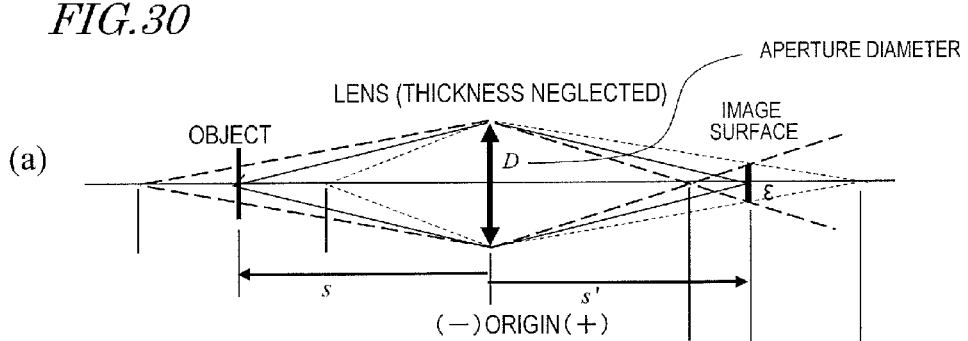
(b)
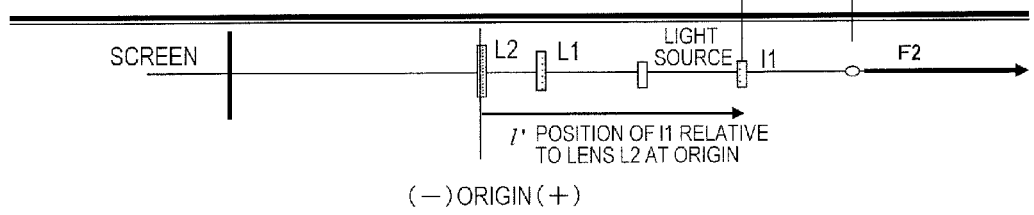

FIG.37
(a)
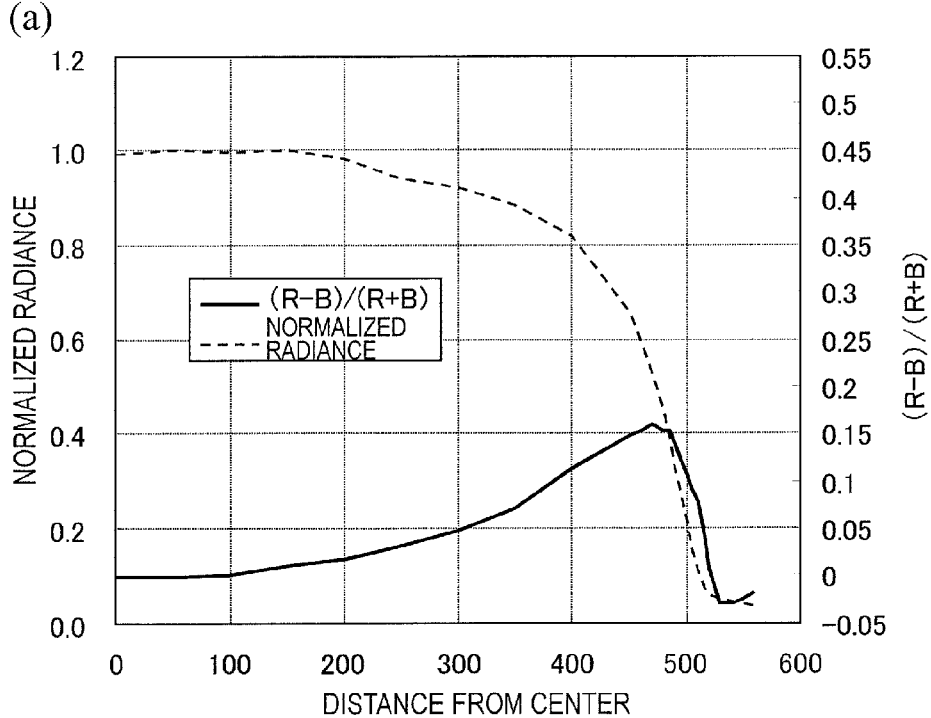
(b)
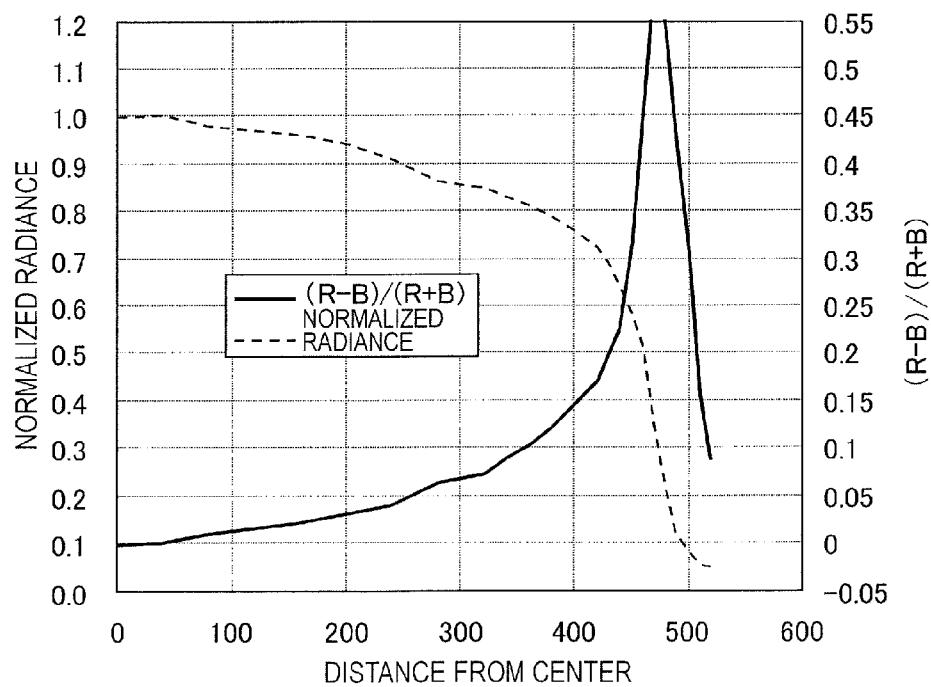

FIG.42
(a) 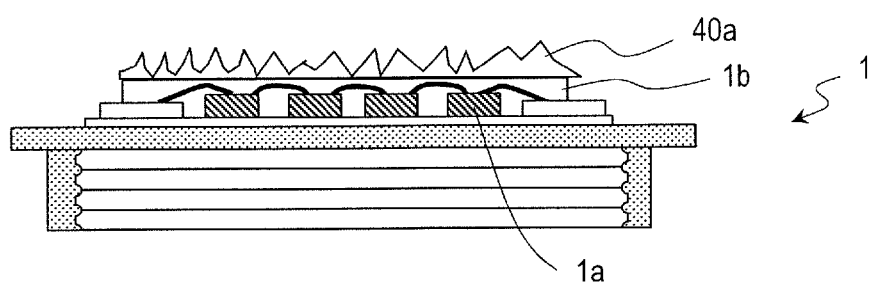
(b) 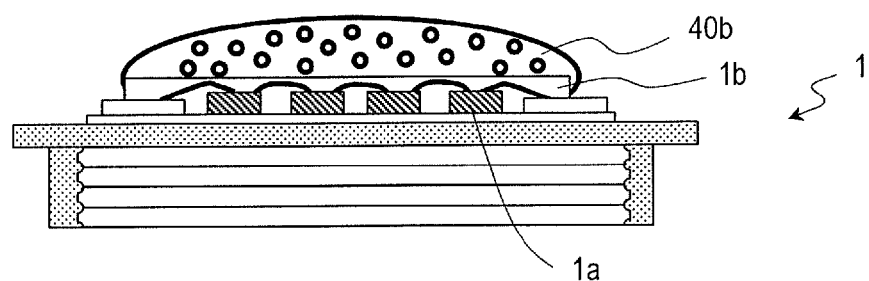
(c) 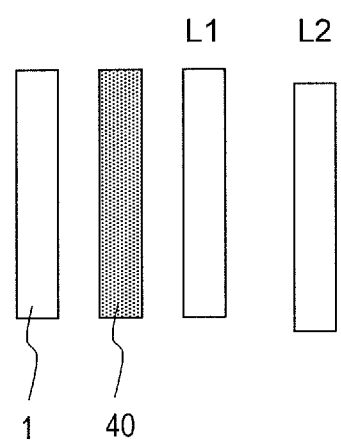

FIG.43
(a) 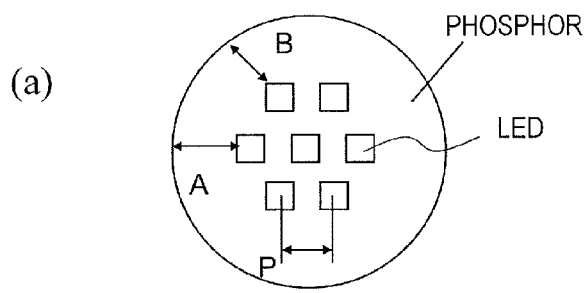
(b) 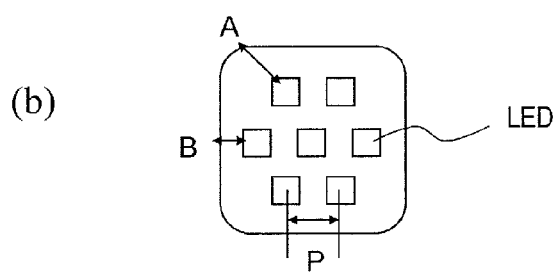
(c) 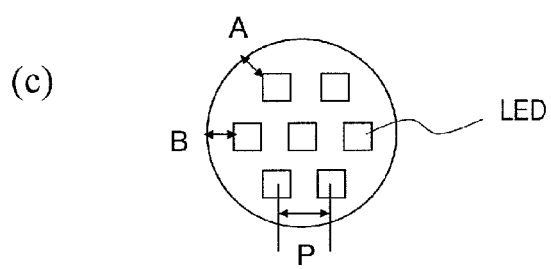
(d) 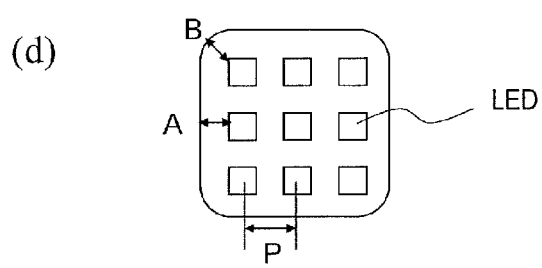
(e) 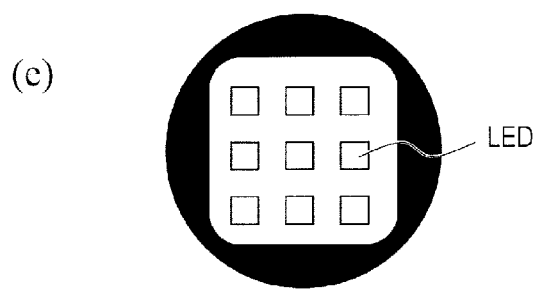

FIG.53
(a) 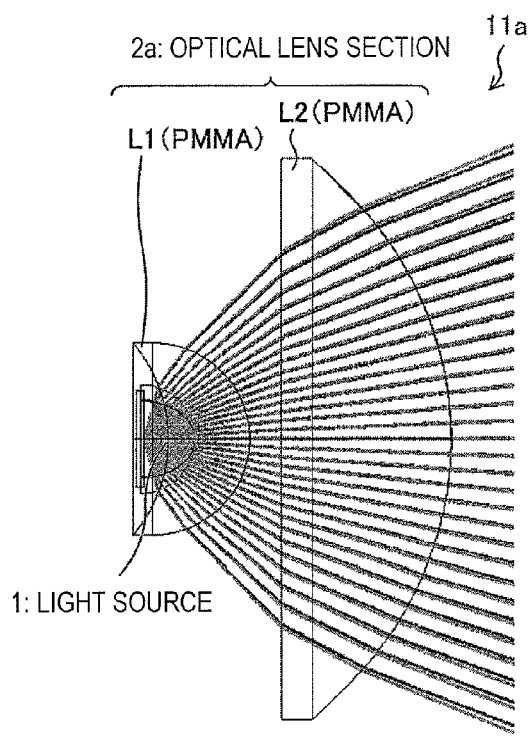
(b) 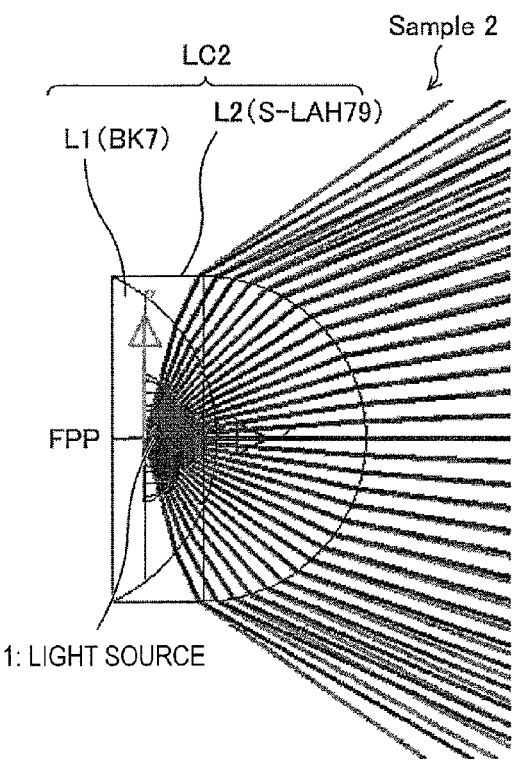
(c)
|  | REFRACTIVE INDEX | ABBE NUMBER |
|---|---|---|
| S-LAH79 | 2.0 | 28.3 |
| BK7 | 1.52 | 64.7 |
| PMMA (ACRYLIC) | 1.49 | 58 |

FIG.54
(a)
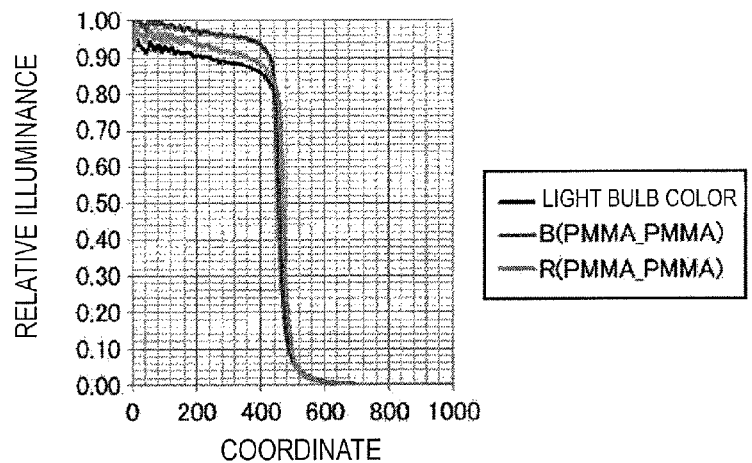
(b)
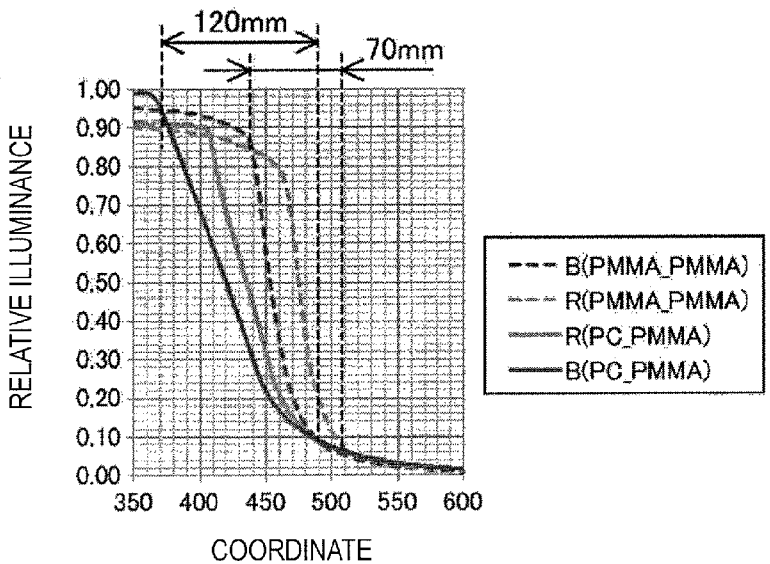
(c)
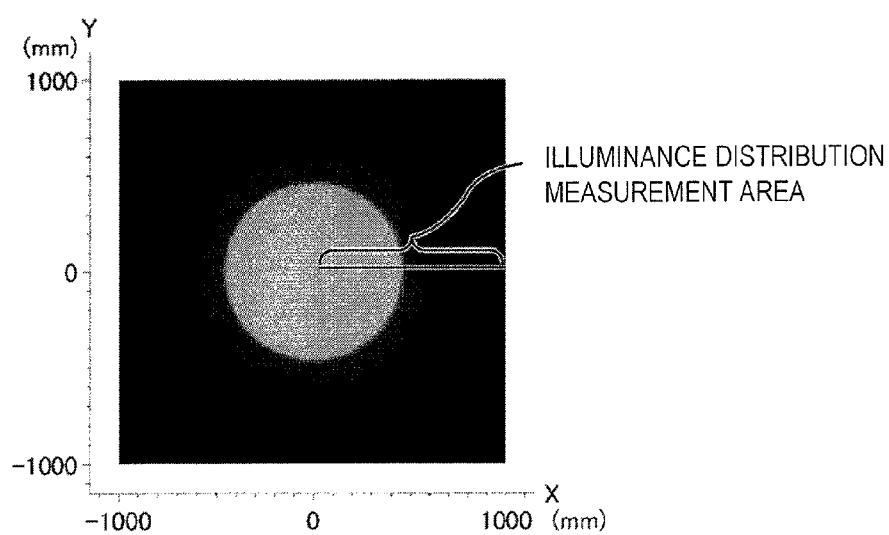

(a)

| MATERIAL | REFRACTIVE INDEX | ABBE NUMBER |
|---|---|---|
| LAFN8 | 1.74 | 41.6 |
| LAF2 | 1.74 | 44.6 |
| LAF24 | 1.76 | 47.8 |
| LAK10 | 1.72 | 50.4 |
| LAKN16 | 1.74 | 51.7 |
| LAKN19 | 1.76 | 53.1 |
| LAKN18 | 1.73 | 54.2 |
| LAKL12 | 1.68 | 54.9 |
| LAK23 | 1.67 | 57.4 |
| LAKN7 | 1.65 | 58.5 |

(b)

FIG.57
(a)
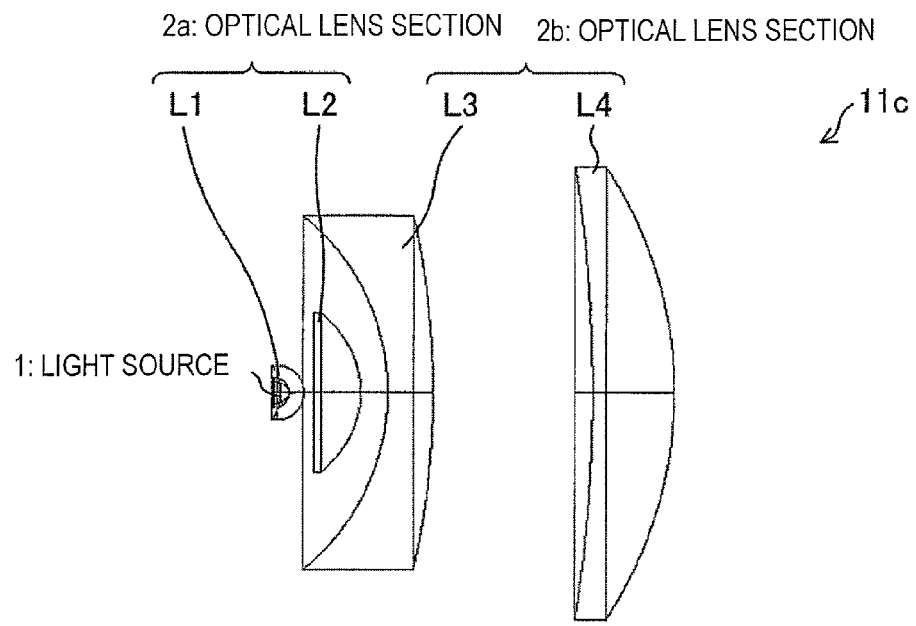
(b)
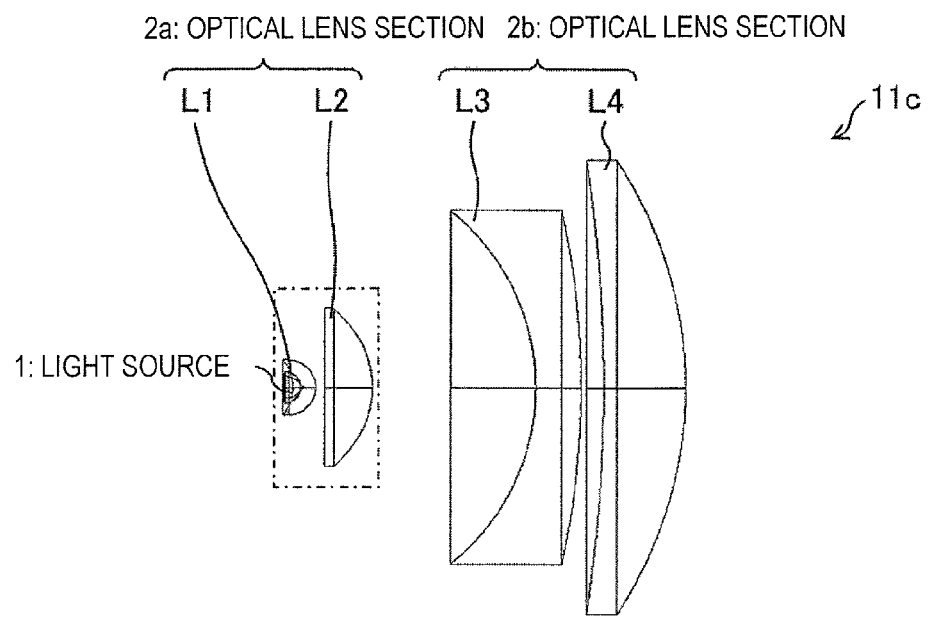

FIG.58
(a)
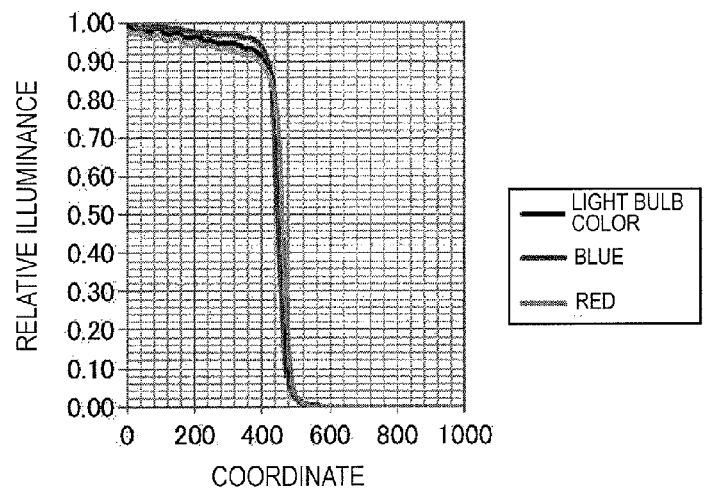
(b)
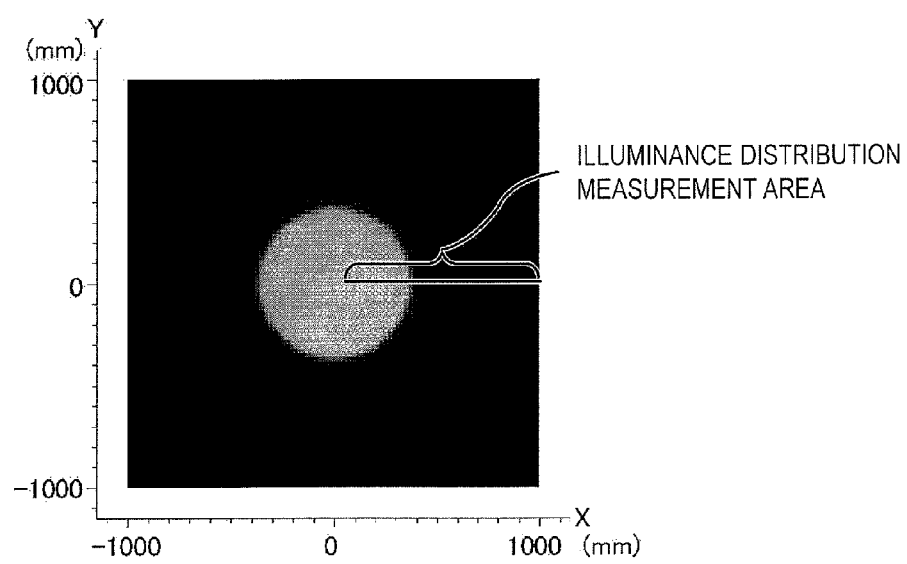

FIG.59
(a)
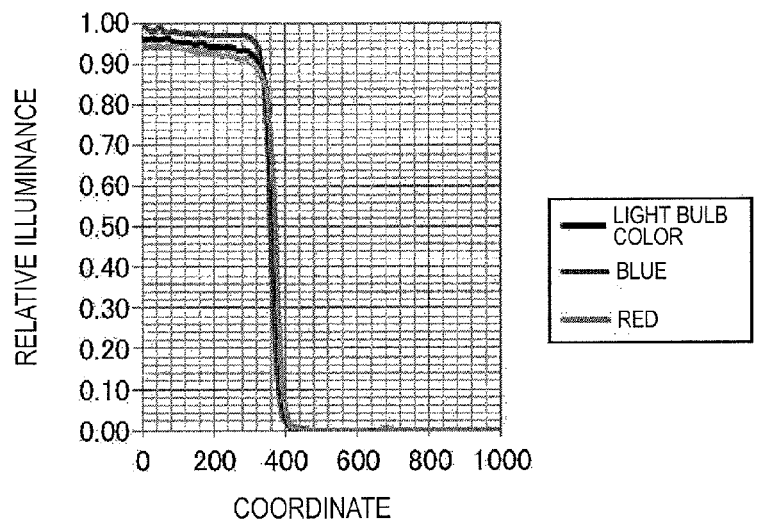
(b)
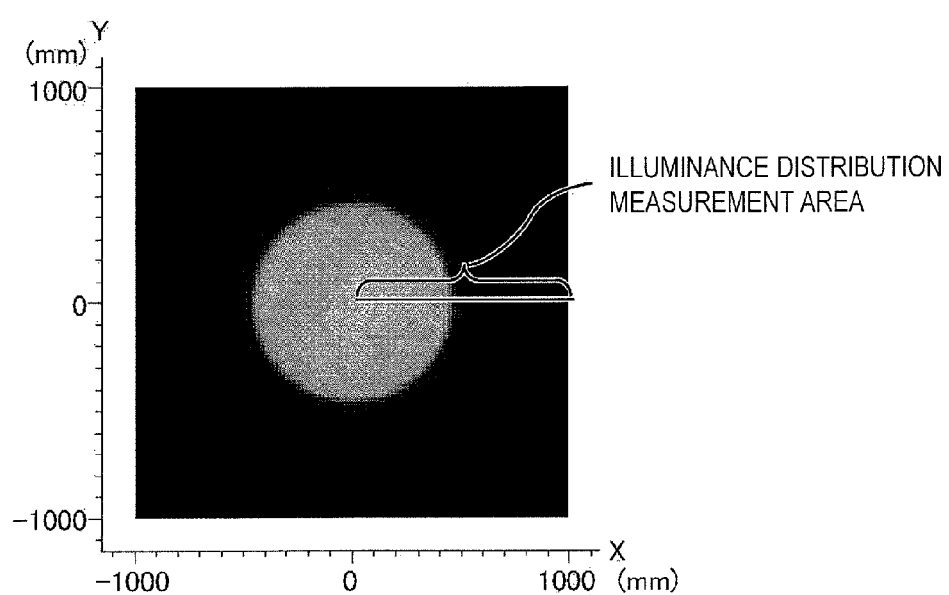

FIG.61
(a)
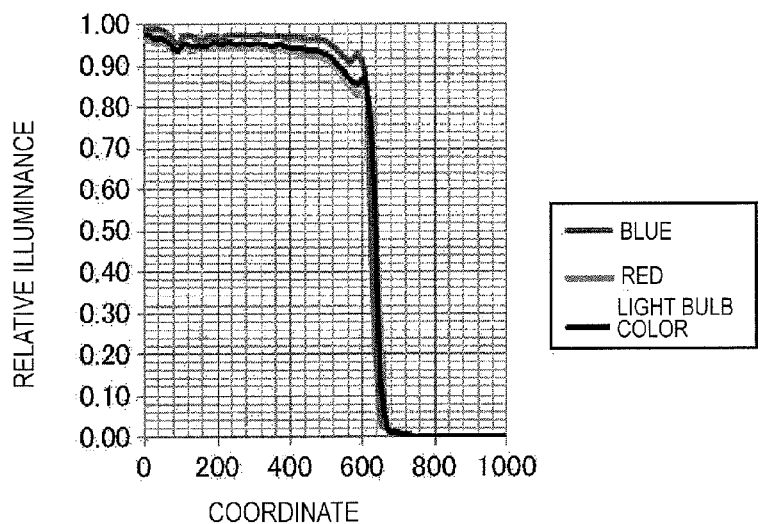
(b)
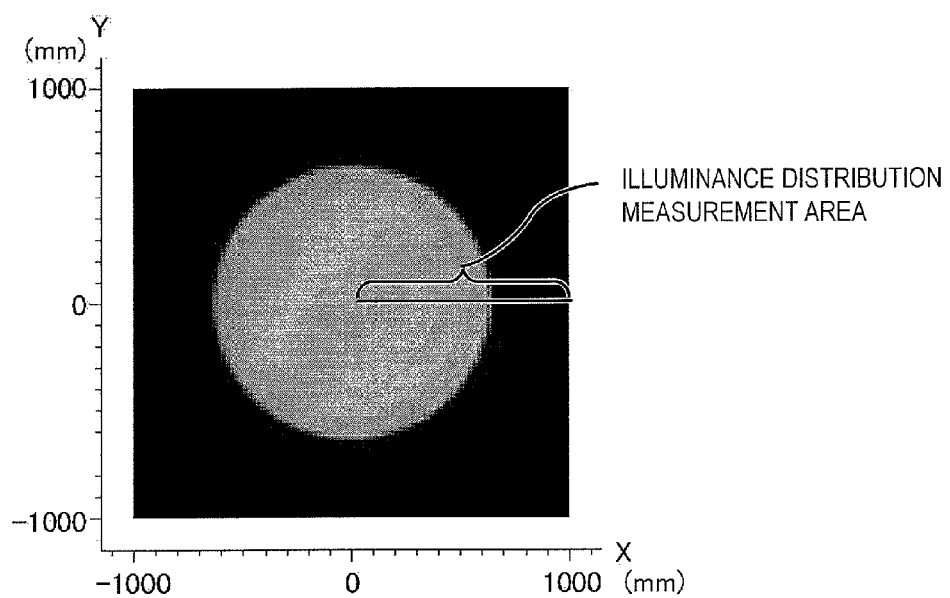

ILLUMINATION DEVICE

TECHNICAL FIELD

The present invention relates to a lighting device which includes a surface light source.

BACKGROUND ART

A known example of common lighting devices is a lighting device 900 shown in FIG. 62.

The lighting device 900 has a collimating optical system LC which includes a meniscus lens L1 and an aspherical lens L2 and is configured such that a LED light source 10 is placed at the focal position of this optical system as shown in FIG. 62.

Here, light emitted from a point on the optical axis AX of the LED light source 10 is collimated light which is parallel to the optical axis AX as shown in FIG. 62. On the other hand, since the LED light source 10 is a surface light source rather than a point light source, there is light emitted from a location away from the optical axis AX. The light emitted from a location away from the optical axis AX travels in a direction which is different from the optical axis AX and therefore reaches a place which is different from that the light emitted from a point on the optical axis AX reaches. Thus, there is a problem that illuminance uniformity is not achieved across the illuminated surface.

Moreover, since the meniscus lens L1 and the LED light source 10 are distant from each other, there is a probability that light emitted from the LED light source 10 at a large angle is not incident upon the meniscus lens L1.

Patent Documents 1 and 2 disclose light sources which can utilize almost all of light emitted from a LED emitter.

The light source disclosed in Patent Document 1 has a LED emitter, an inner lens enclosing the LED emitter, and a meniscus lens covering these components. The light source disclosed in Patent Document 2 has a LED emitter and a meniscus lens covering the LED emitter with a gap provided therebetween. In these light sources, a virtual image $Vl_1$ formed by an inner surface of the meniscus lens is produced at a position outer than the LED emitter (on the light exit surface side of the lens).

As described above, when the virtual image $Vl_1$ formed by the inner surface of the meniscus lens is produced at a position outer than the LED emitter, almost all of light emitted from the LED emitter is incident upon the meniscus lens. This improves the light utilization efficiency of the light emitted from the LED emitter.

CITATION LIST

Patent Literature

Patent Document 1: U.S. Pat. No. 7,798,678
Patent Document 2: WO 2008/016908

SUMMARY OF INVENTION

Technical Problem

However, in the light sources of Patent Documents 1 and 2, achieving the uniformity of the illuminated surface is not considered although it is possible to utilize almost all of light emitted from the LED emitter as described above. For example, there is a probability that light emitted from a location away from the optical axis of the lens illuminates a region which is different from that the light emitted from a location on the optical axis illuminates, so that the uniformity of the illuminated surface cannot be achieved. In some cases, unevenness in intensity which can occur across the light exit surface of the surface light source is reflected in the illumination region, and accordingly, a nonuniform illumination region is formed.

The present invention was conceived for the purpose of solving the above problems. An object of the present invention is to provide a lighting device in which the uniformity in intensity of projected light is high.

Solution to Problem

A lighting device according to an embodiment of the present invention is a lighting device including: a surface light source having a light exit surface; a first lens having a first focal point, the first lens being provided on the light exit surface side of the surface light source; and a second lens having a second focal point, the second lens being provided on a light exit surface side of the first lens, the surface light source, the first lens, and the second lens being configured such that a first virtual image is formed by the first lens and a second virtual image is formed by the second lens, wherein the first virtual image is formed between the second focal point and the first lens, the second focal point is on a side opposite to the surface light source relative to a position which is distant from a principal point of the second lens by a predetermined focal length f', and the predetermined focal length f' satisfies $l'=(D/(\epsilon+D))\cdot f'$ where l' is the distance between the principal point of the second lens and a position of the first virtual image, D is an effective diameter of the second lens, and $\epsilon$ is a light source size factor which is either one of a size of the light exit surface of the surface light source or an arrangement pitch of a plurality of light-emitting elements included in the surface light source.

In one embodiment, the first virtual image formed by the first lens is present on the surface light source side relative to a focal point of the second lens.

In one embodiment, the first virtual image is formed between the first focal point and the first lens, and the second virtual image is formed between the second focal point and the second lens.

In one embodiment, the first virtual image and the second virtual image are formed between an effective focal point of the first lens and the second lens and the first lens.

In one embodiment, the lighting device further includes a second optical system provided on a light exit side of a first optical system that includes the first lens and the second lens.

In one embodiment, the second optical system includes a concave lens which is the closest to the first optical system and a convex lens which is next to the concave lens and is the second closest to the first optical system.

In one embodiment, the light exit surface of the first lens and a light entry surface of the second lens are joined together.

In one embodiment, the first lens and the second lens are formed of a resin by integral molding.

In one embodiment, a lens surface of the first lens facing on the surface light source is a concave curved surface, and a width h of a range of a position at which the light exit surface can be placed is represented by the following formula: $h \leq 2\sqrt{(d(2R-d))}$ where d is a distance along an optical axis from the light exit surface of the surface light source to the concave curved surface of the first lens, and R is a radius of curvature of the concave curved surface of the first lens.

In one embodiment, a<f/2 is satisfied where a is a distance from a principal point of an optical lens section including the first lens and the second lens to the light exit surface, and f is a distance from the principal point to a focal position of the optical lens section.

In one embodiment, the surface light source includes a plurality of light-emitting elements which are arranged so as to be separated from one another.

In one embodiment, the first lens and the second lens are made of a material whose Abbe number is not less than 54.

In one embodiment, the first lens and the second lens are made of a material which has heat resistance.

In one embodiment, at least one of the first lens and the second lens is an achromatic lens.

In one embodiment, the achromatic lens is formed by a concave lens and a convex lens which is in close contact with the concave lens, and a joint interface at central portions of the concave lens and the convex lens is a flat face.

In one embodiment, the lighting device further includes a light diffusing layer provided between the surface light source and the first lens.

In one embodiment, a haze value of the light diffusing layer is 5% to 50%.

In one embodiment, the surface light source includes a plurality of light-emitting elements which are arranged at pitch P and a phosphor which is arranged so as to overlap the plurality of light-emitting elements, and A≤P is satisfied where A is a distance between an edge of the phosphor and one of the light-emitting elements which is closest to the edge of the phosphor.

In one embodiment, the lighting device further includes a hood which is provided on a light exit side of the second lens so as to block only part of light outgoing from the second lens.

In one embodiment, a distance Lf1+Lf2 along an optical axis from a position of an emission surface of the surface light source to an end of the hood satisfies: Rf/tan θ2<Lf1+Lf2<Rf/tan θ1 where θ1 is a smallest one of angles at which a gradient of an angle-relative illuminance graph is smaller than −0.1, θ2 is a light exit angle at which a stray light ratio is not more than 1%, the stray light ratio being represented by a luminous flux of a stray light region/(a luminous flux of an illumination region+the luminous flux of the stray light region)), and Rf is a radius of the hood.

In one embodiment, an antireflection layer is provided on at least one of a light exit surface and a light entry surface of the first lens and a light exit surface and a light entry surface of the second lens.

In one embodiment, a light absorbing layer is provided on a perimeter edge surface of at least one of the first lens and the second lens.

In one embodiment, the lighting device further includes a casing which has a storage space for containing the surface light source, the first lens, and the second lens, wherein a light absorbing layer is provided on at least part of a portion of the casing which defines an outside of the storage space.

In one embodiment, any of the above-described lighting devices is used as a headlight of a vehicle.

In one embodiment, a stray light ratio is not more than 3%, the stray light ratio being represented by a luminous flux of a stray light region/(a luminous flux of an illumination region+the luminous flux of the stray light region)) where the illumination region is a region inside an intersection of a tangent of a point at which a relative illuminance is 0.10 and an axis which represents a light projection angle in a light projection angle-relative illuminance graph that is obtained when light is projected onto a screen, and the stray light region is a region outside the illumination region.

A lighting device according to an embodiment of the present invention enables light emitted from the center of the light emission section which is on the optical axis of the optical lens section and light emitted from a location away from the center of the light emission section to outgo from the optical lens section with generally equal angular distributions. Therefore, both the light emitted from the center of the light emission section and the light emitted from a location away from the center of the light emission section can equally illuminate the entirety of a predetermined illumination region, so that the uniformity of the illumination region can be significantly improved.

Furthermore, since the light emitted from the center of the light emission section and the light emitted from a location away from the center of the light emission section can outgo from the optical lens section with generally equal angular distributions, substantially no part of the light fails to reach the optical lens section, and as a result, high light utilization efficiency can be achieved.

Thus, it is possible to utilize almost all of the light emitted from the light emission section, and high light utilization efficiency is achieved, while light emitted from different locations of the light emission section can be projected onto generally equal illumination regions, leading to a distinguishing effect that the uniformity of the illumination region can be significantly improved.

To achieve an effect which is generally equal to the above, for example, in a lighting device where a lens section formed by a plurality of optical lenses is provided on a light projection surface side of the light emission section, an effective focal position determined by totalizing the focal points of the respective optical lenses that are constituents of the optical lens section may be present on a side opposite to surfaces of all the virtual images facing on the light emission section relative to the respective virtual images formed by the optical lenses.

The above-described configuration also enables the virtual image formed by each lens to occur at a position near the light emission section. Therefore, it is possible to utilize almost all of the light emitted from the light emission section, and high light utilization efficiency is achieved, while light emitted from different locations of the light emission section can be projected onto generally equal illumination regions, leading to a distinguishing effect that the uniformity of the illumination region can be significantly improved.

Furthermore, according to the above-described configuration, since an effective focal position determined by totalizing the focal points of the respective optical lenses that are constituents of the optical lens section is present on a side opposite to surfaces of all the virtual images facing on the light emission section relative to the respective virtual images formed by the optical lenses, the virtual images formed by the respective lenses can occur at positions which are still closer to the light emission section. Therefore, the angle of the light outgoing from the optical lens section can be expanded, and thus, the uniformity of a larger illumination region can be significantly improved.

Where the above-described optical lens section is the first optical lens section, the second optical lens section may be provided on the light exit side of the first optical lens section.

According to the above-described configuration, the light exit angle of the light outgoing from the first optical lens section can be changed by the second optical lens section. That is, the light exit angle of the light outgoing from the first optical lens section can be narrowed or expanded by changing the optical characteristics of the second optical lens section.

Thus, the area of the light illumination region can be freely changed by controlling the design of the second optical lens section.

The above-described second optical lens section may be configured such that a lens which is the closest to the first optical lens section is a concave lens, and a lens which is the second closest to the first optical lens section is a convex lens.

Such a combination of a concave lens and a convex lens enables correction of the aberrations occurring in the respective lenses, and therefore, the characteristics of light outgoing from the first optical lens section can be kept undamaged.

Thus, the light exit angle of the light outgoing from the first optical lens section is adjustable, and it is possible to utilize almost all of the light emitted from the light emission section, so that high light utilization efficiency is achieved. Meanwhile, light emitted from different locations of the light emission section can be projected onto generally equal illumination regions, leading to a distinguishing effect that the uniformity of the illumination region can be significantly improved.

In the above-described optical lens section, part of the interface of the above-described respective lenses may be integrally formed.

Since part of the respective lenses that are constituents of the optical lens section is thus integrally formed, alignment of the emission surface of the light emission section and the optical lens section can be easily achieved.

Further, fixing of the light emission section and the optical lens section can also be easily achieved.

Possible methods of forming an integral structure of two lenses include integral molding with the use of a resin and adhesion with the use of an adhesive agent. The two lenses may be formed of a resin by integral molding.

In this case, since the two lenses are formed of a resin by integral molding, the molding cycles in formation of the optical lens section can be reduced from two cycles (in the case of two lenses) to one cycle. Accordingly, the manufacturing cost can be reduced.

Of the lenses that are constituents of the above-described optical lens section, in the first optical lens where a lens surface which is the closest to the light emission section is a concave surface which is concaved against the light emission section, $h \leq 2\sqrt{d(2R-d)}$ may hold where d is the distance from the emission surface of the light emission section to the interface of the first optical lens on the optical axis, R is the radius of curvature of the inner lens of the first optical lens, and h is the arrangement range on the optical axis of the light emission section. Thus, since the arrangement range h of the light emission section is set as described above, all of the light emitted from the light emission section is brought into the first optical lens, so that the light utilization efficiency can be improved.

$a < f/2$ may be satisfied where a is the distance from the principal point of the above-described optical lens section to the emission surface of the light emission section and f is the distance from the principal point of the optical lens section to the focal position.

By thus making the distance a from the principal point of the optical lens section to the emission surface of the light emission section shorter than a half of the distance f from the principal point of the optical lens section to the focal position, the virtual image position can always be relatively close to the optical lens section as compared with the focal position of the optical lens section.

The above-described light emission section may include a plurality of light emitters. In this case, the plurality of light emitters are arranged over the emission surface of the light emission section. Even when the light emitters emit varying amounts of light, the light is projected such that these variations are canceled at the illuminated surface. That is, light emitted from respective ones of the light emitters are projected onto the same illumination region, and therefore, even when the light emitters emit varying amounts of light, this variation is canceled.

Advantageous Effects of Invention

According to a lighting device of an embodiment of the present invention, it is possible to realize a uniform illuminance distribution.

BRIEF DESCRIPTION OF DRAWINGS

FIG. 1 A general configuration diagram of a lighting device according to an embodiment of the present invention.

FIG. 2 A general configuration diagram of a lighting device according to an embodiment of the present invention.

FIG. 4 (a) is a diagram showing a general configuration of the lighting device shown in FIG. 2. (b) is a diagram showing a general configuration of a lighting device of a comparative example.

FIG. 5 (a) is a diagram showing a light ray behavior of the lighting device shown in FIG. 4(a). (b) is a diagram showing a light ray behavior of the lighting device shown in FIG. 3(b).

FIG. 9 (a) is a diagram showing an example where a plurality of minute light-emitting surfaces are arranged. (b) is a diagram showing an example where some of the minute light-emitting surfaces are dark. (c) is a chart showing the illumination intensity distribution in the case of FIG. 9(b).

FIG. 10 A diagram showing the relationship between the lighting device and evaluation planes.

FIG. 11 (a) is a chart showing a two-dimensional illuminance distribution at the evaluation plane a shown in FIG. 10. (b) is a chart showing a two-dimensional illuminance distribution at the evaluation plane b shown in FIG. 10.

FIG. 12 (a) illustrates optical lens conditions under which the lighting device shown in FIG. 1 was actually manufactured. (b) is a chart showing the state of light projection in an illumination region formed when the lighting device shown in FIG. 1 was actually manufactured.

FIG. 13 (a) illustrates optical lens conditions under which the lighting device shown in FIG. 2 was actually manufactured. (b) is a chart showing the state of light projection in an illumination region formed when the lighting device shown in FIG. 2 was actually manufactured.

FIG. 18 An enlarged view of major portion B of the lighting device shown in FIG. 17.

FIG. 19 A chart showing the illumination intensity distribution in the lighting device shown in FIG. 17.

FIG. 29 A diagram showing the positional relationship between the reference focal point f' and the focal point F2 of the second lens.

FIG. 30 (a) is a diagram for illustrating a pan-focus state. (b) is a diagram for illustrating an application to a lighting device.

FIG. 37 (a) is a graph showing the distribution of the BR difference in the lighting device shown in FIG. 36. (b) is a graph showing the distribution of the BR difference in a lighting device of a reference example.

FIG. 42 Diagrams showing a light source of a lighting device of Embodiment 4-2. (a) and (b) show different forms. (c) is a diagram for illustrating an arrangement of a light diffusing layer provided in this embodiment.

FIG. 43 (a) is a diagram showing a light source of a lighting device of a comparative example. (b) to (e) are diagrams showing light sources for a lighting device of Embodiment 4-3.

FIG. 53 Diagrams for illustrating the relationship between the coloring at the edge portion (periphery) of an illuminated area and the behavior of light rays of the lighting device. (a) is a diagram showing a light ray behavior of a lighting device according to an embodiment of the present invention. (b) is a diagram showing a light ray behavior of a lighting device of a reference example. (c) is a table showing the relationship between the materials of the lens and the refractive index and Abbe number.

FIG. 54 Graphs for illustrating the optical characteristics of a lighting device according to an embodiment of the present invention. (a) shows the illuminance distribution in a lighting device according to an embodiment of the present invention in the case where the projected light includes three types of light, light bulb color light, blue light, and red light. (b) shows the illuminance distribution of a lighting device of a reference example. (c) shows the color chart.

FIG. 57 Diagrams for illustrating the optical characteristics of the lighting device shown in FIG. 56. (a) shows an arrangement of lenses in the case where the light projection angle of projected light is a narrow angle. (b) shows an arrangement of lenses in the case where the light projection angle of projected light is a wide angle.

FIG. 58 Graphs for illustrating the optical characteristics of the lighting device shown in FIG. 57(*a*). (*a*) shows the illuminance distribution in the case where the projected light includes three types of light, light bulb color light, blue light, and red light. (*b*) shows the color chart.

FIG. 59 Graphs for illustrating the optical characteristics of the lighting device shown in FIG. 57(*b*). (*a*) shows the illuminance distribution in the case where the projected light includes three types of light, light bulb color light, blue light, and red light. (*b*) shows the color chart.

FIG. 61 Graphs for illustrating the optical characteristics of the lighting device shown in FIG. 60. (*a*) shows the illuminance distribution in the case where the projected light includes three types of light, light bulb color light, blue light, and red light. (*b*) shows the color chart.

DESCRIPTION OF EMBODIMENTS

Hereinafter, embodiments of the present invention are described with reference to the drawings, although the present invention is not limited to these embodiments.

Embodiment 1

FIG. 1 and FIG. 2 are diagrams showing the general configuration of a lighting device 11 according to the present embodiment.

Figure 3:
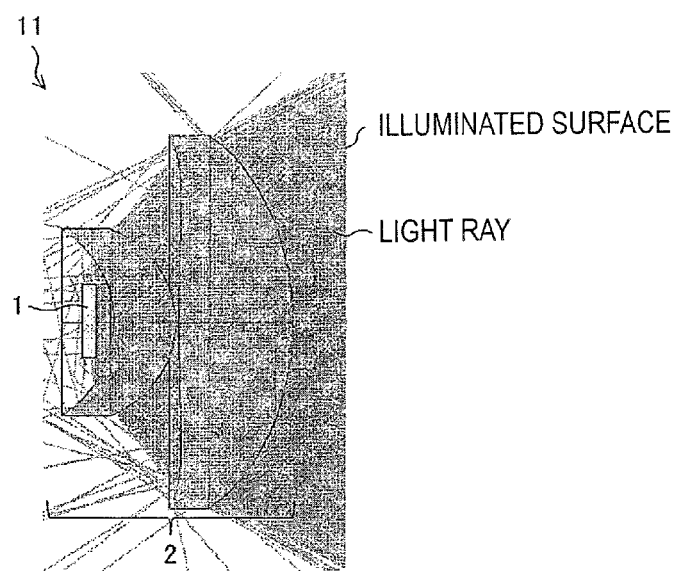
FIG. 3 A diagram showing a light ray behavior in the lighting device shown in FIG. 2.

FIG. 3 is a diagram showing the state of light projection in the lighting device 11 shown in FIG. 2.

(Configuration of Lighting Device) . . . FIGS. 1, 2, and 3

As shown in FIG. 1, the lighting device 11 includes a light source (light emission section) 1 and an optical lens section 2 provided on the optical axis AX on the light exit surface side, which is the light extraction side, of the light source 1. The lighting device 11 is configured such that light produced by the light source 1 is projected through the optical lens section 2.

The light source 1 includes a LED emitter. The LED emitter is a surface light emitter which is capable of surface emission. Note that it is not limited to the LED emitter so long as it is a surface light emitter which is capable of surface emission.

The optical lens section 2 includes two optical lenses L1, L2. From the side closer to the light source 1, the optical lens L1 (or "first lens L1") and the optical lens L2 (or "second lens L2") are arranged in this order. Note that the optical lenses L1, L2 are arranged such that the centers of the lenses are on the optical axis AX.

The optical lens L1 has a diameter which is at least greater than the maximum width of the emission surface of the light source 1. A surface of the optical lens L1 on the light source 1 side has a concave surface shape.

The optical lens L2 has a diameter which is at least greater than the maximum diameter of the optical lens L1 that is the first optical lens. The light exit surface side of the optical lens L2 has a convex shape.

Now, the focal positions of the optical lenses L1, L2 and virtual images formed after passage through the optical lenses L1, L2 are described.

The focal position of the optical lens L1 is f1 (also referred to as "focal point F1"). A virtual image which is formed by passage of light from the light source 1 through the optical lens L1 is a L1 virtual image (also referred to as "virtual image I1"). The focal position of the optical lens L2 is f2 (also referred to as "focal point F2"). A virtual image which is formed by passage of light from the L1 virtual image formed by the optical lens L1 through the optical lens L2 is a L2 virtual image (also referred to as "virtual image I2"). The effective focal position of the optical lenses L1, L2 is f1+f2 (also referred to as "effective focal point F(1+2)").

In the lighting device 11 shown in FIG. 1, the optical lens section 2 is designed such that the focal points f1, f2 of the optical lenses L1, L2 that are constituents of the optical lens section 2 are present on a side opposite to surfaces of corresponding virtual images (L1 virtual image, L2 virtual image) facing on the light source 1 relative to the respective virtual images formed by the optical lenses L1, L2 (L1 virtual image, L2 virtual image). In this configuration, the first virtual image I1 is formed between the focal point f1 and the lens L1, and the second virtual image I2 is formed between the focal point f2 and the lens L2.

A lighting device 11 which is based on an alternative design of the present embodiment includes a light source (light emission section) 1 and an optical lens section 2 which is placed on the optical axis AX on the light exit surface side of the light source 1 as shown in FIG. 2. The lighting device 11 is configured such that light produced by the light source 1 is projected through the optical lens section 2.

The light source 1 includes a LED emitter. The LED emitter is a surface light emitter which is capable of surface emission. Note that it is not limited to the LED emitter so long as it is a surface light emitter which is capable of surface emission.

The optical lens section 2 includes two optical lenses, the first optical lens L1 and the second optical lens L2. From the side closer to the light source 1, the optical lens L1 and the optical lens L2 are arranged in this order. Note that the optical lenses L1, L2 are arranged such that the centers of the lenses are on the optical axis AX.

The optical lens L1 has a diameter which is at least greater than the maximum width of the emission surface of the light source 1. A surface of the optical lens L1 on the light source 1 side has a concave surface shape.

The optical lens L2 has a diameter which is at least greater than the maximum diameter of the optical lens L1 that is the first optical lens. The light exit surface side of the optical lens L2 has a convex shape.

Now, the focal positions of the optical lenses L1, L2 and virtual images formed after passage through the optical lenses L1, L2 are described.

The focal position of the optical lens L1 is f1. A virtual image which is formed by passage of light from the light source 1 through the optical lens L1 is a L1 virtual image. The focal position of the optical lens L2 is f2. A virtual image which is formed by passage of light from the L1 virtual image formed by the optical lens L1 through the optical lens L2 is a L2 virtual image. The effective focal position of the optical lenses L1, L2 is f1+f2.

In the lighting device 11 shown in FIG. 2, the optical lens section 2 is designed such that the effective focal position f1+f2 of the focal points f1, f2 of the optical lenses L1, L2 that are constituents of the optical lens section 2 is present on a side opposite to surfaces of all the virtual images (L1 virtual image, L2 virtual image) facing on the light source 1 relative to the respective virtual images formed by the optical lenses L1, L2 (L1 virtual image, L2 virtual image).

In this configuration, the L1 virtual image and the L2 virtual image are formed between the effective focal position f1+f2 of the lens L1 and the lens L2 and the lens L1.

In the lighting device 11 in which the focal positions of the optical lenses L1, L2 and virtual images formed after passage through the optical lenses L1, L2 are in the relationship shown in FIG. 2, all of light rays from the emission surface of the light source 1 are guided to the optical lens section 2 as shown in FIG. 3 so that light can be efficiently projected onto a surface to be illuminated. That is, according to the lighting device 11 that has the above-described configuration, both high light utilization efficiency and improved uniformity of the illuminated surface can be achieved.

Hereinafter, the effects achieved by the lighting device 11 that has the above-described configuration are described in detail.

(Points of Present Embodiment) . . . FIGS. 4 and 5

FIG. 4(a) is a model diagram for the focal positions of the optical lenses L1, L2, and the L1 virtual image and the L2 virtual image which are formed after passage through the optical lenses L1, L2, respectively, in the lens configuration of the lighting device 11 of FIG. 2 (two-lens configuration). FIG. 4(b) is a model diagram for the focal positions of the optical lenses L1, L2, and the L1 virtual image and the L2 virtual image which are formed after passage through the optical lenses L1, L2, respectively, in an alternative form.

In the lighting device 11, as shown in FIG. 4(a), the optical lens section 2 is designed such that, with respect to the position of the light source, the focal positions f1, f2 of the optical lenses L1, L2 and the effective focal position f1+f2 are present on a side opposite to the light source side relative to the positions of virtual images formed by the optical lenses L1, L2 (L1 virtual image, L2 virtual image).

In the above-described configuration, virtual images formed by the optical lenses L1, L2 (L1 virtual image, L2 virtual image) are formed relatively near the light source. Here, light which has passed through a plurality of lenses (optical lenses L1, L2) can be regarded as outgoing of light from a virtual image formed by the last lens (in FIG. 4(a), L2 virtual image). Therefore, formation of the L2 virtual image near the light source can lead to the effect such as shown in FIG. 5(a).

FIG. 5(a) shows the routes of light emitted from the center of the light source (thin lines in FIG. 5(a)) and light emitted from the upper edge of the light source (thick lines in FIG. 5(a)) in the lens configuration shown in FIG. 4(a). Here, the center of the light source refers to a portion which is on the optical axis AX that passes through the center of the optical lens section 2.

As seen from FIG. 5(a), in the case of the lens configuration shown in FIG. 4(a), the light emitted from the center of the light source and the light emitted from the upper edge of the light source outgo from the optical lens section 2 with generally equal angular distributions. Thus, according to the lens configuration shown in FIG. 4(a), both the light emitted from the center of the light source and the light emitted from the upper edge of the light source can equally illuminate the entirety of a predetermined illumination region, so that the uniformity of the illumination region can be improved.

On the other hand, in the lens configuration of the alternative form, as shown in FIG. 4(b), the L2 virtual image is formed by the second optical lens L2 at a relatively distant position, and the L2 virtual image does not occur between the optical lens L2 and its focal position f2 (this aspect is different from the configuration shown in FIG. 4(a)). The focal position f2 of the optical lens L2 is placed at a position which is relatively close to the L1 virtual image. In this configuration, the L2 virtual image occurs at a position which is more distant from the light source than the focal position f2 of the optical lens L2, sometimes leading to the result such as shown in FIG. 5(b).

Note that, however, as will be described later, even when the L2 virtual image is distant from the light source 1, the uniformity in illuminance across the illumination region can be improved so long as the optical system is configured such that the L1 virtual image is at least formed on the light source side relative to the focal position f2 of the optical lens L2 and, meanwhile, the virtual image I1 formed by the optical lens L1 and the focal position f2 of the optical lens L2 are away from the light source 1 by a predetermined distance or more as will be described later.

FIG. 5(b) shows an example of the routes of light emitted from the center of the light source (thin lines in FIG. 5(b)) and light emitted from the upper edge of the light source (thick lines in FIG. 5(b)) in the case where the L1 virtual image is formed near the light source in the lens configuration of FIG. 4(b). In the example shown in FIG. 5(b), the light emitted from the center of the light source and the light emitted from the upper edge of the light source outgo from the optical lens L2 with different angular distributions (this aspect is different from the case of FIG. 5(a)). With such a characteristic, light emitted from different locations of the light source illuminate different ranges, and therefore, there is a probability that the uniformity of the illumination region cannot be achieved.

As described above, in the above-described configuration shown in FIG. 4(a), the focal positions f1, f2 of the optical lenses L1, L2 which are provided on the light exit surface side of the light source are provided at distant positions behind the L1 virtual image and the L2 virtual image formed by the optical lenses L1, L2 (in a direction opposite to the lens emission side). This arrangement enables relatively moving the light source and the virtual image positions so as to be closer to the optical lenses L1, L2.

In such a configuration, light emitted from the center of the light source which is on the optical axis of the optical lens section and light emitted from a location away from the center of the light source are allowed to outgo particularly toward the optical lens L1 of the optical lens section 2 with generally equal angular distributions. This enables both the light emitted from the center of the light source and the light emitted from a location away from the center of the light source to equally illuminate the entirety of a predetermined illumination region, so that the illuminance uniformity across the illumination region can be improved.

Furthermore, since the light emitted from the center of the light source and the light emitted from a location away from the center of the light source are allowed to outgo toward the optical lens section with generally equal angular distributions, substantially no part of the light fails to reach the optical lens section 2, and as a result, high light utilization efficiency can be achieved.

Thus, it is possible to utilize almost all of the light emitted from the light source, and high light utilization efficiency is achieved, while light emitted from different locations of the light source can be projected onto generally equal illumination regions. This significantly improves the uniformity of the illumination region.

Furthermore, since the focal points f1, f2 of the optical lenses L1, L2 and the effective focal position f1+f2 are present on a side opposite to surfaces of all the virtual images (L1 virtual image, L2 virtual image) facing on the light source 1 relative to the respective virtual images formed by the optical lenses L1, L2 (L1 virtual image, L2 virtual image), the virtual images formed by the respective lenses can occur at positions which are still closer to the light emission section. Therefore, the angle of the light outgoing from the optical lens section can be expanded, and thus, the uniformity of a larger illumination region can be significantly improved.

Note that, however, the position of the virtual image I2 formed by the lens L2 is not necessarily near the light source 1. The virtual image I2 may be formed at a position which is relatively distant from the light source. In this case, the lighting device projects light at a relatively narrow angle. Note that, in a configuration where light is projected at a relatively narrow angle, placing the focal point F2 of the second lens L2 at a position which is away from the L1 virtual image I1 or the light source by a predetermined distance or more is preferred from the viewpoint of improving the illuminance uniformity across the illumination region.

FIGS. 27(a) to 27(e) show various positional relationships between the positions of the focal points F1, F2 of the lenses L1, L2 and the virtual images I1, I2. In each of the arrangements of FIGS. 27(a) to 27(e), the light source 1 is provided between the first lens L1 and its focal point F1, and the virtual image I1 of the light source is formed by the first lens L1. This virtual image I1 is present at an inner position (on the light source side) than the focal point F2 of the second lens L2. Accordingly, the virtual image I2 is formed by the second lens L2.

Note that, however, the present inventors found that, when the virtual image I1 is present near the focal point F2 of the second lens, there is a probability that the intensity unevenness and chromaticity unevenness at the emission surface of the surface light source 1 and the emission surface shape itself are also reflected in the illumination region on the screen.

Figure 27:
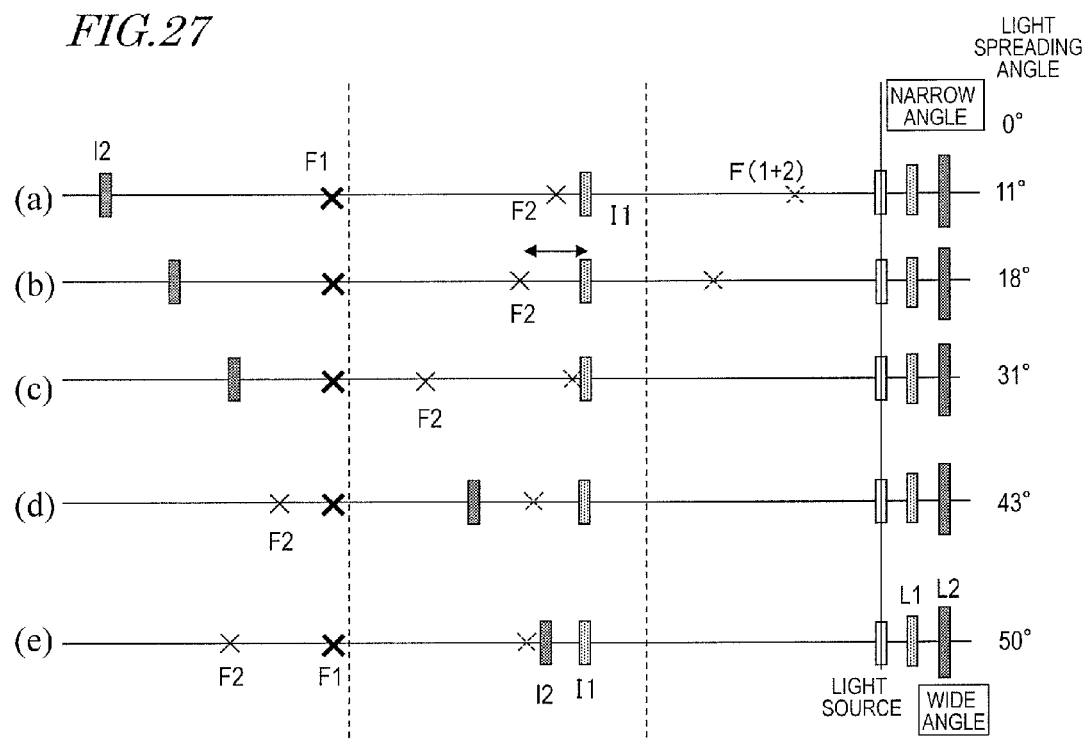
FIG. 27 A diagram showing the relationship between the focal points of the first lens and the second lens and the positions of virtual images formed by respective lenses. (a) to (e) show alternative arrangement relationships.
Figure 28:
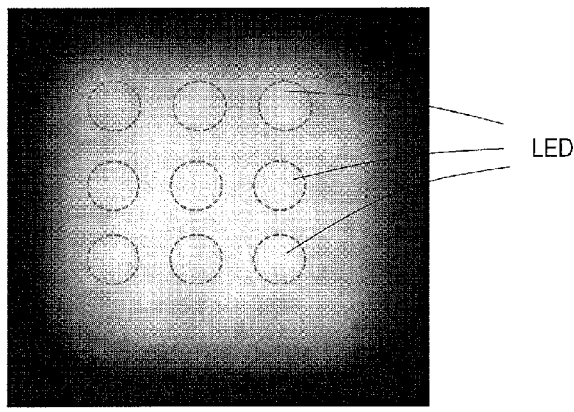
FIG. 28 A chart showing illuminance unevenness occurring across a light exit surface of a surface light source.

FIG. 28 shows the state of the illumination region on the screen in the case where the virtual image I1 of the light source 1 which is formed by the first lens L1 is present near the focal point F2 of the second lens L2 as shown in FIG. 27(a). When the focal point F2 and the virtual image I1 are excessively close to each other, there is a probability that the intensity unevenness and chromaticity unevenness produced by a plurality of element LEDs at the emission surface of the surface light source 1 are more likely to be perceived also in the illumination region on the screen as if the virtual image I1 were formed on the screen by the second lens L2.

To avoid occurrence of such a pseudo image formation and reduce the probability that the intensity unevenness and chromaticity unevenness at the emission surface are reflected in the illumination region, it is preferred that the focal point F2 is present on the distal side (the side opposite to the light source side) by a certain distance or more from the virtual image I1. Further, it is preferred that the focal length of the focal point F2 of the second lens L2 is not less than a predetermined length. As will be described later, the position of the focal point F2 of the second lens L2 may be determined according to, for example, the size of the surface light source 1. When the surface light source 1 includes a plurality of light-emitting elements, the position of the focal point F2 of the second lens L2 may be determined according to, for example, the arrangement pitch of the light-emitting elements.

FIG. 29 shows a case where the focal point F2 of the second lens L2 is present on the distal side relative to a predetermined reference position f' (or "reference focal point f'") on the optical axis (F2<f') and a case where the focal point F2 of the second lens L2 is present on the proximal side relative to the predetermined reference position f' (F2≥f': including a case where the focal point F2 is present at the reference position f'). In the lighting device according to an embodiment of the present invention, the optical system is designed such that the focal point F2 is present on the distal side relative to the reference position f'.

Now, the reference position (or "reference focal point") f' is described. The reference position f' refers to such a position that, when the focal point F2 of the second lens is present on the distal side relative to this position f', the shape of the surface light source and the intensity unevenness and chromaticity unevenness are unlikely to be visually perceived in the light projection region.

When, on the contrary, the focal point F2 is present at the same position as the reference position f' or at an anterior position relative to the reference position f', the second lens L2 projects the virtual image I1, which is approximately in focus, onto an image surface. As a result, such a phenomenon occurs that the shape of the emission surface and the intensity unevenness and chromaticity unevenness at the emission surface are reflected in the illumination region.

It is inferred that this phenomenon occurs according to a principal which is similar to that of the phenomenon that the posterior depth of field is as deep as infinity (which is referred to as "pan-focus" or "deep focus") when a wide-angle lens (a lens with a relatively short focal length) is used in a photographic device such as a camera and the F-number is set to a large value by controlling the diaphragm.

FIG. 30(a) is a diagram for explaining the aforementioned deep focus. Here, the thickness of the lens used is neglected, and the lens has aperture diameter D and focal point f' (F-number is given by Fno.=f'/D). The distance between an object and the lens is s, and the distance between the lens and the image surface is s'. In general, in the case where an image of an object is formed on the image surface using a lens, the position of the object at which the image of the object is in focus on the image surface is only one position. When the object is present anterior or posterior to that position, the image must be out of focus and blurry. However, in the case of FIG. 30(a), even when an object on a plane is moved back and forth within a certain range on the optical axis, it looks as if it were in focus on the image surface. This is because, although it is actually out of focus and blurry on the image surface, the blur cannot be detected if it is smaller than a certain degree, so that it looks as if it were in focus. Here, in the case where the size of the permissible limit of the blur is set as a permissible circle of confusion c at the position of the image surface, a spot of a size which is not more than the permissible circle of confusion c can be regarded as a spot with no blur.

Also, $s'=f' \cdot s/(f'+s)$ can be deduced from the Gaussian formula $1/s'-1/s=1/f'$. Here, the deep focus is realized under a condition that it is in focus at the distance from the lens to the object, $s=f'^2/\epsilon Fno.$ (hyperfocal distance).

This hyperfocal distance s can be rewritten in regard to the distance s' between the lens and the image surface into $s'=(D/(\epsilon+D)) \cdot f'$. When this formula holds, the deep focus is realized. The present inventors found that such deep focus in a photographic device can also be realized in the lighting device of the present embodiment.

FIG. 30(b) is a diagram for illustrating a condition under which, in the lighting device of the present embodiment, an image of the surface light source is formed in the illumination region with no blur, as if it were in focus, according to the principle that is similar to the above-described deep focus (i.e., the shape of the surface light source and the intensity unevenness and chromaticity unevenness are reflected in the illumination region).

In the lighting device, the above-described formula s'=(D/(ε+D))·f' can be converted to l'=(D/(ε+D))·f' where l' is the distance from the second lens L2 (when the thickness of the lens is considered, the principal point on the light source side) to the virtual image I1. By determining l', D, and ε in this formula, the reference focal point f' for the second lens L2 can be determined.

Here, the effective diameter D is the effective diameter of the second lens L2. The distance l' from the second lens L2 to the virtual image I1 can be calculated from the distance from the light source 1 to the second lens L2 and the distance from the light source 1 to the virtual image I1. The distance from the light source 1 to the virtual image I1 can be calculated from the positional relationship between the light source 1 and the first lens L1, the refractive index of the first lens L1 and the shape of the lens surface, etc.

When applied to the lighting device of the present embodiment, the permissible circle of confusion ε in the deep focus can be regarded as a factor which is to be set according to the emission surface size of the surface light source. When the surface light source includes a plurality of light-emitting elements which are arranged with intervals, the permissible circle of confusion ε can also be regarded as a factor which is to be set according to the arrangement pitch of the light-emitting elements (the pitch of the intensity unevenness and chromaticity unevenness). When thus applied to the lighting device of the present embodiment, the permissible circle of confusion ε in the deep focus is defined by the size of the emission surface or the arrangement pitch of the light-emitting elements, and therefore, these are sometimes referred to as "light source size factors ε". As understood from the above-described formula, the position of the reference focal point f' varies depending on the setting of the light source size factor ε.

Figure 31:
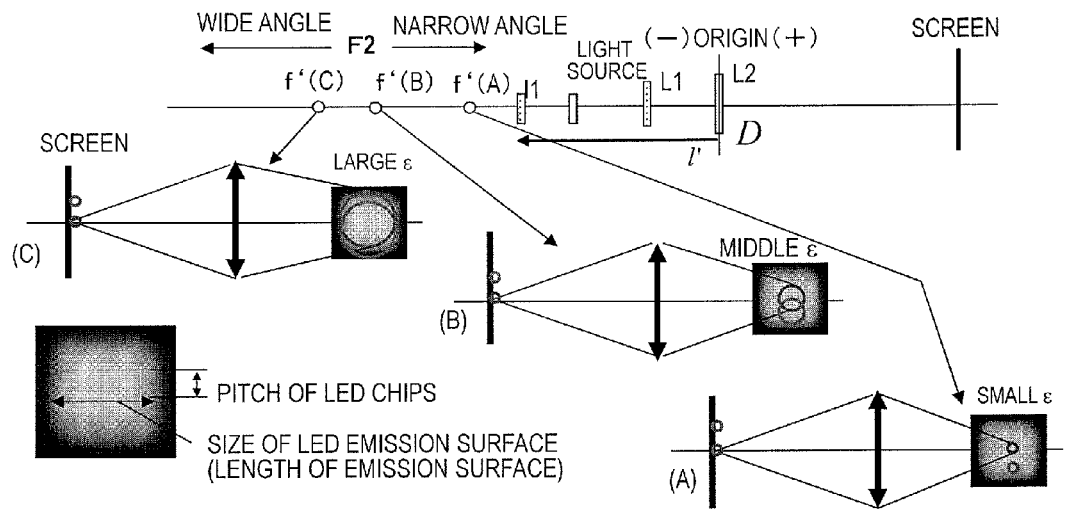
FIG. 31 A diagram for explaining that the position of the reference focal point f' changes according to the light source size factor (permissible circle of confusion) E.

FIG. 31 shows that the position of the reference focal point f' varies according to the light source size factor ε. As illustrated in pattern (A), in the case where the pitch of the LED chips is considered as the light source size factor ε, the reference focal point f' as the condition for visually perceiving the intensity unevenness and chromaticity unevenness on the order of the pitch on the screen is set to a side which is relatively close to the light source. As illustrated in pattern (B), in the case where a size which is greater than the pitch of the LED chips and which is smaller than the entire size of the light source is considered as the light source size factor c, the reference focal point f' is set to a distal position as compared with the case of pattern (A). Further, as illustrated in pattern (C), in the case where the entire size of the light source is considered as the light source size factor ε, the reference focal point f' is set to a distal position as compared with the case of pattern (B).

That is, in the case where the light source size factor ε (hereinafter, referred to as "factor ε") is set to a large value, the reference focal point f' moves away from the light source, and the focal point F2 of the second lens L2 is set to a position which is more distant from the light source than the reference focal point. Further, as represented by two circles in the diagram, regions on the emission surface corresponding to the factor ε gather in a predetermined region on the screen.

An image which is formed when the second focal point F2=f' holds in the above-described configuration is now discussed.

As illustrated in pattern (A), when the factor ε is smaller than the intensity unevenness and chromaticity unevenness at the LED emission surface (the minimum pitch of the arrangement of the LED elements), an image of the intensity unevenness and chromaticity unevenness is reflected on the screen. Since regions enclosed by two circles on the emission surface have different light emission characteristics, characteristics reaching the two circles on the screen are different, and it is seen as an image of the LED chip.

In a preferred example, as illustrated in pattern (B), a plurality of above-described intensity and chromaticity unevennesses are present within the range of the factor ε (not less than the minimum pitch of the arrangement of the LED elements). In this case, the light emission characteristics of the regions enclosed by two circles on the emission surface are averaged, so that an image of the intensity unevenness and chromaticity unevenness is not visually perceived on the screen. However, if the size of the LED emission surface is out of the range of the factor ε, the difference in intensity and chromaticity between the LED emission surface and a region outside the LED emission surface (i.e., the shape of the LED emission surface) is reflected, and sometimes disadvantageously, an image which has the shape of the LED emission surface is seen on the screen.

In another preferred example, as illustrated in pattern (C), the factor ε is large enough to encompass the entire emission surface. In this case, the shape of the emission surface is unlikely to be reflected, so that desirable illumination is realized on the screen.

Note that, however, the light source size factor ε may be set based on another form. An example of setting of the light source size factor ε based on another form is described below.

Figure 32:
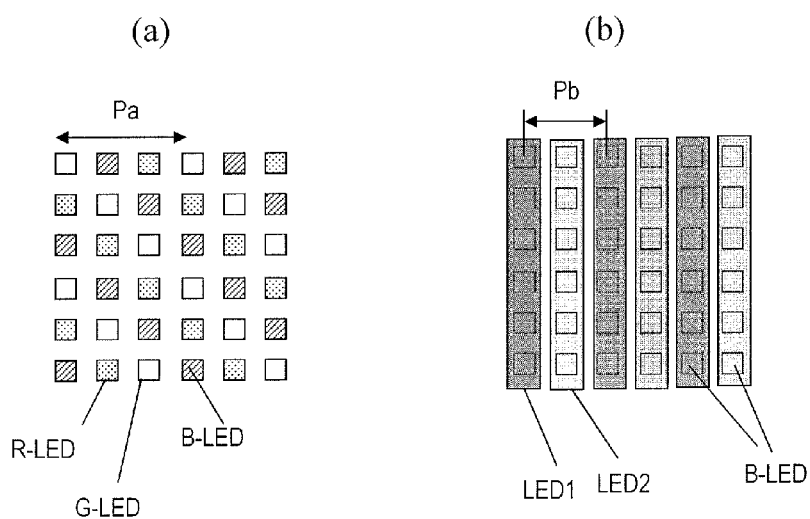
FIG. 32 Diagrams for illustrating the repetition pitch in a surface light source. (a) shows a case where LEDs of three colors are used. (b) shows a case where LED columns of two different characteristics are arranged.

FIG. 32(a) shows an embodiment where red LEDs, blue LEDs, and green LEDs are arranged according to a predetermined pattern. In this case, as shown in the drawing, a plurality of sets of LEDs of three colors are arranged at the minimum repetition pitch Pa, each of the LED sets consisting of LEDs of three different colors. In this case, the repetition pitch minimum Pa is selected as the light source size factor ε, whereby unevenness across the illumination region due to the arrangement of respective sets of LEDs of three colors is prevented from being perceived.

FIG. 32(b) shows a case where the emission surface is formed at such a pattern that vertically-extending regions of two different types between which the type, density, and thickness of the phosphor are different are repeated on a column by column basis. Although the light-emitting elements may have the same characteristics, light emitted from the two different type regions of the emission surface exhibit different wavelength-spectrum characteristics due to the different phosphor types. In this case, the repetition pitch minimum Pb of the two-column by two-column arrangement may be set as the light source size factor ε. This can prevent occurrence of stripe-pattern unevenness formed due to the two different type regions which exhibit different wavelength-spectrum characteristics across the illumination region. Note that the arrangements of FIGS. 32(a) and 32(b) merely show an example of the arrangement of LED elements. Even in other arrangements where regions of different emission intensities and different wavelength-spectrum characteristics are present in the plane, the minimum repetition pitch can be used as the light source size factor E.

As shown in FIGS. 27(a) to 27(e), the angular range of light to be projected (the extent of the illumination region) varies depending on the positional relationship between the focal point F2 of the second lens and the virtual image I1 formed by the first lens L1. In general, the optical lens is configured such that the light exit angle is narrowest when the light source is present at the focal position, and the light exit angle becomes wider as the light source moves away from the focal position to the lens side. In other words, the light projection angle becomes narrower as the focal point F2 of the second lens and the virtual image I1 formed by the first lens L1 are closer to each other, and the light projection angle becomes wider as the virtual image 11 is at a more distant position.

This light projection angle can be represented by the light spreading angle. Here, the light spreading angle refers to an angle which is calculated from the width of a region (in the case where a circular illumination region is formed, the diameter of that region) whose illuminance is not less than 50% in the case where the illuminance achieved at the center of the illumination region formed on the screen is 100% and the distance between the light source and the screen. A small light spreading angle means that the lighting device projects light at a narrow angle. A large light spreading angle means that the lighting device projects light at a wide angle.

In the lighting device of the present embodiment, as described above, the focal point F2 of the second lens is provided at a distal position side relative to the reference position f'. In this case, a lighting device which projects light with a light spreading angle of not less than 8°, for example, is realized.

In the arrangements shown in FIGS. 27(a) to 27(c), the focal point F2 of the second lens L2 is present between the virtual image I1 formed by the first lens L1 and the virtual image I2 formed by the second lens L2. Note that, however, the focal point F2 is present on the light source side relative to the focal point F1. In these arrangements also, an illuminance region which has a uniform illuminance distribution can be formed so long as the focal point F2 is provided at a distal position relative to the reference position f'.

On the other hand, as shown in FIGS. 27(d) and 27(e), even when the focal point F1 is present on the light source side relative to the focal point F2, an illuminance region which has a uniform illuminance distribution can be formed. FIG. 27(e) shows the positional relationship of the focal points f1, f2 (F1, F2) of the respective lenses, the positions of the respective virtual images (I1, I2), and the effective focal point f1+f2 (F(1+2)) in the embodiment shown in FIG. 1. As seen from FIG. 27(e), in the embodiment shown in FIG. 1, light of a relatively large light spreading angle can be projected at a wide angle such that the intensity unevenness and chromaticity unevenness at the emission surface are not conspicuous.

As described hereinabove, by setting the focal point of the second lens at a distal position side relative to the reference focal point f' that is determined from the size factor ε of the emission surface, the effective diameter D of the second lens, etc., illumination with reduced unevenness, i.e., high uniformity, can be realized.

Note that a mechanism for adjusting the effective aperture D of the second lens F2 may be provided. In this case, it is preferred that, for possible arbitrary effective apertures D, the focal length of the second lens is set such that the shape of the emission surface and the intensity unevenness and chromaticity unevenness are not reflected in the illumination region.

Although an optical design consisting of the first lens and the second lens has been described, the optical system may be constructed using a larger number of lenses. In this case, assuming that n lenses are arranged from the light source side, the above-described first lens may be considered as a lens whose characteristics are equal to those of the entire lens group consisting of the first to n−1$^{th}$ lenses, and the second lens may be considered as the n$^{th}$ lens.

(Regarding the Design of the Lens Shape)

The shape of optical lenses included in the optical lens section 2 of the above-described lighting device 11 may be determined according to the arrangement of focal positions and virtual image positions in the vicinity of the optical axis. Note that, however, it is more preferred that the shape of the lenses, including portions away from the optical axis, is determined according to the following design criteria.

Specifically, to maximize the utilization efficiency of light emitted from the light source 1 which has a finite size and secure the illuminance uniformity across the illumination region, the lens system is constructed such that the off-axis comatic aberration is corrected with respect to the size of the surface light source while the light source 1 is positioned as close as possible to an optical lens near the light source 1 in order to maintain the virtual image relationship of generally equal magnification in the context of the paraxial theory and, meanwhile, an on-axis image point and an off-axis image point have equal spot shapes and diameters.

The comatic aberration refers to a phenomenon that light coming out from one point which is away from the optical axis does not converge into one point on the image surface but results in an image which appears to have a tail like a comet. The state of convergence of light on the image surface is referred to as "spot shape (spot diagram)".

The aforementioned "axis" refers to the optical axis of a lens. The term "on-axis" refers to a location on the optical axis of a lens. The term "off-axis" refers to a location which is away from the optical axis.

Here, the "virtual image relationship of generally equal magnification in the context of the paraxial theory" refers to a condition under which the size of the L1 virtual image and the L2 virtual image in FIG. 4(a) is equal to or several times greater than the light source and meanwhile the L1 virtual image and the L2 virtual image occur near the light source.

Further, correcting "the off-axis comatic aberration" means changing the shape of a lens portion away from the optical axis such that light coming out from a location which is away from the optical axis converges into one point on the image surface.

Further, "an on-axis image point and an off-axis image point have equal spot shapes and diameters" means changing the shape of a lens portion away from the optical axis such that the spot on the image surface of light coming out from a location on the optical axis and the spot on the image surface of light coming out from a location away from the optical axis have generally equal shapes and areas.

(Effects of Present Embodiment) . . . FIG. 6 Through FIG. 11

Details of the effects in the lighting device 11 that has the above-described configuration are described below with reference to FIG. 6 through FIG. 11.

Figure 6:
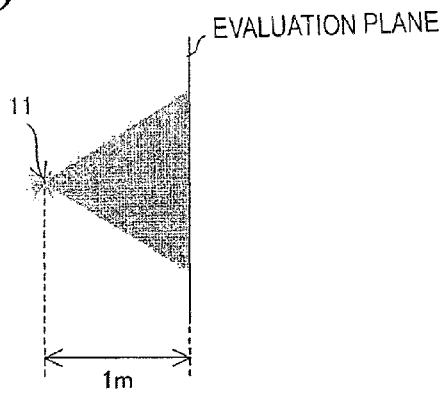
FIG. 6 A diagram showing an example where an evaluation plane is 1 m distant from the lighting device.
Figure 7:
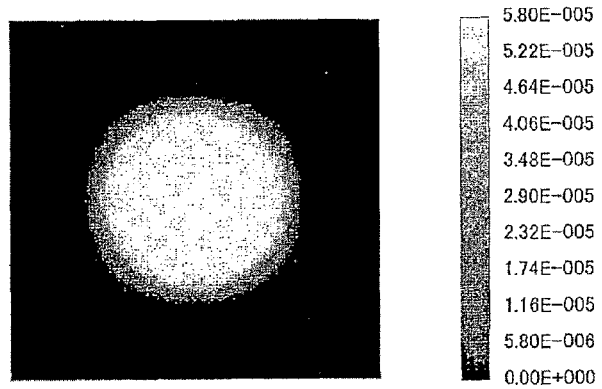
FIG. 7 A chart showing the illumination intensity distribution at the evaluation plane shown in FIG. 6.

As shown in FIG. 6, in the case where the evaluation plane is 1 m distant from the lighting device 11 such as shown in FIG. 2, the resultant illuminance distribution across the evaluation plane is as shown in FIG. 7. In FIG. 7, the in-plane distribution is monochromatically shown according to the illuminance intensity. A black portion represents the minimum illuminance, and a white portion represents the maximum illuminance.

Figure 8:
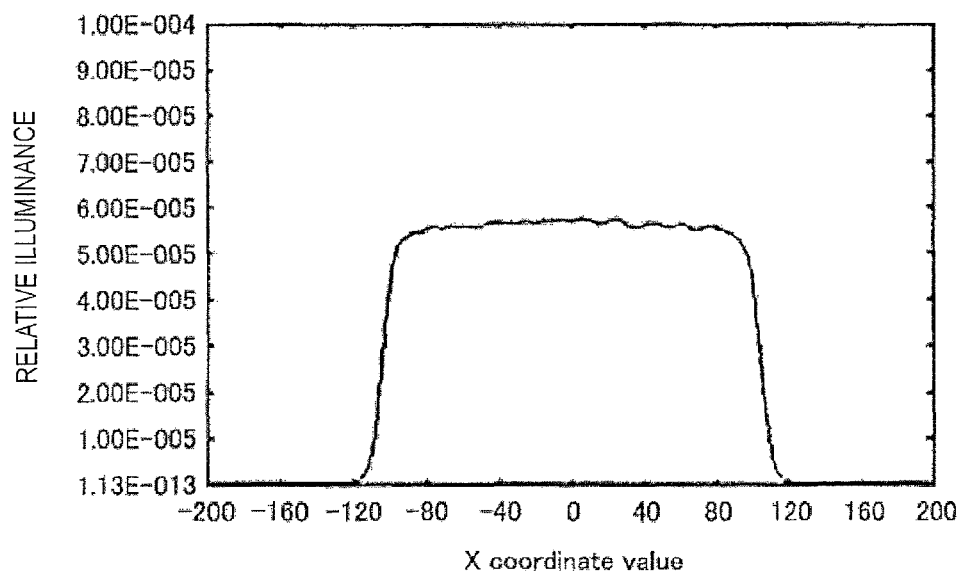
FIG. 8 A graph showing the relationship between the relative illuminance in the illumination intensity distribution shown in FIG. 7 and the illumination position.

The cross-sectional profile of the illuminance distribution at the central portion was checked as shown in FIG. 7, and as a result, it was confirmed that generally uniform illuminance was achieved across the illumination region as shown in FIG. 8.

The lighting device of the present embodiment is capable of uniformly illuminating a predetermined illumination region not only when all regions of the emission surface of the light source 1 uniformly emit light but also when, for example, a plurality of minute emission surfaces are arranged over the emission surface of the light source 1 as shown in FIG. 9(a). For example, it is possible that a plurality of LED emitters are arranged over the emission surface of the light source 1.

As shown in FIG. 9(b), even when some of the plurality of minute emission surfaces arranged over the emission surface of the light source 1 emit smaller amounts of light, it is possible to uniformly illuminate a predetermined illumination region. This is because, as in the case that has been illustrated with reference to FIG. 5(a), even light coming from a location on the emission surface of the light source 1 which is away from the optical axis can illuminate the same illumination region as that illuminated by light coming from a location on the optical axis. That is, no matter which portion of the emission surface light comes from, the light can illuminate the same illumination region. Therefore, even when some portions of the emission surface emit smaller amounts of light, it would not affect the uniformity of illumination across the illumination region.

FIG. 9(c) shows the illuminance distribution produced by the emission surface of the light source 1 shown in FIG. 9(b). As also seen from this illuminance distribution, it would not affect the uniformity of illumination across the illumination region.

As shown in FIGS. 32(a) and 32(b), the plurality of minute emission surfaces of FIG. 9(a) may emit light of different dominant wavelengths. Alternatively, a plurality of light-emitting substances which emit light of different dominant wavelengths may be combined. In that case, light of different colors generally uniformly illuminate the same illumination region, and therefore, a lighting device which has wide color reproducibility can be realized.

By thus using a plurality of light-emitting substances which emit light of different dominant wavelengths in combination, colors from a wide range over the chromaticity coordinates can be reproduced.

Due to various variations in the manufacturing process of the light emitters, the LED light source have large variations in the emission characteristics, such as the amount of emission, the dominant wavelength of emission, the emission wavelength band, etc. In the existing procedures, in the case where the LED light source is used, light emitters which have similar emission characteristics are selected for use, and this selection process is a factor which increases the cost.

Assuming that one of the emission surfaces of the light source 1 shown in FIG. 9(a) is realized by one LED light source, even if the LED light sources that constitute the emission surface have varying emission characteristics as shown in FIG. 9(b), it would not affect the uniformity of illumination across the illumination region as shown in FIG. 9(c). Therefore, the variations of the LED light sources can be averaged within the illumination region. Thus, selection of the LED light sources is not necessary, and cost reduction can be realized.

As seen from these results, a plurality of light-emitting substances can be arranged, and therefore, even if one of the light-emitting substances is inoperative due to breakdown, the uniformity of the illumination region would not vary. Thus, it is not necessary to replace the entire lighting device, and extension of the life duration of the lighting device can be expected.

The cross-sectional illuminance distributions at places which are 1 m and 5 m distant from the lighting device 11 as shown in FIG. 10 are as shown in FIGS. 11(a) and 11(b).

FIG. 11(a) shows the cross-sectional illuminance distribution at a place which is 1 m distant from the lighting device 11. FIG. 11(b) shows the cross-sectional illuminance distribution at a place which is 5 m distant from the lighting device 11.

Although not shown in the drawings, even cross-sectional illuminance distributions at the places which are 2 m and 3 m distant, or distant by any other arbitrary distance, from the lighting device 11 are also uniform illuminance distributions as in FIGS. 11(a) and 11(b).

As seen from the foregoing, the cross-sectional illuminance distribution of light emitted from the lighting device 11 has uniform illuminance distribution at any position so long as it is distant by a certain distance or more. Here, the "certain distance or more" means an extent which is not less than twice the maximum diameter of the optical lenses L1, L2 that are constituents of the optical lens section 2 of the lighting device 11.

(Examples) . . . FIG. 12, FIG. 13

Now, a prototype example of the lighting device 11 of FIG. 1 is shown in FIG. 12(a).

The light source 1 used was a white LED package of about 6 mm×6 mm.

The first optical lens L1 of the optical lens section 2 was made of polycarbonate which had refractive index nd=about 1.585. The radius of curvature of the light entry surface provided on the light source side was 9.2 mm. The radius of curvature of the light exit surface was 6.0 mm. The lens outside diameter was 12 mm. The lens thickness was 5 mm.

The second optical lens L2 used was made of PMMA (polymethyl methacrylate) which had refractive index nd=about 1.49. The light entry surface was a flat surface. The radius of curvature of the light exit surface was 20.966 mm. The conic constant was 0.28119. The aspheric coefficients of high orders, $4^{th}$ order, $6^{th}$ order, $8^{th}$ order, $10^{th}$ order, and $12^{th}$ order, were $-5.2 \times 10^{-7}$, $-1.8914 \times 10^{-8}$, $3.4858 \times 10^{-10}$, $-9.7419 \times 10^{-13}$, and $2.6235 \times 10^{-16}$, respectively. The lens outside diameter was 35 mm. The lens thickness was 10.5 mm.

The white LED package, the first optical lens L1, and the second optical lens L2 were arranged such that the centers of these elements were on the optical axis. Meanwhile, the distance along the optical axis between the emission surface of the white LED package and the light entry surface of the first optical lens L1 was 1.5 mm. The distance along the optical axis between the light exit surface of the first optical lens L1 and the light entry surface of the second optical lens L2 was 2.0 mm.

In that case, the focal lengths of the optical lenses L1, L2 were 18.52 mm and 42.47 mm, respectively, and the effective focal length of the optical lenses L1, L2 was 14.12 mm. In a scale where the emission surface of the light source section was at 0 (origin) and the direction of exit of light was the positive (+) direction, the focal positions f1, f2 of the optical lenses L1, L2 and the effective focal position f1+f2 were −11.30 mm, −26.94 mm, and −5.14 mm, respectively.

On the other hand, the positions of virtual images formed by the optical lenses L1, L2 (L1 virtual image, L2 virtual image) were deduced by calculation, and as a result, the position of the L1 virtual image was −1.61 mm, and the position of the L2 virtual image was −9.74 mm.

Thus, it was confirmed that, in the lighting device 11, the focal points f1, f2 of the optical lenses L1, L2 that were constituents of the optical lens section 2 were present on a side opposite to surfaces of corresponding virtual images (L1 virtual image, L2 virtual image) facing on the light source 1 relative to the respective virtual images formed by the optical lenses L1, L2 (L1 virtual image, L2 virtual image), i.e., the lighting device 11 was designed as shown in FIG. 1.

An illuminance experiment for the lighting device 11 that has the above-described configuration was carried out.

The result of this experiment is shown in FIG. 12(b). It was found from FIG. 12(b) that a predetermined illumination region was illuminated with uniform illuminance.

A prototype example of the lighting device 11 of FIG. 2 is shown in FIG. 13(a).

The light source 1 used was a white LED package with a diameter of 2 mm.

The first optical lens L1 of the optical lens section 2 was made of glass material SLAH53 which had refractive index nd=about 1.806. The radius of curvature of the light entry surface provided on the light source side was 2.96 mm. The radius of curvature of the light exit surface was 2.69 mm. The lens outside diameter was 5 mm. The lens thickness was 1.6 mm.

The second optical lens L2 used was made of PMMA which had refractive index nd=about 1.49. The radius of curvature of the light entry surface provided on the light source side was 65.4 mm. The conic constant of the light entry surface was −5.0. The aspheric coefficients of high orders, $4^{th}$ order, $6^{th}$ order, and $8^{th}$ order, were $-5.97\times10^{-5}$, $-7.927\times10^{-6}$, and $-7.278\times10^{-7}$, respectively. The radius of curvature of the light exit surface was 8.0 mm. The conic constant of the light exit surface was 0.73. The aspheric coefficients of high orders, $4^{th}$ order, $6^{th}$ order, $8^{th}$ order, $10^{th}$ order, and $12^{th}$ order, were $1.225\times10^{-4}$, $-3.777\times10^{-6}$, $-1.054\times10^{-7}$, $-1.83\times10^{-9}$, and $4.2397\times10^{-11}$, respectively. The lens outside diameter was 10 mm. The lens thickness was 3.0 mm.

The white LED package, the first optical lens L1, and the second optical lens L2 were arranged such that the centers of these elements were on the optical axis. Meanwhile, the distance along the optical axis between the emission surface of the white LED package and the light entry surface of the first optical lens L1 was 0.5 mm. The distance along the optical axis between the light exit surface of the first optical lens L1 and the light entry surface of the second optical lens L2 was 0.1 mm.

In that case, the focal lengths of the optical lenses L1, L2 were 9.899 mm and 14.69 mm, respectively, and the effective focal length of the optical lenses L1, L2 was 5.81 mm. In a scale where the emission surface of the light source section was at 0 (origin) and the direction of exit of light was the positive (+) direction, the focal positions f1, f2 of the optical lenses L1, L2 and the effective focal position f1+f2 were −6.76 mm, −10.68 mm, and −2.85 mm, respectively.

On the other hand, the positions of virtual images formed by the optical lenses L1, L2 (L1 virtual image, L2 virtual image) were deduced by calculation, and as a result, the position of the L1 virtual image was −0.10 mm, and the position of the L2 virtual image was −0.75 mm.

Thus, it was confirmed that, in the lighting device that had the above-described configuration, the focal points f1, f2 of the optical lenses L1, L2 and the effective focal position f1+f2 were present on a side opposite to surfaces of all the virtual images (L1 virtual image, L2 virtual image) facing on the light source 1 relative to the respective virtual images formed by the optical lenses L1, L2 (L1 virtual image, L2 virtual image), i.e., the lighting device 11 was designed as shown in FIG. 2.

An illuminance experiment was carried out using the lighting device 11 that has the above-described configuration. The result of the illuminance experiment is shown in FIG. 13(b). As seen from FIG. 13(b), the lighting device 11 is capable of illuminating a predetermined illumination region with uniform illuminance.

Embodiment 2

Another embodiment of the present invention will be described below. Note that, for the sake of convenience of description, components which have identical functions as those of Embodiment 1 are designated by the same reference numerals, and detail description thereof is herein omitted.

Figure 14:
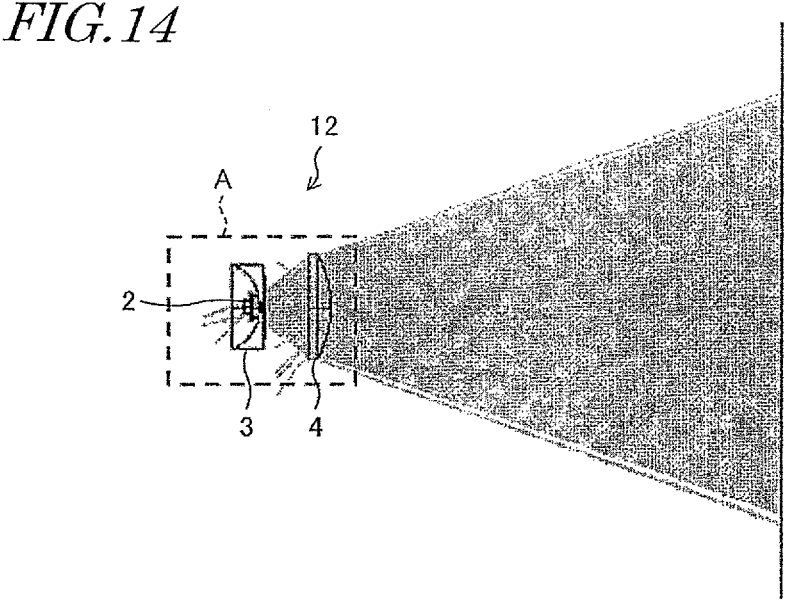
FIG. 14 A general configuration diagram of a lighting device according to another embodiment of the present invention.
Figure 15:
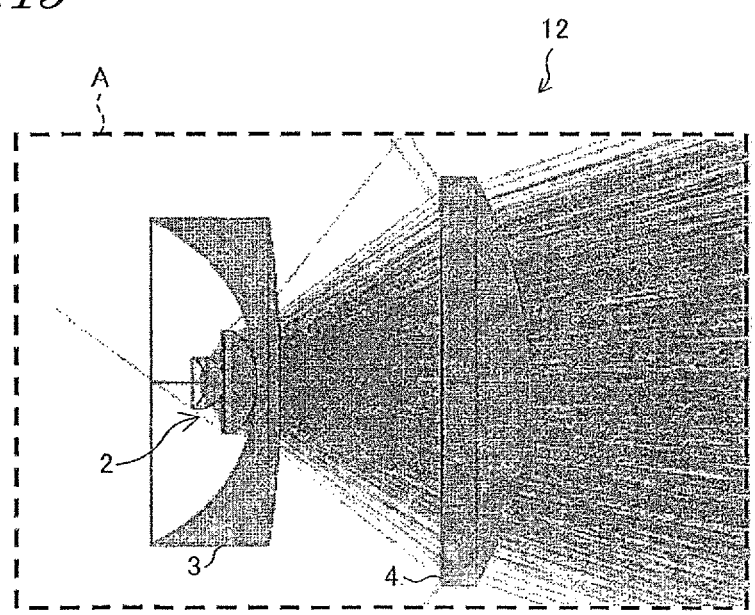
FIG. 15 An enlarged view of the major portion A of the lighting device shown in FIG. 14.

(Configuration of Lighting Device) . . . FIGS. 14 and 15

FIG. 14 is a diagram showing a general configuration of a lighting device 12 according to the present embodiment.

FIG. 15 is an enlarged view of the major portion A shown in FIG. 14.

The lighting device 12 has a configuration where optical lenses 3, 4 are further added on the light exit side of the optical lens section 2 of Embodiment 1 as shown in FIG. 14.

That is, where the optical lens section 2 is referred to as the first optical lens section, the lighting device 12 has a configuration in which the second optical lens section formed by at least two optical lenses (optical lenses 3, 4) is provided on the light exit side of the first optical lens section.

The optical lens 3 is a concave lens. The optical lens 3 is closest to the optical lens section 2 and is arranged such that the concave surface side faces on the optical lens section 2.

The optical lens 4 is a convex lens. The optical lens 4 is more distant from the optical lens section 2 than the optical lens 3.

By thus further providing the optical lenses 3, 4 on the outer side of the optical lens section 2, the light exit angle of light emitted from the lighting device 12 can be narrowed as shown in FIG. 15.

(Effects of Present Embodiment) . . . FIG. 16 Through FIG. 19

Figure 16:
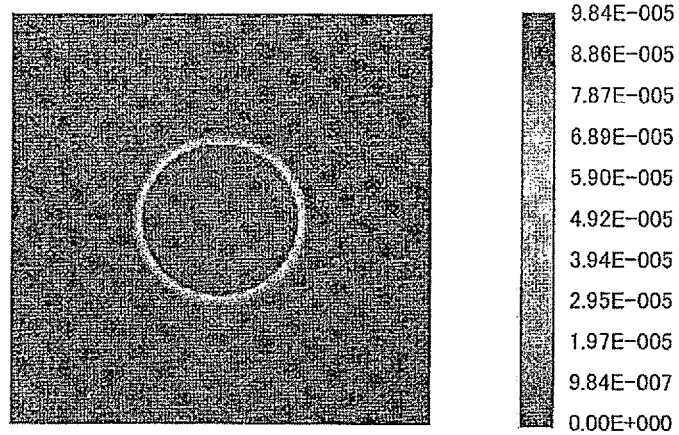
FIG. 16 A chart showing the illumination intensity distribution in the lighting device shown in FIG. 14.

In the lighting device 12 that has the above-described configuration, the lens shape of the added optical lenses 3, is optimized, whereby the illumination region can be uniformly illuminated as shown in FIG. 16.

In this case, to achieve both narrowing of the light exit angle and uniformity of the illumination region, it is more preferred to use a concave lens and a convex lens in combination as described above. This is because using the concave lens and the convex lens in combination enables mutual correction of aberrations occurring in the respective lenses and achievement of uniformity of the illumination region.

The arrangement of the added lenses is not limited to the arrangement positions of FIG. 14. The added lenses may be arranged at other positions.

Figure 17:
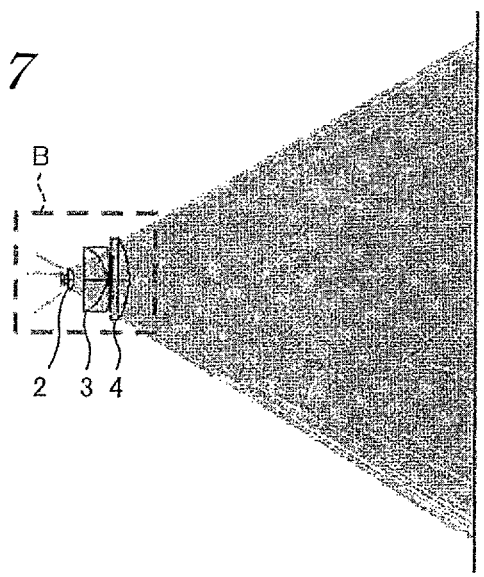
FIG. 17 A general configuration diagram of a lighting device according to still another embodiment of the present invention.

FIG. 17 is a diagram showing a general configuration of the lighting device 12 in which the optical lenses 3, 4 are placed at different positions from those of the optical lenses 3, 4 shown in FIG. 14.

FIG. 18 is an enlarged view of the major portion B shown in FIG. 17.

As shown in FIG. 17, part of the optical lenses 3, 4 added in FIG. 14 is placed at a different position, whereby the angular distribution of light emitted from the lighting device 12 can be changed.

Note that even when the angular distribution is changed, the illumination region can be generally uniformly illuminated as shown in FIG. 19.

As described above, by further adding the optical lenses 3, 4 on the light exit side in the lighting device 11 that has been described in Embodiment 1, the light exit angle can be narrowed. Further, by changing the arrangement of the added optical lenses, the light exit angle can also be adjusted (controlled).

Even when the optical lenses 3, 4 are added to control the light exit angle as described hereinabove, the illuminance uniformity across the illumination region can be maintained in each case as shown in FIG. 16 and FIG. 19.

Note that the second optical lens section is not limited to the optical lenses 3, 4 shown in FIG. 14. For example, a plurality of optical lenses which are combined so as to have the same optical characteristics as those of the optical lens 3 may be used in place of the optical lens 3. The number of optical lenses included in the second optical lens section is not particularly limited.

As the number of optical lenses increases, improvement of the in-plane uniformity and control of the light projection angle are achieved more easily. On the other hand, however, it is necessary to consider various disadvantages, such as decrease of the light transmittance due to an increased number of lens interfaces, and increase of cost due to an increased number of lenses.

Embodiment 3

Still another embodiment of the present invention will be described below. Note that, for the sake of convenience of description, components which have identical functions as those of Embodiments 1 and 2 are designated by the same reference numerals, and detail description thereof is herein omitted. In an example described in this section, two optical lenses of the optical lens section 2 are integrated together.

Figure 20:
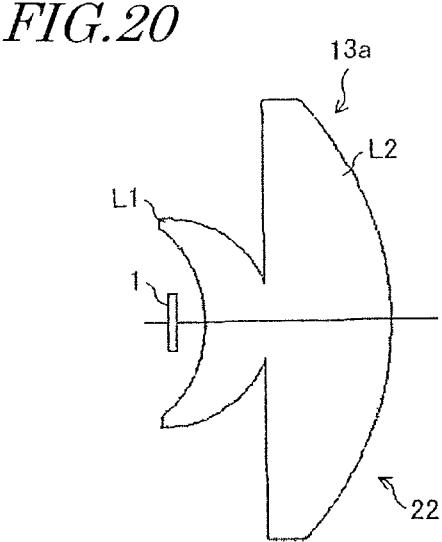
FIG. 20 A general configuration diagram of a lighting device according to still another embodiment of the present invention.
Figure 21:
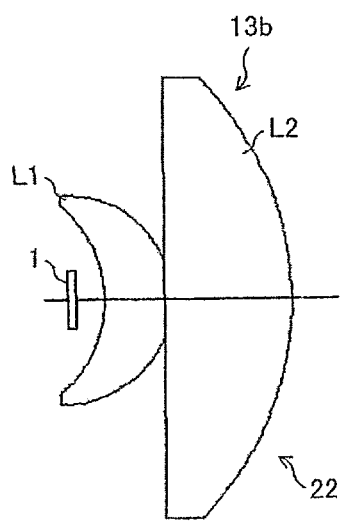
FIG. 21 A general configuration diagram of a lighting device according to still another embodiment of the present invention.

(Configuration of Lighting Device) . . . FIGS. 20 and 21

FIG. 20 is a diagram showing a general configuration of a lighting device 13a according to the present embodiment.

FIG. 21 is a diagram showing a general configuration of a lighting device 13b according to the present embodiment.

The lighting device 13a shown in FIG. 20 is an example where the optical lenses L1, L2 are integrally molded to form an optical lens section 22.

Specifically, the optical lenses L1, L2 are integrally molded with a die using a resin such as an acrylic material to form the optical lens section 22.

On the other hand, the lighting device 13b shown in FIG. 21 is an example where the optical lenses L1, L2 are adhered together to form an optical lens section 23.

Specifically, a lens which is close to the emission surface of the light source 1 (optical lens L1) and a lens which is distant from the emission surface of the light source 1 (optical lens L2) are separately molded, and then, the lenses are adhered together at about the centers of the lenses to form the optical lens section 23.

The optical lens shapes are now compared between the optical lens section 2 illustrated in Embodiment 1 (FIG. 1) and the optical lens section 22 shown in FIG. 20. In either case, light emitted at a wide angle from the light source 1 greatly changes its traveling direction due to refraction at the same four air interfaces.

On the other hand, light emitted in a direction perpendicular to the light source in FIG. 1 is generally perpendicularly incident upon the respective air interfaces of the optical lens section 2. Therefore, even when portions at about the center of the optical lens section 22 are in contact with each other or joined together as shown in FIG. 20, uniformity of the illumination region is realized while the light exit angle distribution is not largely affected.

Figure 22:
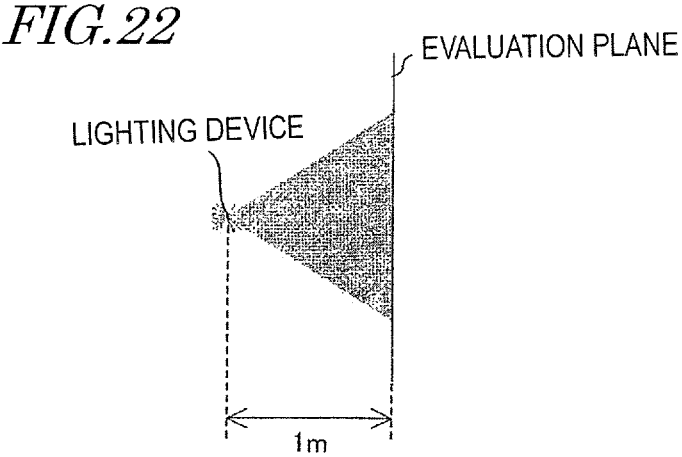
FIG. 22 A diagram showing the relationship between the lighting device and the evaluation plane.
Figure 23:
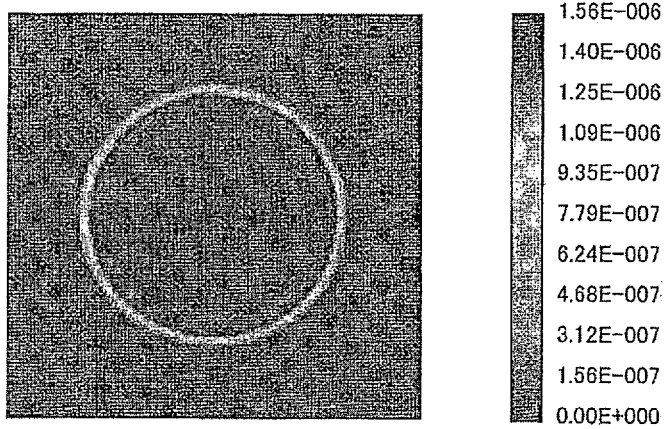
FIG. 23 A chart showing the illumination intensity distribution at the evaluation plane shown in FIG. 22.

(Effects of Present Embodiment) . . . FIGS. 22 and 23

In the lighting device 13a that includes the optical lens section 22 in which the optical lens is integrally molded as shown in FIG. 20, when the evaluation plane is placed at a position which is 1 m distant from the lighting device 13a so as to be parallel to the emission surface as shown in FIG. 22, the illuminance distribution across the illumination region is generally uniform as shown in FIG. 23.

Thus, the merit of adhering together two lenses that are constituents of an optical lens lies in cost reduction due to simplified alignment of the emission surface and the optical lens. Also, the procedure of fixing the emission surface and the optical lens during use can be simplified.

Further, the merit of integrally molding an optical lens includes not only cost reduction due to the aforementioned simplified alignment and fixing procedure but also cost reduction due to decrease of the molding cycles from two cycles to one cycle. Also, the process of adhering two lenses together can be omitted, and this contributes to cost reduction.

Figure 24:
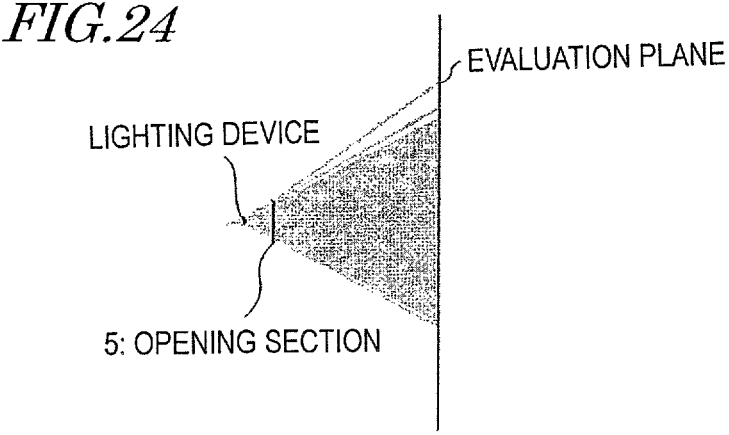
FIG. 24 A diagram showing the relationship between the lighting device and the evaluation plane.
Figure 25:
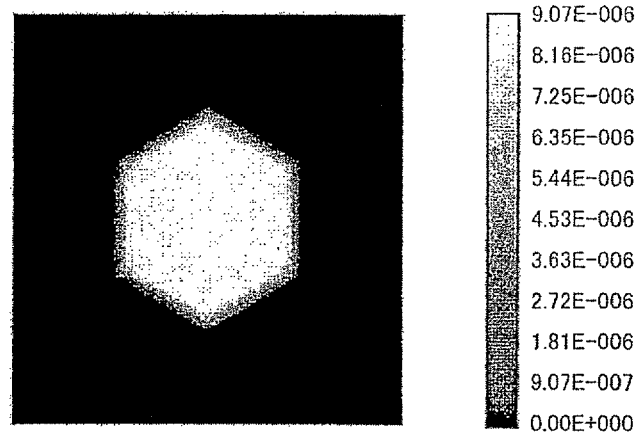
FIG. 25 A chart showing the illumination intensity distribution at the evaluation plane shown in FIG. 24.

<Variation> . . . FIGS. 24 and 25

FIG. 24 shows a case where a hexagonal opening (aperture) section 5 is provided on the light exit side of the lighting device 11 of Embodiment 1. Only part of light emitted from the lighting device 11 traveling toward the hexagonal opening section 5 passes through the hexagonal opening section 5 while the remaining part of the light is reflected or absorbed.

FIG. 25 shows a two-dimensional illuminance distribution achieved in a case where the evaluation plane is 1 m distant from the lighting device 11. In this case, it is possible to illuminate the evaluation plane such that the illumination region has a shape approximately equal to that of the opening section 5 and the illuminance across the illumination region is uniform. Further, even when the evaluation plane is distant from the surface light source or the lighting device, illumination is also achieved while the shape and uniformity of the illumination region are maintained.

Figure 26:
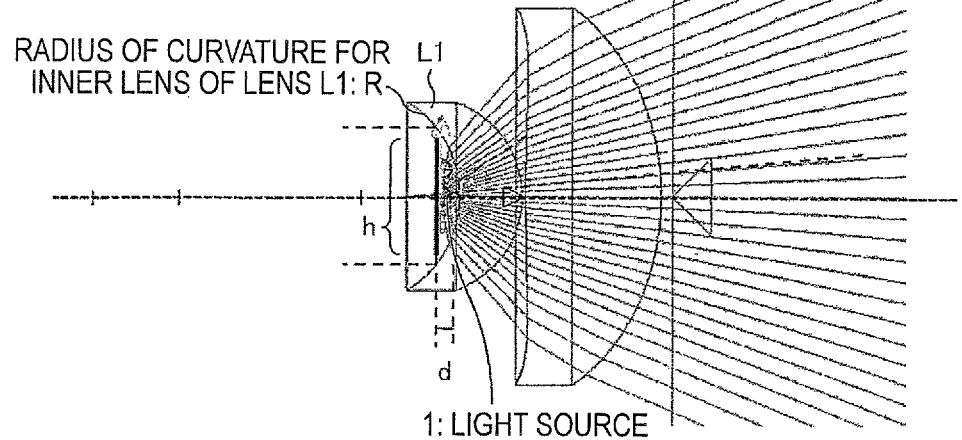
FIG. 26 A diagram for illustrating the placement range of a light emission section in the lighting device of the present invention.

<Supplementary Explanation> . . . FIG. 26

(1) The limit of the arrangement range of the light source 1 is explained with reference to FIG. 26.

The arrangement range of the light source 1 is preferably limited within a range which satisfies the following formula:

$$h \leq 2\sqrt{(d(2R-d))}$$

Here, h is the width of the arrangement range of the light emission section, d is the distance from the light source to the optical lens L1 interface on the optical axis, and R is the radius of curvature of the inner lens of the optical lens L1.

By arranging the light source 1 within the above-described range, all of the light emitted from the light source 1 can be brought into the optical lens L1 that is the first lens, so that the light utilization efficiency can be improved.

(2) The relationship between the focal position and virtual image position of the optical lens section 2 and the position of the light source is explained.

As in the above-described configuration, the focal position of the optical lens section 2 that is provided on the light exit surface side of the light source 1 is placed at a distant position behind the positions of the L1 virtual image and the L2 virtual image formed by the optical lenses L1, L2 (in a direction opposite to the light exit side of the lens), whereby the positions of the light source 1 and the virtual images (L1 virtual image, L2 virtual image) are moved relatively close to the optical lens section 2.

In this case, the following formula holds:

$$1/a - 1/b = 1/f \qquad (1)$$

where f is the distance from the lens principal point to the focal position of the optical lens section 2, a is the distance from the lens principal point to the light source, and b is the distance from the lens principal point to the virtual image. Here, the lens principal point refers to a position of a thin lens in the case where the lens is replaced by the thin lens whose lens thickness is negligible, in which only behaviors of a light ray coming into the lens and a light ray outgoing from the lens are represented.

In the lighting device 11 that has the above-described configuration, the virtual image positions are relatively close to the optical lens section 2 as compared with the focal positions f1, f2 of the optical lenses L1, L2. Therefore, the following formula holds:

$$f > b \qquad (2)$$

Here, the following formula is deduced from formula (1) shown above:

$$1/a = 1/b + 1/f = (b+f)/bf \qquad (3)$$

Formula (3) can be further developed into the following formula:

$$a = bf/(b+f) = f/(1+f/b) \qquad (4)$$

Here, the following formula is deduced from formula (2):

$$f/b > 1 \qquad (5)$$

Therefore, assigning formula (5) to formula (4) leads to the following formula:

$$a < f/2$$

That is, by making the distance a from the lens principal point to the light source shorter than a half of the distance f from the lens principal point to the focal position, the virtual image position can always be relatively close to the optical lens as compared with the focal position of the optical lens.

(3) Since part of the light is reflected at the lens interfaces of the optical lens section 2, it is more preferred that the lens surface of each optical lens is provided with a surface treatment for antireflection purposes. A common example of the surface treatment for antireflection purposes is an antireflection film consisting of a plurality of thin films which have different refractive indices for reducing the surface reflection. Another example is to form a minute uneven shape of not more than one micrometer (moth-eye structure) over the lens surface of each optical lens for reducing the interface reflection.

The method of reducing the interface reflection at the lens surface of each optical lens is not limited to the above-described example.

(4) The emission wavelength of the light source section is not limited to visible light. A light-emitting element which is capable of emitting at ultraviolet or infrared wavelengths may be used.

(5) In the embodiment described hereinabove, the shape of each lens is a shape of rotational symmetry, although the present invention is not limited to this example. It may be a lenticular shape evenly extending in the depth direction of the drawing. In this case, the effects are achieved only in a direction parallel to the lens cross-sectional direction of the lenticular-shaped lens. For example, this is suitable to a case where a cold cathode tube or LED lamps which are arranged in series are used as the light source. Combining a stick-shaped light source section and a lenticular-shaped optical lens enables the uniform illumination region to have a rounded rectangular shape.

Hereinafter, still another embodiment of the present invention is described.

[Embodiment for Preventing Occurrence of Coloring and Stray Light at Periphery of Illumination Region]

An illumination region with uniform intensity can be realized by using the lighting device that has the above-described configuration. However, on the other hand, at the periphery of the illumination region, an annular colored region of a different color from the central area of the illumination region (yellow ring) is sometimes observed. This is probably attributed to chromatic aberration caused by the lens.

A fact which has been known separately from the above is that, in the field of LED lighting devices, light containing a large amount of yellow components reaches the periphery of the illumination region so that the color is more yellowish at positions closer to the periphery of the illumination region, and it is observed as chromaticity unevenness across the entire illumination region (color irregularity). Further, it was found that increase of the yellow components in the light projected onto the periphery of the illumination region is superposed on the chromatic aberration caused by the lens, so that the yellow ring formed has more intense color. Furthermore, at the periphery of the illumination region, stray light is sometimes observed due to unintended reflection or scattering of light which occurs in an optical system.

The cause of formation of a region of a different tinge at the periphery of the illumination region is now described.

Figure 33:
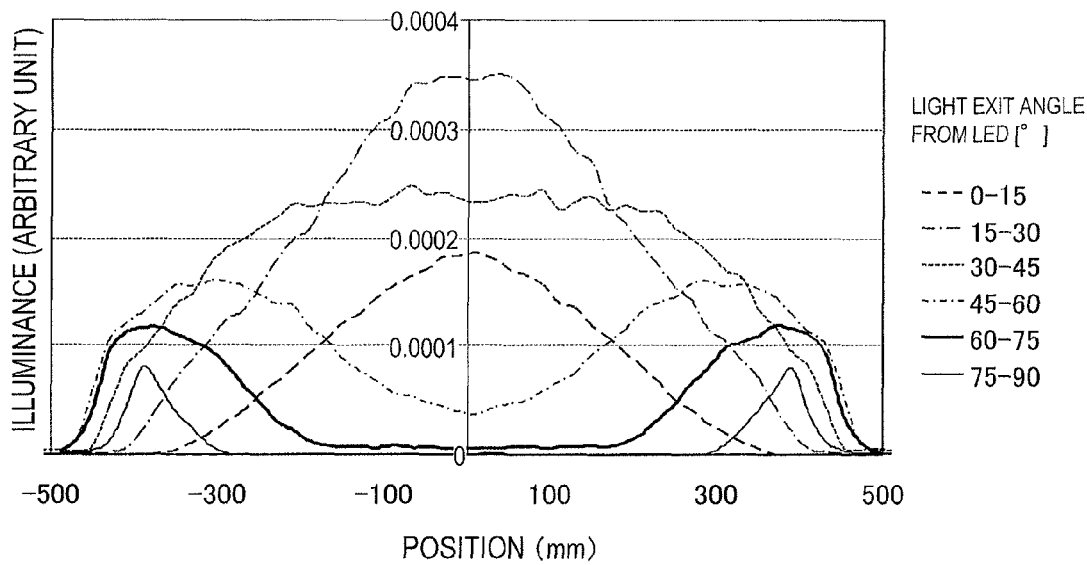
FIG. 33 A graph showing the relationship between the light exit angle from LEDs and the illuminance distribution across an illumination region.

FIG. 33 is a graph showing the relationship between the light exit angle from LEDs and the illumination position in the case where light from a surface light source 1 which is configured using the LEDs is projected via a lens. As seen from FIG. 33, light projected in a generally frontal direction (light exit angle: 0 to 30°) exhibits a mountain-like intensity distribution with a peak occurring at the central area of the illumination region. On the other hand, light projected at a wider light exit angle exhibits such an intensity distribution that the intensity is greater at the peripheral area of the illumination region. Particularly, light projected at the light exit angle of 60° to 90° rarely reaches the central area of the illumination region, and large part of the light is projected onto the periphery of the illumination region.

Figure 34:
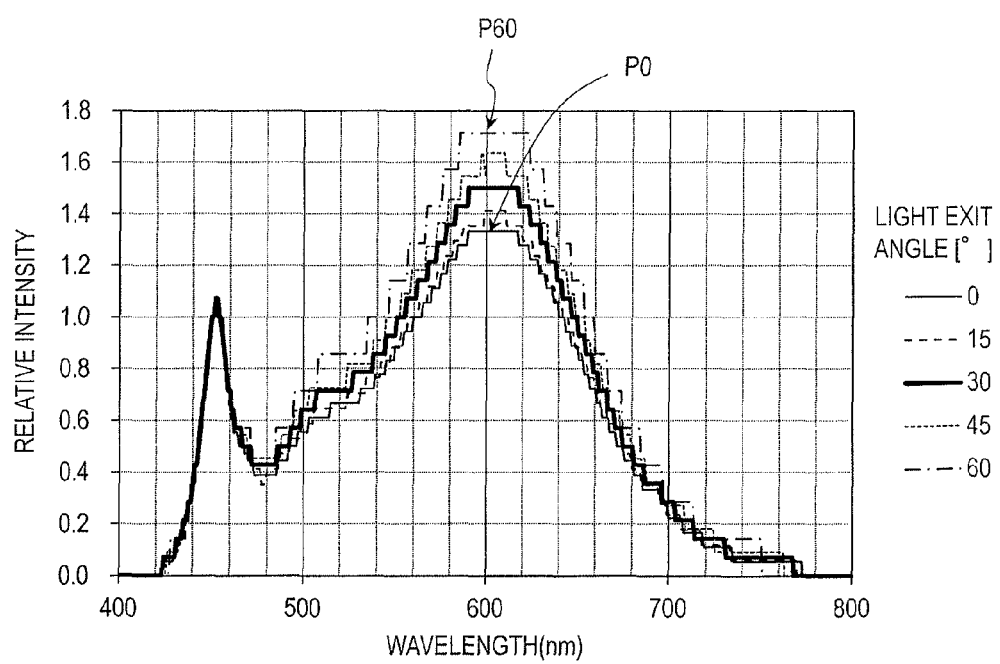
FIG. 34 A graph showing the relationship between the light exit angle from LEDs and the optical spectrum intensity.

As shown in FIG. 34, the light emitted from the LEDs has the optical spectrum which varies depending on its light exit angle. More specifically, peak P60 of the relative intensity of light with a large light exit angle (about 60°) at the wavelength of about 610 nm is larger than peak P0 of the relative intensity of light in the frontal direction (light exit angle: 0°) at the wavelength of about 610 nm. This is probably because light with a large light exit angle is obliquely incident upon a phosphor which is provided so as to cover the LEDs, so that the distance of passage of the light through the phosphor is long as compared with orthogonally incident light, and as a result, the probability of fluorescence increases.

As seen from the above description, light emitted from the LEDs with a large light exit angle contains a relatively large portion of long-wavelength components, and large part of the light reaches the periphery of the illumination region. As a result, a region which is yellowish as compared with the central area of the illumination region is formed at that periphery.

Not only the yellow ring but also unintended reflection or scattering of light occurs inside the lighting device, and accordingly, stray light sometimes occurs outside the illumination region.

In the field of lighting devices, illuminating a region other than a predetermined illumination region is not preferred. Embodiments 4-1 to 4-6 which will be described in the following sections are configured to prevent undesirable projected light which could be observed at the periphery of the illumination region such as described above.

Embodiment 4-1: Embodiment with Achromatic Lens

Figure 36:
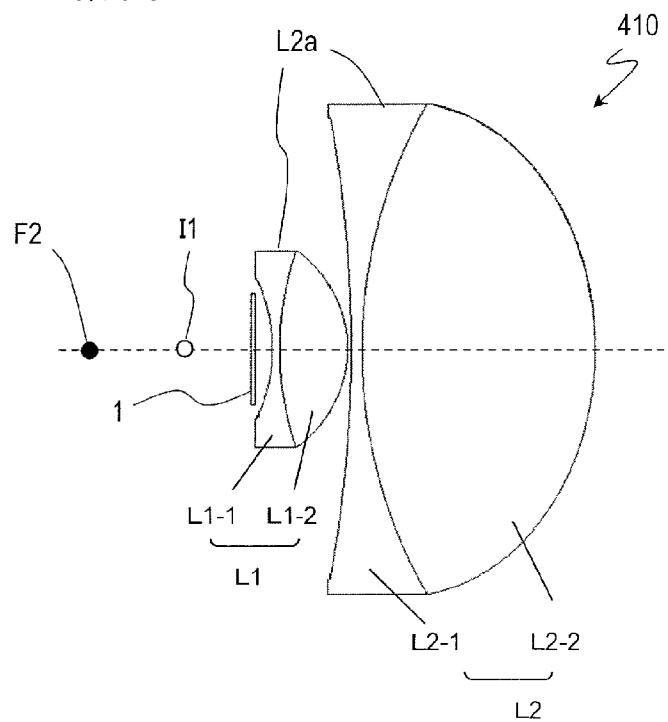
FIG. 36 A diagram showing a lighting device of Embodiment 4-1.

FIG. 36 is a diagram showing a configuration of a lighting device 410 of Embodiment 4-1. The lighting device 410 includes a surface light source 1, a first lens L1 provided on the light exit side of the surface light source 1, and a second lens L2 provided on the light exit side of the first lens L1, as do the lighting devices that have previously been described in Embodiments 1 to 3.

The lighting device 410 is also configured such that light is uniformly projected onto the illumination region as are the lighting devices that have previously been described in Embodiments 1 to 3. More specifically, the optical system is configured such that the virtual image I1 formed by the optical lens L1 is present on the light source side relative to the focal point F2 of the second lens L2. In the present embodiment also, as previously described with reference to FIG. 29, the focal point F2 of the second lens L2 is present on the distal side relative to the reference position f' that is determined in consideration of the size factor ε. This arrangement enables formation of an illumination region with uniform intensity.

Note that, however, in the present embodiment, the first lens L1 is formed by a concave lens L1-1 and a convex lens L1-2 which are arranged so as to be in close contact with each other with no intervening air layer. The concave lens L1-1 and the convex lens L1-2 are made of materials which have different refractive indices. Using two such lenses in combination enables the first lens to function as an achromatic lens which corrects the chromatic aberration.

The second lens L2 is also formed by a concave lens L2-1 and a convex lens L2-2 which are made of different materials and functions as an achromatic lens.

To correct the chromatic aberration, it is necessary to appropriately select the materials of lenses which are to be combined. For example, the concave lenses L1-1, L2-1 are made of a polycarbonate resin (PC) whose refractive index is 1.59 and the convex lenses L1-2, L2-2 are made of a polymethyl methacrylate resin (PMMA) whose refractive index is 1.49.

Note that, however, the concave lenses L1-1, L2-1 and the convex lenses L1-2, L2-2 may be made of other resin materials, or inorganic materials such as glass. Note that, however, to appropriately prevent occurrence of a yellow ring at the periphery of the illumination region, it is preferred that the refractive index difference between the concave and convex lenses that form the achromatic lens is not less than 0.05. Using a material of a relatively high refractive index facilitates decrease of the lens thickness and construction of an optical system which enables easy entry of light from the light source 1.

A conventional achromatic lens is configured such that the chromatic aberration is corrected and image formation is realized with high accuracy on the axis. In the present embodiment, it is not necessary to realize image formation at a specific position, and the directions of light rays of respective wavelengths which are projected onto the periphery of a surface to be illuminated are made closer, whereby the effects are achieved. Therefore, a combination of resin lenses, which are tolerant to a variation of the lens shape due to thermal expansion as compared with a case of conventional, common image formation, and which have large linear expansion coefficients as compared with glass as described above, can be employed.

Table 1 presented below shows specific design examples of the lenses L1-1, L1-2, L2-1, L2-2. Note that in Table 1, "Coordinate" represents the position on the optical axis of the light entry surface of the respective lenses where the position of the light source 1 is the origin and the light exit side is the positive direction. In Table 1, "Conic (light exit side)" represents the value of the conic constant included in an aspherical function which is for defining the aspherical shape in the case where an aspherical lens is used.

TABLE 1

|  | L1-1 | L1-2 | L2-1 | L2-2 |
|---|---|---|---|---|
| Material | PC | PMMA | PC | PMMA |
| Diameter [mm] | 28.0 | 28.0 | 70.0 | 70.0 |
| Thickness [mm] | 1.0 | 9.5 | 1.5 | 33.0 |
| Coordinate [mm] | 2.0 | 3.0 | 13.5 | 15.0 |
| Curvature (light entry side) | 24.0(concave) | 45.0(convex) | 190.0(concave) | 72.0(convex) |
| Curvature (light exit side) | 45.0(concave) | 17.5(convex) | 72.0(concave) | 45.6(convex) |
| Conic (light exit side) | — | — | — | 0.66 |

FIGS. 37(a) and 37(b) are graphs showing the relationship between the distance from the center of the illuminance region and the BR difference (R−B)/(R+B) that is the coloring index, respectively for the lighting device 410 of the present embodiment and a lighting device in which no achromatic lens is used (reference example).

Here, the BR difference refers to (R−B)/(R+B) calculated from the result of measurements of the R-light spectral radiance (relative value) and the B-light spectral radiance (relative value) at respective points where the spectral radiances (normalized radiances) at the illumination region center of B-light (wavelength: 450 nm) and R-light (wavelength: 610 nm) projected onto a white screen are 1.

As shown in FIG. 37(a), in the case where the achromatic lens is used, the BR difference (R−B)/(R+B) exhibits a relatively low value at the periphery of the illumination region which is distant from the center. On the other hand, as seen from FIG. 37(b), in the case where the achromatic lens is not used, (R−B)/(R+B) exhibits a relatively high value at the periphery of the illumination region. As seen from the difference between these graphs, using the achromatic lens enables reduction of coloring at the periphery of the illumination region.

The inventors subjectively evaluated occurrence of the yellow ring. When the BR difference was not more than 0.3, the yellow ring was not visually perceived at the illuminance of 100 lux. When the BR difference was not more than 0.25, the yellow ring was not visually perceived at the illuminance of 50 lux.

Figure 35:
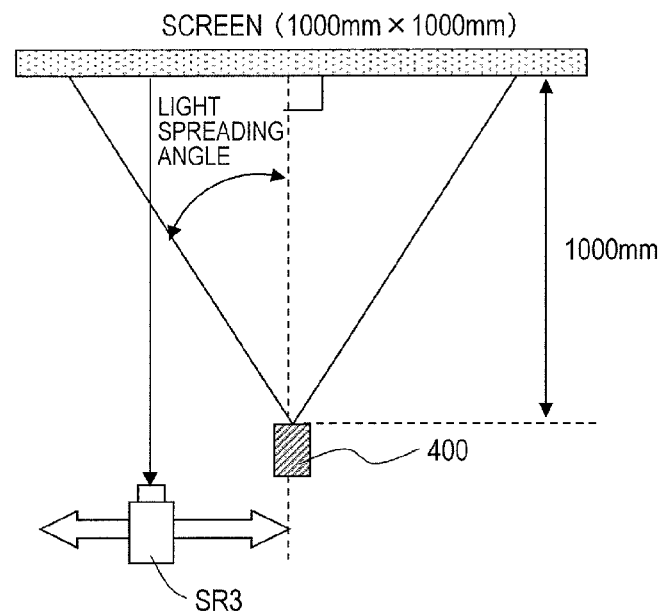
FIG. 35 A diagram for illustrating a measurement method of the spectral radiance.

Note that measurement of the spectral radiance was realized by measuring the spectral radiance at respective points on the screen while horizontally moving a spectral radiance meter SR3 back and forth where the lighting device 410 was placed in a direction normal to the screen as shown in FIG. 35. Measurements of the spectral radiance of 450 nm and 610 nm at the respective points were normalized with respective measurements at the center of the illumination region. From the resultant values, the BR difference (R−B)/(R+B) can be determined.

Hereinafter, a lighting device 412 of a variation of the present embodiment is described.

Figure 38:
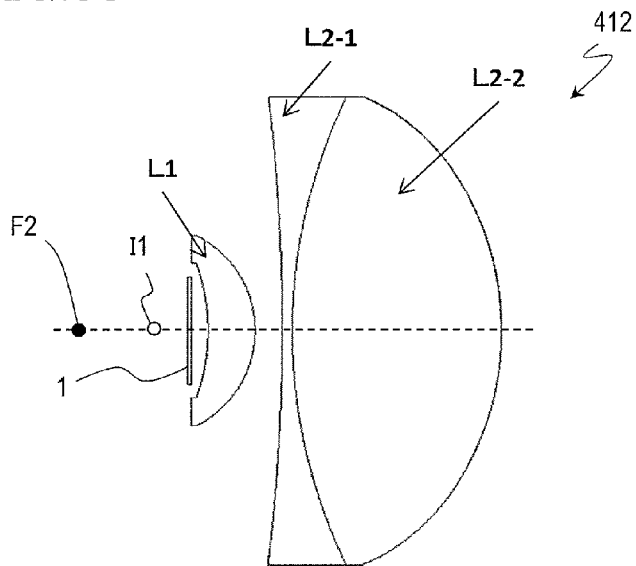
FIG. 38 A diagram showing a lighting device of a variation of Embodiment 4-1.

FIG. 38 shows the lighting device 412 of the variation. The lighting device 412 includes a light source 1, a first lens L1, and a second lens L2. In this variation, the first lens L1 is formed by a single meniscus lens, and only the second lens L2 is formed by an achromatic lens which is realized by a combination of a concave lens L2-1 and a convex lens L2-2. Note that, in this variation also, the optical system is designed such that a virtual image formed by the first lens L1 is present on the light source side relative to the focal point F2 of the second lens L2.

In this variation also, as shown in FIG. 38, the RB difference (R−B)/(R+B) exhibits a relatively low value at the periphery of the illumination region. Only by thus using an achromatic lens as the second lens L2, occurrence of the yellow ring can be appropriately prevented.

Table 2 presented below shows specific design examples of the lenses L1, L2-1, L2-2. In Table 2, "Conic (light exit side)" represents the value of the conic constant in the case where an aspherical lens is used.

TABLE 2

|  | Lens 1 | Lens 2-1 | Lens 2-2 |
|---|---|---|---|
| Material | PMMA | PC | PMMA |
| Diameter [mm] | 30.0 | 70.0 | 70.0 |
| Thickness [mm] | 7.0 | 1.5 | 31.0 |
| Coordinate [mm] | 2.5 | 13.5 | 15.0 |
| Curvature (light entry side) | 30.0(concave) | 300.0(concave) | 80.0(convex) |
| Curvature (light exit side) | 16.0(convex) | 80.0(concave) | 45.5 (convex) |
| Conic (light exit side) | — | — | 0.52 |

In the lighting device 412 of the variation, the steps of joining the lenses are reduced, which is an advantage in manufacture. Further, since a smaller number of lenses are joined together, a large tolerance can be secured in design.

Note that part of light incident upon an end face of the concave lens L2-1 that is a constituent of the second lens passes through the end face as it is. There is a probability that such a light component does not reach the illumination region but constitutes stray light. In view of such, a light absorbing layer or reflection layer may be provided on the end face of the concave lens L2-1 for the purpose of preventing stray light.

Although in the above description of the variation an achromatic lens is used as the second lens L2, it is possible that an achromatic lens is used as the first lens L1 while an achromatic lens is not used as the second lens. However, in this case, light passing through the second lens L2 is affected by refractive index wavelength dispersion, so that the chromatic aberration is not appropriately corrected in some cases. Therefore, it is preferred that an achromatic lens is used at least as the second lens L2.

Note that it is also possible that a diffraction lens is used as the second lens L2. In this case, the thickness and weight of the second lens L2 can be reduced.

Figure 39:
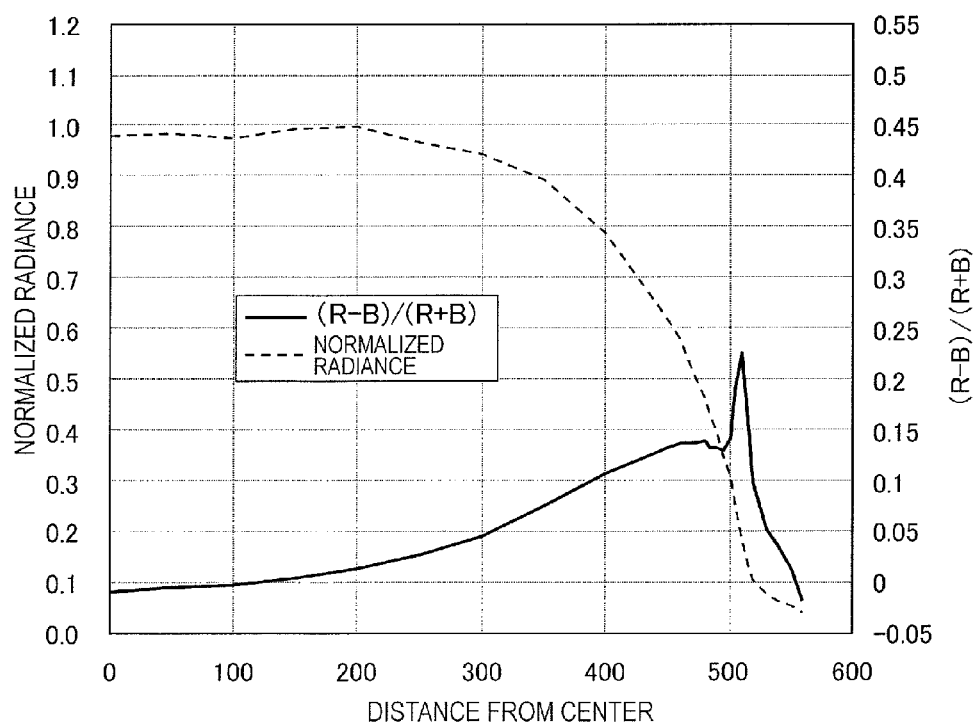
FIG. 39 A graph showing the distribution of the BR difference in the lighting device shown in FIG. 38.

FIG. 39 shows the BR difference measured at an illumination region formed by the lighting device 412. As seen from FIG. 39, even when an achromatic lens is used only for the L2 lens, the BR difference (R−B)/(R+B) exhibits a relatively low value at the periphery of the illumination region which is distant from the center. Therefore, occurrence of the yellow ring is appropriately prevented.

In the lighting device of the present embodiment, it is only necessary to configure the lens such that light passing through the perimeter portion of the lens has reduced chromatic aberration. It is not necessarily required to correct the chromatic aberration of light passing through a portion near the optical axis.

In still another variation which will be described in the following section, only the perimeter portion of the lens has the form of an achromatic lens.

Figure 40:
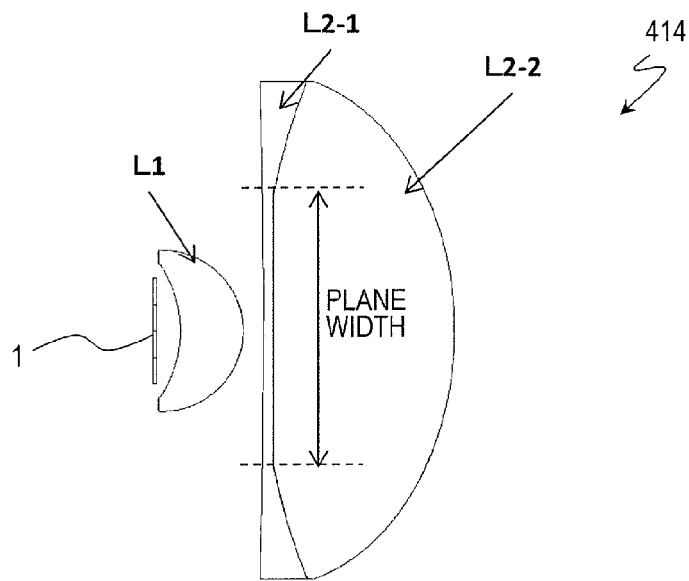
FIG. 40 A diagram showing a lighting device of another variation of Embodiment 4-1.

FIG. 40 shows a lighting device 414 of this variation. A region in which achromat is necessary (hereinafter, sometimes referred to as "achromatic portion") may be the perimeter edge portion of the lens surface. For example, when considered along the lens radius, the perimeter side half (e.g., 50%) of the lens may have the form of an achromatic lens. Accordingly, as another advantage, reduction in thickness and weight of the achromatic lens is realized.

Table 3 presented below shows specific design examples. In the lighting device 414, the thickness of the concave lens L2-1 of the second lens L2 at around the optical axis (lens central portion) is set to 0.8 mm. Note that, however, the lens L2-1 may have a thickness of 0 mm at the lens central portion, i.e., may have a doughnut shape with an empty space at the central portion. This is because the BR difference at the periphery of the illumination region can be reduced only by providing achromat at least to light passing through the perimeter region of the lens. Note that, in this specification, a lens which only partially has an achromatic portion is also sometimes referred to as "achromatic lens".

TABLE 3

|  | Lens L1 | Lens L2-1 | L2-2 |
|---|---|---|---|
| Material | PC | PC | PMMA |
| Diameter [mm] | 13.0 | 40 | 40.0 |
| Thickness [mm] X on optical axis | 5.0 | 0.8 | 13.6 |
| Coordinate [mm] X on optical axis | 1.5 | 8.3 | 9.1 |
| Curvature (light entry side) | 9.6(concave) | 300.0(concave) | 55.0(convex) |
| Conic (light entry side) | — | — | — |
| Curvature (light exit side) | 6.5(convex) | 80.0(concave) | 28.5 (convex) |
| Conic (light exit side) | — | — | 0.9 |
| Plane width | — | 21.8 mm | 21.8 mm |

As described above, only the perimeter portion of the lens may have the form of an achromatic lens. Even when the chromatic aberration is corrected only at the perimeter portion, occurrence of the yellow ring can be prevented. Note that common achromatic lenses are designed so as to correct the chromatic aberration on the optical axis. In the present configuration, the lens is designed so as to correct the chromatic aberration of off-axis light rays. In this point, the present configuration is different from conventional achromatic lenses.

Figure 41:
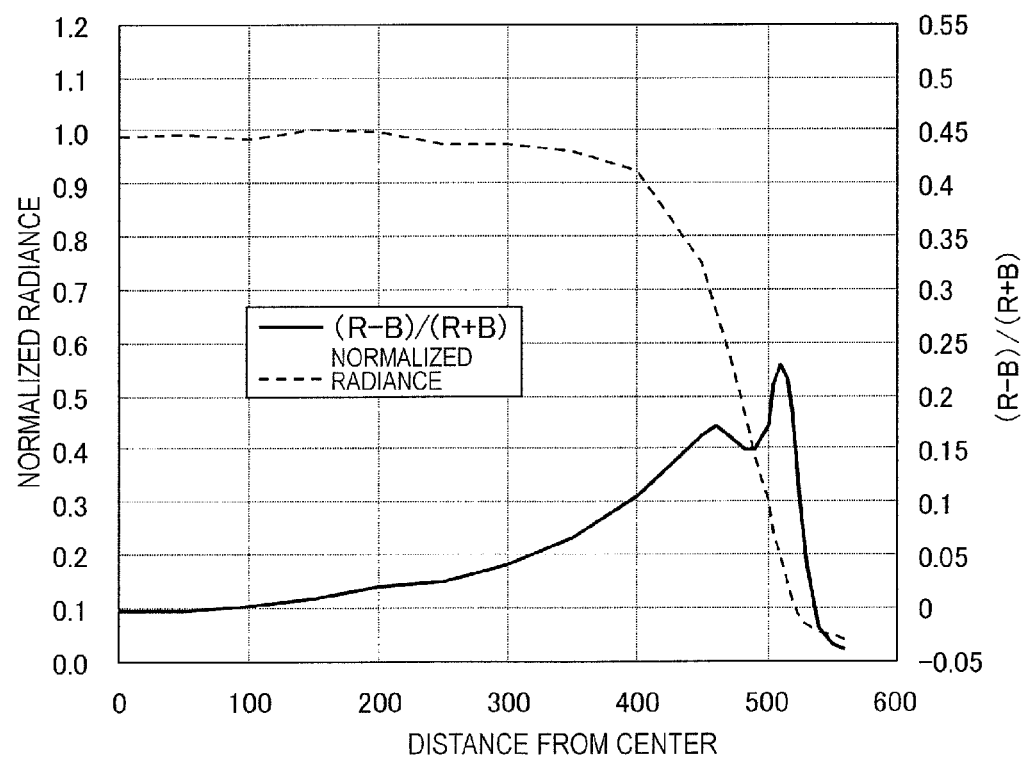
FIG. 41 A graph showing the distribution of the BR difference in the lighting device shown in FIG. 40.

FIG. 41 shows the BR difference measured at the illumination region formed by the lighting device 414. As seen from FIG. 41, even when an achromatic lens is used only at the perimeter portion of the L2 lens, the BR difference (R−B)/(R+B) exhibits a relatively low value at the periphery of the illumination region which is distant from the center. Therefore, occurrence of the yellow ring is appropriately prevented.

Embodiment 4-2: Embodiment with Light Diffusing Layer Provided Between Light Source and Lens FIG. 42(a) shows a portion around the light source 1 included in a lighting device of the present embodiment. On an overmold layer 1b encapsulating a plurality of LED chips 1a, a diffusing layer 40a which has transparency is provided. The diffusing layer 40a has a large number of minute recessed and raised portions which are typically irregularly arranged over its surface.

FIG. 42(b) shows a portion around the light source included in a lighting device of a variation. On an overmold layer 1b encapsulating LED chips 1a, a diffusing layer 40b is provided which is made of a transparent resin containing a plurality of microparticles.

As shown in FIG. 42(c), in the present embodiment, an optical element for scattering or diffusing light is provided between the light source 1 and the first lens L1.

Table 4 presented below shows the periphery chromaticity unevenness, the result of occurrence of coloring, and the light utilization efficiency for examples (a) and (b) corresponding to FIGS. 42(a) and 42(b) and the other examples (c1) to (c5). In the other examples, a diffusing layer is provided between the light source and the first lens as in examples (a) and (b), and the haze value of the diffusing layer is set to a value in the range of 3% to 70%. Table 4 also shows the data of a comparative example where a diffusing layer is provided between the first lens L1 and the second lens L2.

Note that in Table 4, "X" means that chromaticity unevenness or coloring was found, "○" means that chromaticity unevenness or coloring was not found, and "Δ" means that chromaticity unevenness or coloring was slightly found.

TABLE 4

| | Haze [%] | Periphery chromaticity unevenness | Coloring | Efficiency |
|---|---|---|---|---|
| Comparative example | | x | x | 1.00 |
| Example (a) | 20 | ○ | ○ | 0.93 |
| Example (b) | 30 | ○ | ○ | 0.92 |
| Example (c1) | 3 | Δ | Δ | 0.97 |
| Example (c2) | 5 | ○ | ○ | 0.95 |
| Example (c3) | 10 | ○ | Δ | 0.94 |
| Example (c4) | 50 | ○ | Δ | 0.90 |
| Example (c5) | 70 | Δ | x | 0.80 |

As seen from Table 4, when the haze value is 5%, the effect of sufficiently removing the coloring is not achieved. When the haze value is 60%, the effect of coloring removal is achieved, but the efficiency decreases. As seen from the row of the comparative example, when a diffusing layer is provided between the first lens and the second lens, the problems about uniformity of the illumination region, clarity of the boundary of the illumination region, and decrease of the light utilization efficiency are caused.

It was found that, in the configuration of the present embodiment, there is a strong correlation between the light exit angle of light emitted from the light source and the illumination position of that light, which would not be found in conventional lighting devices. And, in this configuration, the light exit angle dependence of this spectrum is visually perceived as chromaticity unevenness at the illuminated surface. This problem is specific to the present configuration. It was found that, to reduce such light exit angle dependence of the spectrum of the light source, providing a light diffusing layer between the first lens and the light source is preferred.

Note that, however, when the haze value is large, the effect of reducing the periphery coloring is achieved, although decrease of the uniformity of the illuminated surface and decrease of the sharpness of the perimeter edge portion occur.

Effective characteristics of the diffusing layer in the light spreading characteristics of this method were evaluated. As a result, it was proved that setting the haze value to a value in the range of 5% to 50% is preferred.

When the haze value is set to a value in the range of 5% to 30%, the effect of removing the color irregularity across the illumination region can also be achieved concurrently with removal of the periphery coloring.

Note that the "haze value" is a value indicative of the "degree of haze". The haze value is defined by the following formula:

$$\text{Haze value } (\%) = (Td/Tt) \times 100$$

where Tt (%) is the total light transmittance and Td (%) is the diffuse transmittance.

Here, the total light transmittance Tt is the ratio of the total intensity of diffusely transmitted light and parallel transmitted light to the intensity of incident light (parallel light ray). The diffuse transmittance Td is the ratio of the intensity of diffusely transmitted light to the intensity of incident light (parallel light ray). As the haze value decreases, the lightness of the light diffusing layer increases. As the haze value increases, the light diffusing layer has a higher degree of haze. The haze value can be measured by, for example, an integrating sphere-based light transmittance measuring device.

Embodiment 4-3: Relationship Between Arrangement Range of Phosphor and Pitch of Light Source FIG. 43(a) shows a common light source (comparative example) for use in a LED lighting device. FIGS. 43(b) to 43(e) show various light sources for use in a lighting device of the present embodiment.

In each light source, a plurality of LEDs are arranged so as to be separated from one another with the interval of pitch P. Further, the light source includes a phosphor together with the LEDs. The phosphor is in the form of, for example, a layer covering the plurality of LEDs such that the phosphor receives light from the LEDs to appropriately produce fluorescence.

Here, as shown in each of FIGS. 43(a) to 43(e), A and B are respectively the longest one and the shortest one of the distances between the LEDs at the outermost positions and the edge of the phosphor which is located outward of these LEDs. Here, as shown in FIGS. 43(b) to 43(e), it is preferred that both A≤P and B≤P hold where P is the arrangement pitch of the LED chips (which is the average in the case where the arrangement is irregular or there are two or more different pitches). Note that the arrangement of the LED chips is not limited to those shown in the drawings.

In the comparative example shown in FIG. 43(a), both A≥P and B≥P hold. When a phosphor region outside the LED chips is large, the spectrum in that region is likely to have a relatively large amount of yellow components. This is one of the causes of occurrence of the yellow ring in the illumination region.

On the other hand, as shown in FIG. 43(b), by reducing the phosphor formation region outside the LEDs (here, B≤P), the yellow ring can be reduced. Note that, however, in the example shown in FIG. 43(b), the corner portions and the other portions have different phosphor formation regions. As a result, a gradation of the yellow ring occurs around the illumination region in some cases.

Therefore, as a more preferred embodiment, as shown in FIGS. 43(c) and (d), at an arbitrary position, the distances to the edge of the phosphor formation regions outside the LEDs are generally equal and are not more than pitch P (i.e., both A≤P and B≤P hold), whereby the yellow ring can be effectively reduced. Further, as shown in FIG. 43(e), a light blocking layer may be formed such that the emission surface of the phosphor is equal to that of FIG. 43(d).

As described above, the emission region of the phosphor and the arrangement pitch P of the LEDs are appropriately set, whereby the yellow components in the spectrum of light emitted from the perimeter portion of the light source can be reduced, and occurrence of the yellow ring and the chromaticity unevenness can be prevented.

Figure 44:
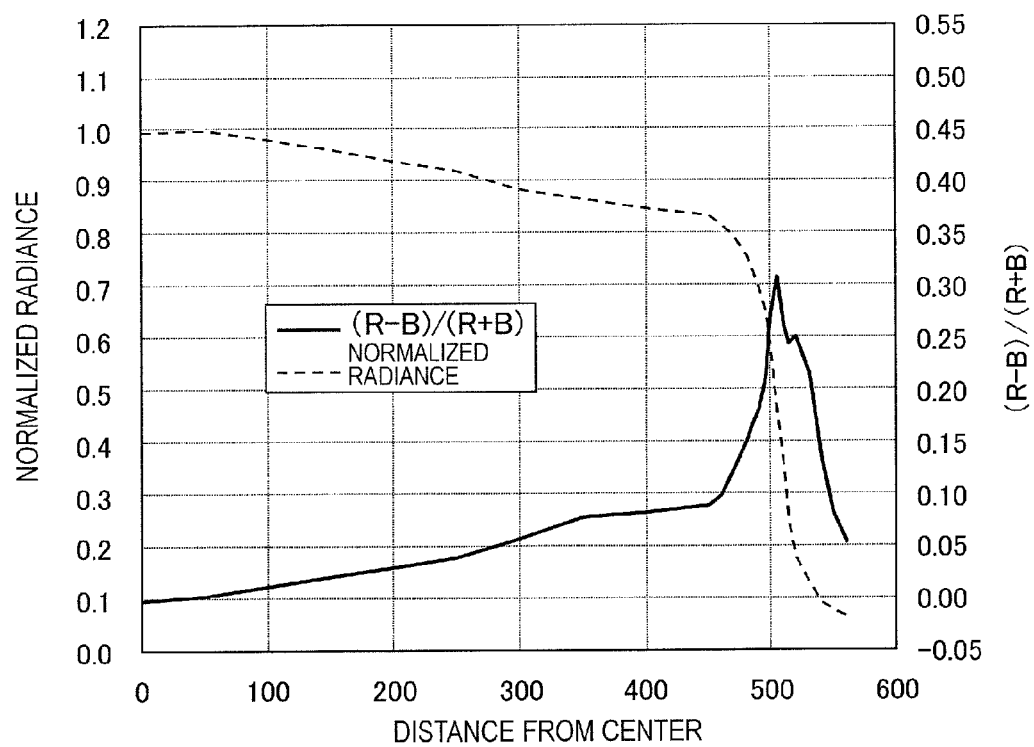
FIG. 44 A graph showing the distribution of the BR difference in the lighting device shown in FIG. 43(c).

FIG. 44 shows the BR difference measured at an illumination region which is formed when the light source shown in FIG. 43(c) is used. As seen from FIG. 44, the BR difference (R−B)/(R+B) exhibits a relatively low value at the periphery of the illumination region which is distant from the center. Therefore, occurrence of the yellow ring is appropriately prevented.

Embodiment 4-4: Embodiment with Lens Hood

Figure 47:
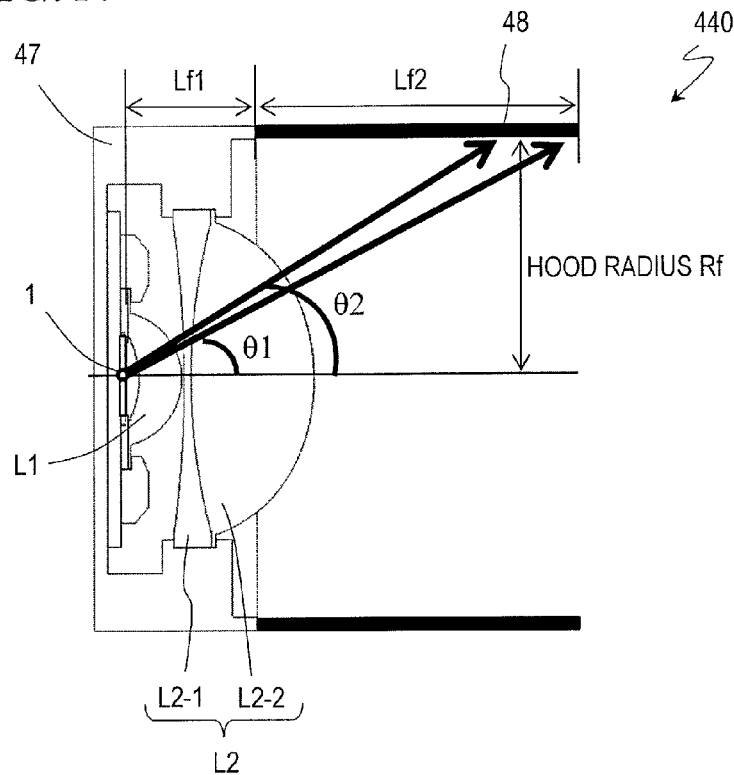
FIG. 47 A diagram showing a lighting device of Embodiment 4-4.

In the present embodiment, as shown in FIG. 47, a cylindrical hood 48 as a light blocking member is provided on the light exit side of a lighting device 440. As will be described later, by appropriately adjusting the length Lf2 of the hood 48 according to the distribution angle of light emitted from the lighting device 440, stray light occurring at the periphery of the illumination region can be prevented while high light utilization efficiency is maintained.

First, before description of the details of the lighting device of the present embodiment, stray light which is to be blocked by the hood 48 is described.

Figure 45:
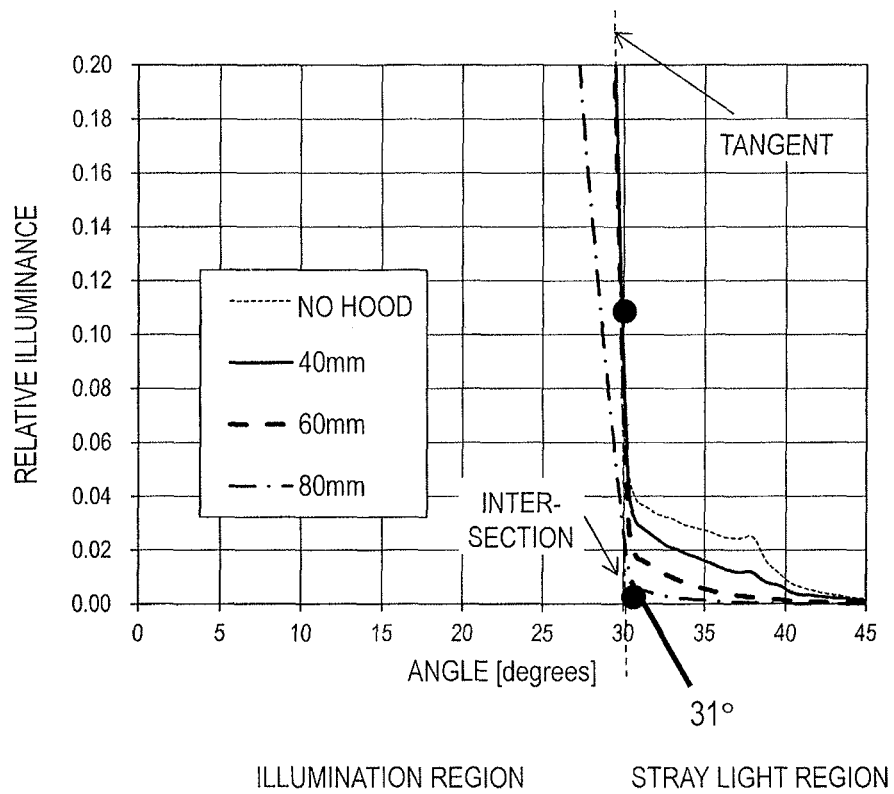
FIG. 45 A graph showing the relative illuminance at the periphery of the illumination region.

FIG. 45 shows the relative illuminance at the periphery of the illumination region. In a lighting device which forms a uniform illumination region as described above, the illuminance sharply decreases at the edge portion of the illumination region. However, a stray light region is formed by stray light around the illumination region.

The stray light is considered to be produced by unintended reflection of light in an optical system or light passing through an end face of a lens. Such stray light is to be observed around the intended illumination region, and preventing occurrence of the stray light is desired in the lighting device.

The definitions of "illumination region", "stray light region", "stray light ratio" used in this specification are now described.

Figure 46:
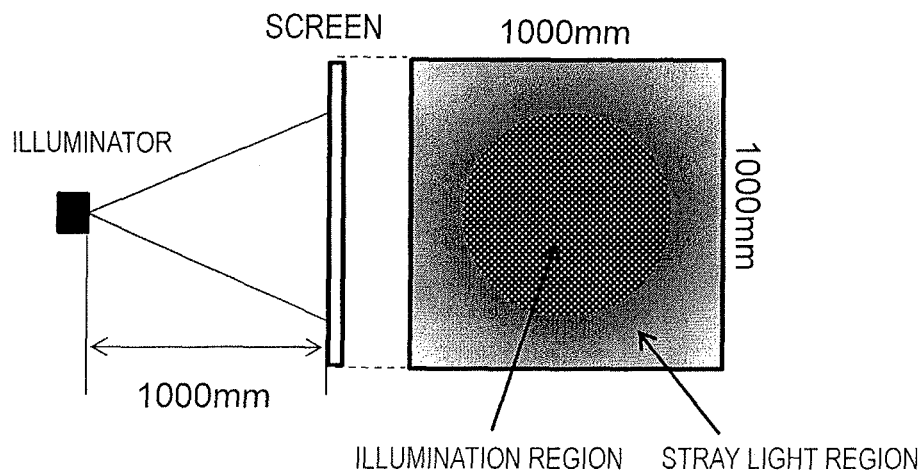
FIG. 46 A diagram for illustrating the definitions of the illumination region, the stray light region, and the stray light ratio.

The illumination region means a region inside the intersection of the tangent of relative illuminance 0.10 and the X-axis (angle) in an angle-relative illuminance graph shown in FIG. 45 in the case where light is projected onto a screen (size: 1 m×1 m) which is 1 m distant from the lighting device as shown in FIG. 46.

The stray light region means a region outside the illumination region that is defined as described above.

The stray light ratio means the ratio of the stray light to the total projected light, which is expressed by the luminous flux of the stray light region/(the luminous flux of the illumination region+the luminous flux of the stray light region).

Next, the lighting device 440 of the present embodiment is described with reference to FIG. 47.

The lighting device 440 includes a light source 1, a first lens L1, and a second lens L2 which is an achromatic lens, as described above in Embodiment 4-1. The second lens L2 is formed by a concave lens L2-1 and a convex lens L2-2 which is combined with the concave lens L2-1. The light source 1, the first lens L1, and the second lens L2 are contained in the storage space of a casing 47.

Table 5 presented below shows design examples of the first lens and the second lens. Note that, as a matter of course, various other designs are possible. In the table, "Aspheric Coefficient $4^{th}$ Order" and "Aspheric Coefficient $6^{th}$ Order" respectively represent aspheric coefficients of the $4^{th}$ order and $6^{th}$ order terms for defining the aspherical surface in the case where an aspherical lens is used.

TABLE 5

|  | L1 | L2-1 | L2-2 |
|---|---|---|---|
| Material | PC | PC | PMMA |
| Diameter [mm] | 30.0 | 70.0 | 70.0 |
| Thickness [mm] | 9.5 | 1.5 | 27.0 |
| Coordinate [mm] | 2.5 | 12.5 | 14.0 |
| Curvature (light entry side) | 30.0(concave) | 260.0(concave) | 140.0(convex) |
| Conic (light entry side) | — | — | — |
| Curvature (light exit side) | 15.0(convex) | 140.0(concave) | 48.0 (convex) |
| Conic (light exit side) | — | — | 0.72 |
| Aspheric Coefficient $4^{th}$ Order | — | — | $5.0 \times 10^{-8}$ |
| Aspheric Coefficient $6^{th}$ Order | — | — | $1.5 \times 10^{-9}$ |

The lighting device 440 further includes the hood 48 which is arranged so as to surround the perimeter of the light exit surface of the second lens L2. The hood 48 is secured to the casing 47. The hood 48 is made of, for example, a resin or a metal material and is typically configured such that its inner surface side absorbs light.

In the conventional lighting devices, providing a hood for controlling the illumination range is a common solution. However, providing a hood in the conventional lighting devices causes a large loss of the projected light. This is because the light spreading characteristic of the conventional light projection devices is a Gaussian distribution.

Figure 48:
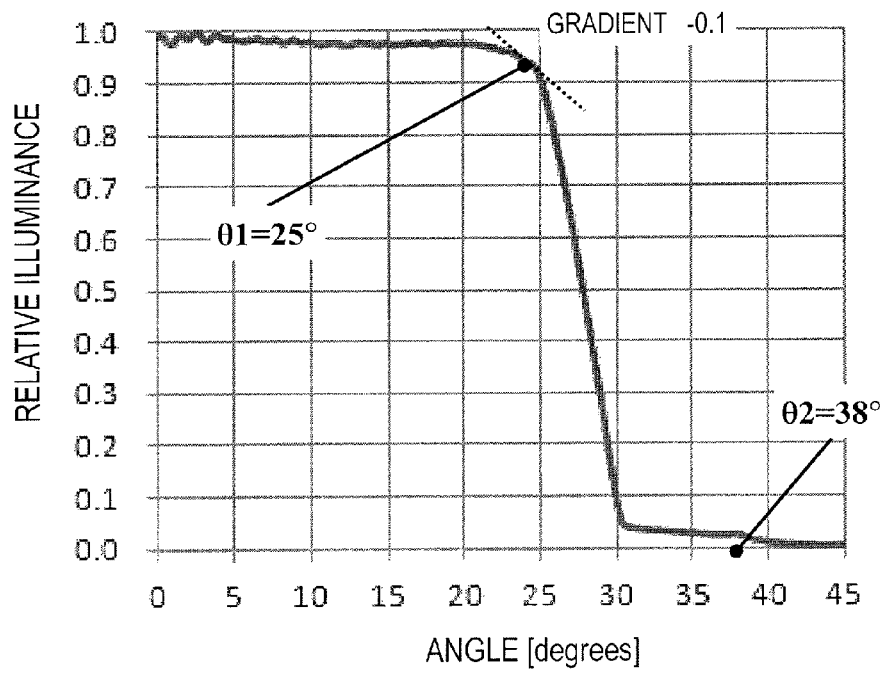
FIG. 48 A graph showing the relative illuminance in an illumination region and a stray light region.

On the other hand, in the lighting device 440, for example, as seen from FIG. 48, generally uniform illuminance is realized inside a predetermined illumination region, and the illuminance sharply decreases outside the illumination region. As for such projected light, providing the hood 48 enables prevention of loss of light projected onto the illumination region and effective reduction of the stray light.

The length Lf2 of the hood 48 is now described.

If the hood 48 is excessively long, not only the stray light but also part of the projected light is absorbed or scattered, so that the light utilization efficiency largely decreases. On the other hand, if the hood 48 is excessively short, the stray light reaching the periphery of the illumination region cannot be prevented.

For example, as seen from Table 6 presented below, when no hood is provided, the light utilization efficiency improves, while the stray light ratio is large so that the stray light cannot be sufficiently prevented. In view of such, when a hood with a length of 40 mm or 60 mm is provided as shown in Examples 4(a) and 4(b), the stray light can be prevented without greatly deteriorating the light utilization efficiency, so that the stray light ratio is not more than 3%. Note that, however, if the hood length is as long as 80 mm, the light utilization efficiency largely decreases, and it is not preferred in some cases.

TABLE 6

|  | Hood Length | Efficiency | Stray Light Ratio |
|---|---|---|---|
| Comparative Example 4(a) | no hood | 94% | 3.56% |
| Example 4(a) | 40 mm | 92% | 2.21% |
| Example 4(b) | 60 mm | 85% | 0.88% |
| Example 4(b) | 80 mm | 68% | 0.15% |

Hereinafter, more detailed designs of a more specific hood length are described.

The length of the hood may be determined according to the light exit angle θ1, the light exit angle θ2, and the hood radius Rf shown in FIG. 47.

Here, the upper limit L2y of the length of the hood can be defined using the light exit angle θ1 at which the relative illuminance on the screen sharply decreases. For example, θ1 may be set to the smallest one of angles at which the gradient of the angle-relative illuminance graph shown in FIG. 48 is smaller than −0.1. For example, when the illuminance distribution such as shown in FIG. 48 is achieved, θ1 is 25°.

The upper limit L2y of the hood length can be determined using this light exit angle θ1 by the following formula:

$$L2y = Rf/\tan\theta1 - Lf1$$

Here, Lf1 is the distance along the optical axis from the surface light source 1 to the edge of the casing (the connecting portion with the hood 48). That is, the distance along the optical axis from the surface light source 1 to the end of the hood is Lf1+Lf2.

If the hood is longer than the upper limit L2y, light which is to reach the illumination region would be blocked by the hood. Therefore, the light utilization efficiency largely decreases, and there is a probability that a sharp fall of the illuminance at the edge of the illumination region cannot be realized.

On the other hand, the lower limit L2s of the length of the hood can be defined using the light exit angle θ2 at which the above-described stray light ratio (=the luminous flux of the stray light region/(the luminous flux of the illumination region+the luminous flux of the stray light region)) is not more than 1%. When the illuminance distribution such as shown in FIG. 48 is achieved, for example, θ2 is determined by measurement of the illuminance to be θ2=38°, at which the stray light ratio is 1%.

The lower limit L2s of the hood length can be determined using this light exit angle θ2 by the following formula:

$$L2s = Rf/\tan\theta2 - Lf1$$

If the hood is shorter than the lower limit L2s, almost no part of the light reaching the periphery of the illumination region is blocked by the hood. Thus, when the hood has a length of not more than the lower limit L2y, the hood can hardly block the stray light occurring at the periphery of the illumination region.

As described above, the length L2f of the hood itself (or the distance L1f+L2f along the optical axis from the surface light source to the hood edge) is preferably set so as to satisfy the following formula:

$$Rf/\tan\theta2 - Lf1 < Lf2 < Rf/\tan\theta1 - Lf1$$

An example is now described. When Lf2 is set to a value in the range of 36.0 mm<Lf2<79.2 mm in the case where θ1=25°, θ2=38°, Lf1=28 mm, and Rf=50 mm, the stray light at the periphery of the illumination region can be effectively prevented without decreasing the light utilization efficiency. Note that when rewritten with the distance Lf1+Lf2 from the light source to the end of the hood, it is preferred that the length of the hood, for example, is appropriately set so as to satisfy 64.0 mm<Lf1+Lf2<107.2 mm.

Thus, in the lighting device of the present embodiment, the light spreading characteristic is not a Gaussian distribution, and the stray light region and the illumination region are distinguished from each other. Therefore, by determining the shape of the hood so as to have an appropriate configuration, only the stray light can be efficiently reduced.

Embodiment 4-5: Embodiment with Reflection Layer Over Lens Surface

Figure 49:
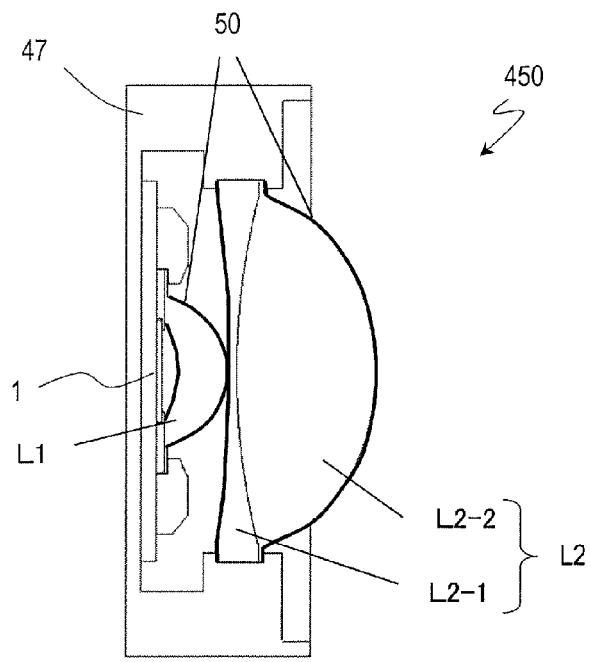
FIG. 49 A diagram showing a lighting device of Embodiment 4-5.

In the present embodiment, as shown in FIG. 49, antireflection layers 50 (hereinafter, sometimes referred to as "AR layers 50") are provided over the light entry side surface and/or light exit side surface of the first lens L1 of a lighting device 450, and over both side surfaces of the second lens L2.

Table 7 presented below shows the stray light ratio, the light utilization efficiency, etc., for the cases where the AR layer 50 is provided over either of the light exit side surface of the first lens L1, the light entry side surface of the first lens L1, and the both side surfaces of the second lens L2. Note that the "Cup Reflectance" in Table 7 refers to the reflectance of the inside surface of the casing 47 that contains the first lens L1 and the second lens L2. The cup resistance is set to 90% in all the examples because an antireflection treatment is not particularly provided in the present embodiment.

An embodiment in which an AR layer is not provided to any of the first lens L1 and the second lens L2 is shown as Comparative Example 5. The table shows that when an AR layer is not provided, the reflectance of the lens surface is 4%.

In Examples 5(a) to 5(c), the AR layers 50 are arranged such that the reflectances of the light exit side surface of the first lens L1 are 2%, 1%, and 0.5%, respectively. Note that the reflectances shown in the table are front reflectances in a D65 light source.

In Examples 5(d) to 5(f), the AR layers 50 are arranged such that both reflectances of the light exit side surface and the light entry side surface of the first lens L1 are 2%, 1%, and 0.5%.

In Examples 5(g) to 5(i), the AR layers 50 are arranged such that both reflectances of the light exit side surface and the light entry side surface of the first lens L1 and both reflectances of the light exit side surface and the light entry side surface of the second lens L2 are 2%, 1%, and 0.5%.

TABLE 7

| | L1 Exit Side Reflectance | L1 Entry Side Reflectance | L2 Both Side Reflectance | Cup Reflectance | Stray Light Ratio | Efficiency |
|---|---|---|---|---|---|---|
| Comparative Example 5 | 4% | 4% | 4% | 90% | 3.56% | 94.0% |
| Example 5(a) | 2% | 4% | 4% | 90% | 2.05% | 94.8% |
| Example 5(b) | 1% | 4% | 4% | 90% | 1.62% | 95.0% |
| Example 5(c) | 0.5% | 4% | 4% | 90% | 1.41% | 95.1% |
| Example 5(d) | 2% | 2% | 4% | 90% | 2.02% | 95.8% |
| Example 5(e) | 1% | 1% | 4% | 90% | 1.58% | 96.1% |
| Example 5(f) | 0.5% | 0.5% | 4% | 90% | 1.36% | 96.3% |
| Example 5(g) | 2% | 2% | 2% | 90% | 1.39% | 97.6% |
| Example 5(h) | 1% | 1% | 1% | 90% | 0.70% | 98.7% |
| Example 5(i) | 0.5% | 0.5% | 0.5% | 90% | 0.36% | 99.2% |

Design examples of the respective lenses in the present embodiment are shown in Table 8 presented below.

TABLE 8

| | L1 | L2-1 | L2-2 |
|---|---|---|---|
| Material | PC | PC | PMMA |
| Diameter [mm] | 30.0 | 70.0 | 70.0 |
| Thickness [mm] | 9.5 | 1.5 | 27.0 |
| Coordinate [mm] | 2.5 | 12.5 | 14.0 |
| Curvature (light entry side) | 30.0(concave) | 260.0(concave) | 140.0(convex) |
| Conic (light entry side) | — | — | — |
| Curvature (light exit side) | 15.0(convex) | 140.0(concave) | 48.0 (convex) |
| Conic (light exit side) | — | — | 0.72 |
| Aspheric Coefficient $4^{th}$ Order | — | — | $5.0 \times 10^{-8}$ |
| Aspheric Coefficient $6^{th}$ Order | — | — | $1.5 \times 10^{-9}$ |

In the present embodiment, the first lens L1 is the closest lens to the light source. Note that FIG. 49 shows an embodiment where a meniscus lens is used as the first lens L1, although the present invention is not limited to this embodiment. When an achromatic lens formed by two lenses, a concave lens and a convex lens, is used as the first lens L1, the integrated piece can be regarded as the first lens L1. When the optical system is formed using three or more lenses, a lens which is closest to the light source may be regarded as the first lens L1 while either one of the other lenses is regarded as the second lens L2.

As seen from FIG. 49, in the lighting device 450 of the present embodiment, there are at least four interfaces between the lenses and the air. In general, providing an antireflection layer causes increase of the manufacturing steps and increase of the manufacturing cost.

For the purpose of specifying the most preferred face at which the antireflection layer is to be provided, the source of the stray light was analyzed. As a result, it was found that about 80% or more of the stray light was attributed to reflection by the lens-air interface at the light exit side surface of the first lens L1. Thus, it is preferred that an antireflection layer is provided at least at the illuminated surface side of the first lens L1.

As seen from the rows of Example 5(a) to 5(c) of Table 7 presented above, by providing an antireflection layer only on the illuminated surface side of the first lens L1, increase of the manufacturing cost can be prevented while the stray light ratio is sufficiently decreased. These configurations are advantageous in respect of the manufacturing cost particularly when the AR layers are formed by deposition.

As seen from the rows of Example 5(d) to 5(i) of Table 7 presented above, the stray light ratio can be further decreased by further providing AR layers over the other lens surfaces. Note that these configurations are advantageous particularly when the AR layers are formed by a DIP method because it would not largely increase the manufacturing cost.

Figure 50:
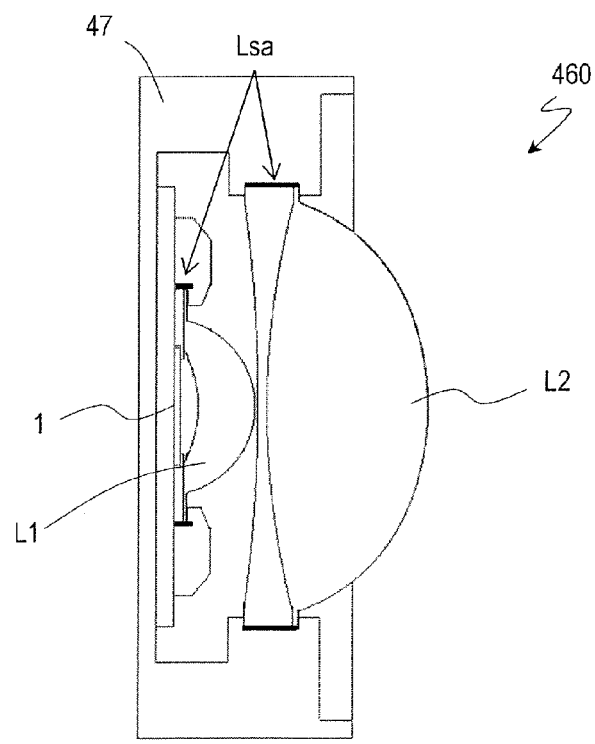
FIG. 50 A diagram showing a lighting device of Embodiment 4-6.

Embodiment 4-6: Embodiment with Light Absorbing Layer Over Perimeter Edge Surface or Inside of Casing In a lighting device 460 of the present embodiment shown in FIG. 50, absorbing layers Lsa are provided over the perimeter edge surfaces of the first lens L1 and the second lens L2. The "perimeter edge surface" means a lateral surface portion extending around the perimeter edge of the lens (typically, a surface which forms the cylindrical lateral surface). The absorbing layers Lsa are formed by painting the perimeter edge surfaces of the lenses black.

Table 9 presented below shows the data of examples and a comparative example. Comparative Example 6 has a configuration where the AR layers over the lens surfaces and the absorbing layers over the perimeter edge surfaces are not provided. Example 6(a) further includes absorbing layers over the perimeter edge surfaces in addition to the components of Example 5(b). Examples 6(b) and 6(c) further include absorbing layers Lsa over the perimeter edge surfaces in addition to the components of Example 5(e) and Example 5(h). Examples 6(d), 6(e), and 6(f) further include absorbing layers over the perimeter edge surfaces in addition to the components of Examples 5(c), 5(f), and 5(i). Examples 6(g), 6(h), and 6(i) further include an absorbing layer in the cup (the inside of the casing) in addition to the components of Examples 6(b), 6(e), and 6(h). Providing the absorbing layer in the cup reduces the reflectance to 5%.

TABLE 9

|  | L1 Illuminated Surface Side Reflectance | L1 Light Source Side Reflectance | L2 Lens Reflectance | Perimeter Edge Surface Painted Black | Cup Reflectance | Stray Light Ratio | Efficiency |
|---|---|---|---|---|---|---|---|
| Comparative Example 6 | 4% | 4% | 4% | x | 90% | 3.56% | 94.0% |
| Example 6(a) | 1% | 4% | 4% | ○ | 90% | 1.55% | 94.9% |
| Example 6(b) | 1% | 1% | 4% | ○ | 90% | 1.51% | 96.0% |
| Example 6(c) | 1% | 1% | 1% | ○ | 90% | 0.66% | 98.6% |
| Example 6(d) | 0.5% | 4% | 4% | ○ | 90% | 1.34% | 95.0% |
| Example 6(e) | 0.5% | 0.5% | 4% | ○ | 90% | 1.30% | 96.2% |
| Example 6(f) | 0.5% | 0.5% | 0.5% | ○ | 90% | 0.34% | 99.1% |
| Example 6(g) | 1% | 4% | 4% | ○ | 5% | 0.64% | 84.8% |
| Example 6(h) | 1% | 1% | 4% | ○ | 5% | 064% | 90.0% |
| Example 6(i) | 1% | 1% | 1% | ○ | 5% | 0.45% | 96.4% |

As seen from the results of Table 9, providing the absorbing layers over the perimeter edge surfaces can further reduce the stray light so that the stray light ratio can be not more than 1.6%. Note that the stray light can also be reduced by forming scattering perimeter edge surfaces instead of providing the absorbing layers over the perimeter edge surfaces. The reflectance of the absorbing layers provided over the perimeter edge surfaces is preferably set to a value which is not more than 10%. Further, the stray light can also be reduced by decreasing the reflectance inside the casing.

Hereinafter, an embodiment which is realized by combination of Embodiment 4-4 to Embodiment 4-6 is described.

Figure 51:
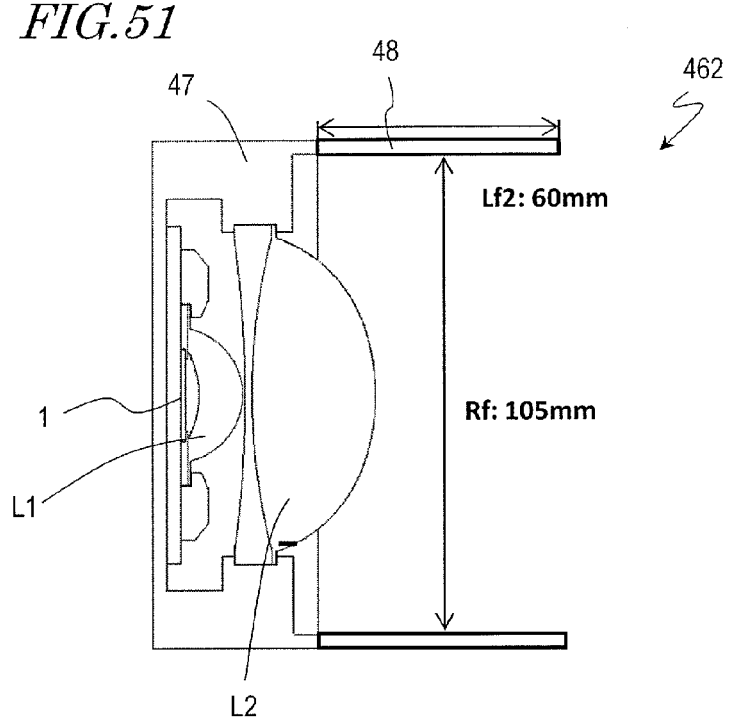
FIG. 51 A diagram showing another lighting device of Embodiment 4-6.

As in the lighting device 462 shown in FIG. 51, the hood described in Embodiment 4-4 is provided, and reflection layers are provided over the lens surfaces as shown in Embodiments 4-5 and 4-6, and/or absorbing layers may be provided over the perimeter edge surfaces.

Table 10 presented below shows the data of Examples 7(a) to 7(h) and Comparative Example 7. The stray light ratio can be considerably reduced by providing AR layers over the lens surfaces, providing absorbing layers over the perimeter edge surfaces and in the cup, and using the hood together (Example 7(h)).

TABLE 10

|  | L1 Illuminated Surface Side Reflectance | L1 Light Source Side Reflectance | L2 Lens Reflectance | Perimeter Edge Surface Painted Black | Hood | Cup Reflectance | Stray Light Ratio | Efficiency |
|---|---|---|---|---|---|---|---|---|
| Comparative Example 7 | 4% | 4% | 4% | x | x | 90% | 3.56% | 94.0% |
| Example 7(a) | 4% | 4% | 4% | x | ○ | 90% | 1.44% | 89.5% |
| Example 7(b) | 1% | 4% | 4% | x | ○ | 90% | 0.87% | 91.8% |
| Example 7(c) | 1% | 1% | 4% | x | ○ | 90% | 0.82% | 92.9% |
| Example 7(d) | 1% | 1% | 1% | x | ○ | 90% | 0.27% | 95.9% |
| Example 7(e) | 1% | 1% | 4% | ○ | ○ | 90% | 0.78% | 92.8% |
| Example 7(f) | 1% | 1% | 1% | ○ | ○ | 90% | 0.25% | 95.8% |
| Example 7(g) | 1% | 1% | 4% | ○ | ○ | 5% | 0.20% | 87.3% |
| Example 7(h) | 1% | 1% | 1% | ○ | ○ | 5% | 0.11% | 93.7% |

Figure 52:
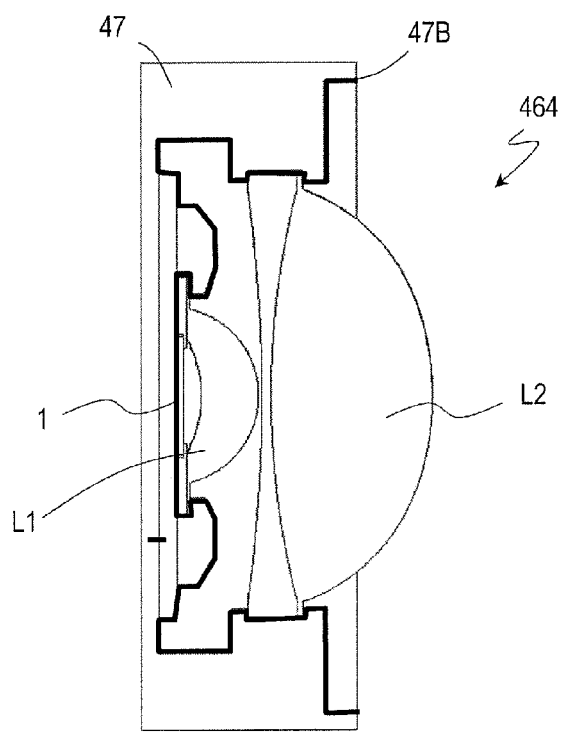
FIG. 52 A diagram showing still another lighting device of Embodiment 4-6.

The stray light can also be reduced by painting the inside of the casing black as in a lighting device 464 shown in FIG. 52. In this case, the stray light ratio can be reduced to a value which is not more than 1.5%. Table 11 presented below shows the data of Examples 8(a) to 8(l) and Comparative Example 8. By painting the inside of the casing black, the cup reflectance decreased from 90% to 5%.

TABLE 11

|  | L1 Illuminated Surface Side Reflectance | L1 Light Source Side Reflectance | L2 Lens Reflectance | Perimeter Edge Surface Painted Black | Hood | Cup Reflectance | Stray Light Ratio | Efficiency |
|---|---|---|---|---|---|---|---|---|
| Comparative Example 8 | 4% | 4% | 4% | x | x | 90% | 3.56% | 94.0% |

TABLE 11-continued

|  | L1 Illuminated Surface Side Reflectance | L1 Light Source Side Reflectance | L2 Lens Reflectance | Perimeter Edge Surface Painted Black | Hood | Cup Reflectance | Stray Light Ratio | Efficiency |
|---|---|---|---|---|---|---|---|---|
| Example 8(a) | 4% | 4% | 4% | x | x | 5% | 2.45% | 82.8% |
| Example 8(b) | 2% | 4% | 4% | x | x | 5% | 1.09% | 84.4% |
| Example 8(c) | 2% | 2% | 4% | x | x | 5% | 1.09% | 88.7% |
| Example 8(d) | 2% | 2% | 2% | x | x | 5% | 0.97% | 93.3% |
| Example 8(e) | 1% | 4% | 4% | x | x | 5% | 0.69% | 84% |
| Example 8(f) | 1% | 1% | 4% | x | x | 5% | 0.68% | 90.0% |
| Example 8(g) | 1% | 1% | 1% | x | x | 5% | 0.48% | 96.4% |
| Example 8(h) | 0.5% | 4% | 4% | x | x | 5% | 0.48% | 85.1% |
| Example 8(i) | 0.5% | 0.5% | 4% | x | x | 5% | 0.48% | 90.7% |
| Example 8(j) | 0.5% | 0.5% | 0.5% | x | x | 5% | 0.24% | 98.0% |
| Example 8(k) | 1% | 1% | 4% | x | ○ | 5% | 0.20% | 87.3% |
| Example 8(l) | 1% | 1% | 1% | X | ○ | 5% | 0.11% | 93.8% |

Although various embodiments that are configured to prevent the yellow ring and stray light which could occur at the periphery of the illumination region have been described hereinabove, as a matter of course, these embodiments may be arbitrarily combined.

Hereinafter, still another embodiment of the present invention is described.

[Embodiment where Occurrence of Color Irregularity is Prevented by Selection of Materials for Lenses]

The present inventors found that, in the case where a combination of a convex lens and a meniscus lens is used as described above, if selection of materials for lenses is not appropriate, there is a probability that such a phenomenon occurs that the edge of the illuminated area exhibits a color different from that of the central area (coloring phenomenon).

Hereinafter, embodiments which are configured to prevent such a coloring phenomenon are described.

Embodiment 5-1

A lighting device of the present embodiment has the same configuration as that of the lighting device shown in FIG. 1. That is, as shown in FIG. 1, the lighting device includes a light source (emission section) 1 and an optical lens section 2a provided on the optical axis Ax on the light extraction side, which is at the light extraction side of the light source 1. The lighting device is configured such that light emitted from the light source 1 passes through the optical lens section (first optical lens section) 2a for light illumination.

(Light Source 1)

The light source 1 is formed by LED emitters, each of which is a surface emitter that is capable of surface emission. Note that it is not limited to the LED emitter so long as it is a surface emitter that is capable of surface emission. For example, a remote phosphor configuration may be employed in which the emission section contains a phosphor and the light source and the emission section are separated. Note that the shape of the emission surface of the LED emitters (surface emitters) of the present embodiment is rectangular, and this rectangular area is about 6 mm×6 mm.

(Optical Lens L1)

An optical lens L1 has a diameter which is at least greater than the maximum width of the emission surface of the light source 1. A surface of the optical lens L1 on the light source 1 side has a concave surface shape.

More specifically, the thickness in the direction of the optical axis Ax is 5.0 mm; the diameter of a cross section (maximum) perpendicular to the optical axis Ax is 12.0 mm; the radius of curvature of the light entry surface (concave) is 9.2 mm; and the radius of curvature of the light exit surface (convex) is 6.0 mm.

A preferred material of the optical lens L1 is a resin or glass material which has transparency and/or heat resistance. In the present embodiment, PMMA (polymethyl methacrylate: Abbe number ν=58) is used, although the present invention is not limited to this example. For example, other candidates than PMMA include crown glass which is a lens material of a high Abbe number (e.g., BK7 (Abbe number: 64.7) manufactured by Schott) and olefin resins (e.g., ZEONEX manufactured by Zeon Corporation, ARTON manufactured by JSR Corporation, and APL (Abbe number: about 56) manufactured by Mitsui Chemicals, Inc.). These candidates are more preferred than PMMA because they have both high Abbe numbers and the heat resistance and transparency.

(Optical Lens L2)

The optical lens L2 has a diameter which is at least greater than the maximum diameter of the optical lens L1 that is the first optical lens. The light exit surface side of the optical lens L2 has a convex shape.

More specifically, the thickness in the direction of the optical axis Ax is 10.5 mm; the diameter of a cross section (maximum) perpendicular to the optical axis Ax is 35.0 mm; the light entry surface is a flat surface; the radius of curvature of the light exit surface (convex) is 21 mm; the conic constant of the light exit surface (convex) is −0.28; the 4th order aspheric coefficient is $-5.2\times10^{-7}$; the $6^{th}$ order aspheric coefficient is $-1.9\times10^{-8}$; the $8^{th}$ order aspheric coefficient is $3.5\times10^{-10}$; the $10^{th}$ order aspheric coefficient is $-9.7\times10^{-13}$; the $12^{th}$ order aspheric coefficient is $2.6\times10^{-16}$.

In the present embodiment, the material of the optical lens L2 is PMMA, which is the same as that of the optical lens L1, although the present invention is not limited to this example. For example, other candidates than PMMA include the aforementioned crown glass and olefin resins.

The centers of the white LED package, the first optical lens L1, and the second optical lens L2 are on the optical axis. Meanwhile, the distance along the optical axis between the emission surface of the white LED package and the light entry surface of the first optical lens L1 is 1.5 mm, and the distance along the optical axis between the light exit surface of the first optical lens L1 and the light entry surface of the second optical lens L2 is 2.0 mm.

In that case, the focal lengths of the optical lenses L1, L2 are 23.05 mm and 42.47 mm, respectively, and the effective focal length is 16.14 mm. In a scale where the emission surface of the light source section is at 0 (origin) and the direction of exit of light is the positive (+) direction, the focal positions f1, f2 of the optical lenses L1, L2 and the effective focal position f1+f2 are −15.20 mm, −26.94 mm, and −6.44 mm, respectively. On the other hand, the positions of virtual images formed by the optical lenses L1, L2 (L1 virtual image, L2 virtual image) were deduced by calculation, and as a result, the position of the L1 virtual image was −1.26 mm, and the position of the L2 virtual image was −8.76 mm.

Here, in the lighting device of the present embodiment, it is preferred that each of the optical lenses L1, L2 is made of a material of a relatively high Abbe number (ν=54 or higher).

More specifically, in the present embodiment, PMMA is used as the material of the lenses as described above. In this case, Abbe number ν=(nd−1)/(nF−nC)=58 where nd, nF, and nC are the refractive indices for light at the wavelengths of 587.6 nm, 486.1 nm, and 656.3 nm, respectively.

It is only necessary that the material of each of the optical lenses L1, L2 has transparency as described above, and it is not necessarily colorless and transparent.

Further, as described above, it is preferred that the material of each of the optical lenses L1, L2 has heat resistance. With this feature, deformation of the lenses due to increase in temperature of the environment of each of the optical lenses L1, L2 can be prevented.

Next, the advantages in using lenses of appropriately-selected Abbe numbers as described above are described.

The present inventors newly found that, when in the case of the light source of Patent Document 1 the illuminated surface is made more uniform, such a phenomenon occurs that the edge of the illuminated area has a different color from that of the central portion (coloring phenomenon). In view of such, the present inventors wholeheartedly carried out extensive research concerning the causes of the coloring phenomenon, and it was newly proved that the degree of coloring increases as the material of the lens has a lower Abbe number. This is probably because, qualitatively, the difference in refractive index which is attributed to the difference in wavelength among a plurality of light rays at different wavelengths passing through the lenses increases as the Abbe number decreases.

In view of the above, in the lighting device of the present embodiment, the Abbe numbers of the materials of the optical lenses L1, L2 are not less than 54 (relatively high Abbe number; in the present embodiment, PMMA is used and the Abbe number is 58). Due to this feature, the difference in refractive index which is attributed to the difference in wavelength among a plurality of light rays at different wavelengths passing through the optical lenses L1, L2 that are constituents of the optical lens section 2a decreases. Therefore, the deviation of the plurality of light rays at different wavelengths from one another decreases. Thus, the color shift at the edge portion relative to the central portion of the illuminated area can be decreased.

As described hereinabove, in the present embodiment, such a further effect can be achieved that the color shift of the projected light at the edge portion relative to the central portion of the illuminated area (spot) can be decreased.

(Same Configuration as the Lighting Device Shown in FIG. 2)

The lighting device of the present embodiment may have the same configuration as that of the lighting device shown in FIG. 2. Hereinafter, the advantages in using lenses of appropriately-selected Abbe numbers as described above in this configuration are described.

When also employing the same configuration as that of the lighting device shown in FIG. 2, the Abbe numbers of the materials of the optical lenses L1, L2 are not less than (relatively high Abbe number; in the present embodiment, PMMA is used and the Abbe number is 58). Due to this feature, the difference in refractive index which is attributed to the difference in wavelength among a plurality of light rays at different wavelengths passing through the optical lenses L1, L2 that are constituents of the optical lens section 2a decreases. Therefore, the deviation of the plurality of light rays at different wavelengths from one another decreases. Thus, the color shift at the edge portion relative to the central portion of the illuminated area can be decreased.

Thus, such a further effect can be achieved that the color shift of the projected light at the edge portion relative to the central portion of the illuminated area (spot) can be decreased.

Hereinafter, the relationship between coloring at the edge portion (periphery) of the illuminated area and the behavior of light rays of a lighting device 11a is described with reference to FIG. 53.

FIG. 53(a) is a diagram showing a light ray behavior of the lighting device 11a of the present embodiment. FIG. 53(b) is a diagram showing a light ray behavior of a lighting device (collimation optical system LC2) of a reference example (Sample 2). FIG. 53(c) is a table showing the relationship between the materials of the lens and the refractive index or Abbe number.

Here, the results of traces of rays of red light (wavelength 700 nm; pale solid lines) and blue light (wavelength 435 nm; dark solid lines) emitted from the light source 1 in the lighting device 11a and the lighting device of the reference example are shown.

In the lighting device of the reference example shown in FIG. 53(b), a material of high refractive index (=low Abbe number) is used, and it can be seen that respective rays of red light and blue light largely deviate due to the wavelength dispersibility.

On the other hand, as in the lighting device 11a of the present embodiment shown in FIG. 53(a), when a lens material of high Abbe number is used, the difference in refractive index due to wavelength decreases, and therefore, it can be seen that the deviation of the respective rays of red light and blue light is small.

Next, the optical characteristics of the lighting device 11a of the present embodiment are described based on FIG. 54. FIG. 54(a) shows the illuminance distribution in the lighting device 11a in the case where the projected light includes three types of light, light bulb color light (3000 K), blue light (wavelength: 435 nm), and red light (wavelength: 700 nm). FIG. 54(b) shows the illuminance distribution of the collimation optical system LC2 of the reference example. FIG. 54(c) shows the color chart of the lighting device shown in FIG. 54(a).

As seen from FIGS. 54(a) and 54(c), in the case of the lighting device 11a, the illuminance area is uniform. The difference of the illuminance area between the red light and the blue light is substantially zero even at a position which is 1000 mm ahead. Therefore, the color shift at the edge portion relative to the central portion of the illuminated area (spot) is almost unperceivable.

On the other hand, even in the case where the lens position and the lens shape are the same as those of the lighting device 11a, when a material of a low Abbe number (polycarbonate (PC) for the optical lens L1; Abbe number 30) is used as in the lighting device of the collimation optical system LC2, the areas in which respective light rays of the red light and the blue light have differences (the distances of color shift) are different.

For example, in the lighting device 11a, the distance of the color shift is about 70 mm. On the other hand, in the collimation optical system LC2, the distance of the color shift is about 120 mm, i.e., the area of coloring at the periphery of the illuminated area is larger.

Figure 55:
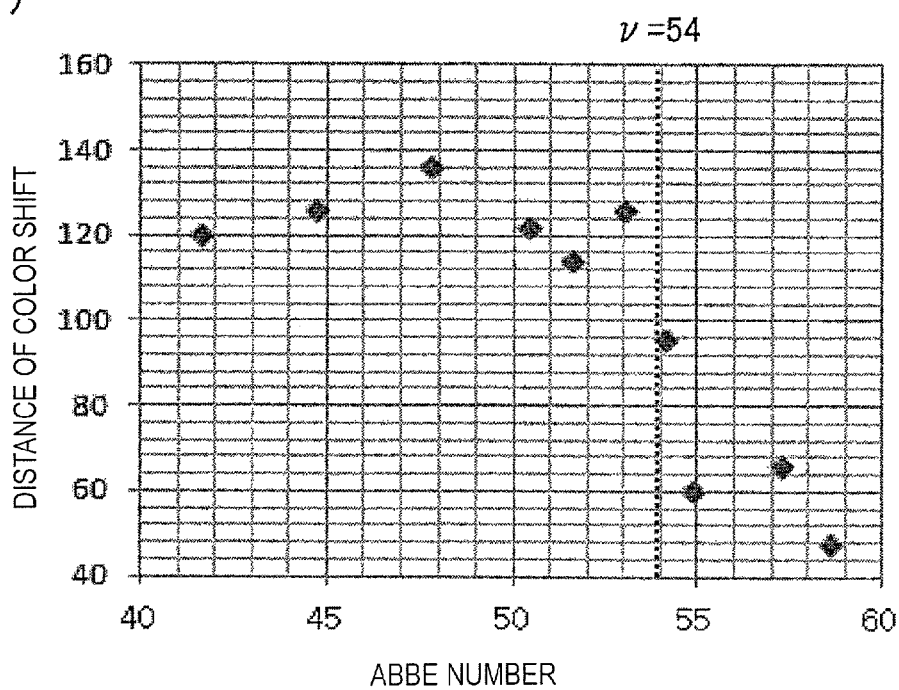
FIG. 55 Charts for illustrating the relationship between the coloring at the edge portion (periphery) of an illuminated area and the Abbe number. (a) is a table showing the relationship between the materials of the lens and the refractive index and Abbe number. (b) is a graph showing the relationship between the Abbe number and the distance of a color shift at the edge portion (periphery) of the illuminated area.

Next, the relationship (critical significance) between the coloring at the edge portion (periphery) of the illuminated area and the Abbe number is described based on FIG. 55.

FIG. 55(a) is a table showing the relationship between the materials of the lens and the refractive index and Abbe number. FIG. 55(b) is a graph showing the relationship between the Abbe number and the distance of a color shift at the edge portion (periphery) of the illuminated area.

For the purpose of verifying an effect which is attributed to the difference in Abbe number, the present inventors evaluated the relationship between the Abbe number and the distance of the color shift at the edge portion (periphery) of the illuminated area for each of the materials shown in the table of FIG. 55(a).

As a result, as seen from the graph of FIG. 55(b), it was found that the distance of the color shift starts to sharply vary at around Abbe number 54.

In this graph, when the Abbe number is less than 54, the distance of the color shift is not less than about 112 mm or not less than about 120 mm. On the other hand, when the Abbe number is not less than 54, the distance of the color shift is not more than 96 mm or not more than about 68 mm.

Note that higher Abbe numbers do not always bring about greater effects. In the case of a material whose Abbe number is very high (e.g., FCD glass (Abbe number 82) manufactured by HOYA CORPORATION), the improvement effect converges (not shown). Thus, the Abbe number is preferably not less than 54 and not more than 82, more preferably not less than 56 and not more than 65.

Embodiment 5-2

Figure 56:
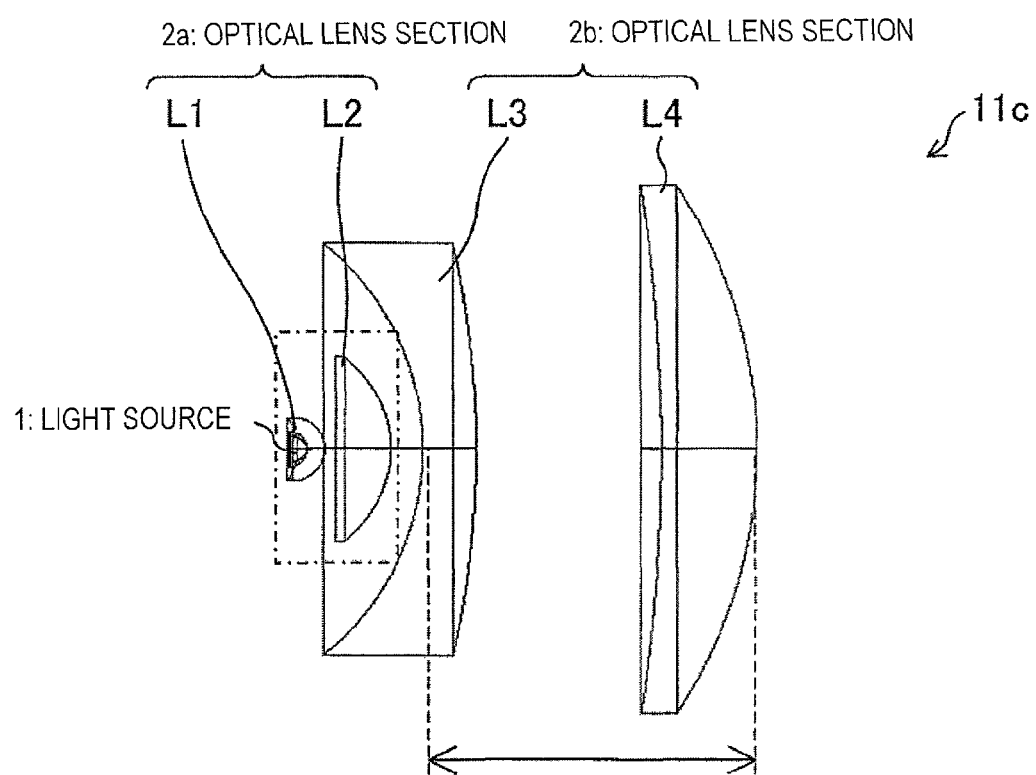
FIG. 56 A general configuration diagram of a lighting device according to still another embodiment of the present invention.

FIG. 56 and FIG. 57 are diagrams showing general configurations of a lighting device 11c according to the present embodiment.

(Configurations of Lighting Device 11c) . . . FIGS. 56 and 57

The lighting device 11c is different from the above-described lighting devices 11a, 11b in that an optical lens section 2b is further provided on the light exit side of the optical lens section 2a in addition to the optical lens section 2a. The optical lens section 2b is formed by two optical lenses L3, L4 which are light projection angle adjustment lenses.

The optical lens section 2a is the same as that described above. Therefore, the optical lens section 2b is described in the following section.

(Optical Lens Section 2b)

The optical lens section 2b is formed by two optical lenses L3, L4 and is configured such that the optical lens L3 and the optical lens L4 are arranged in this order from a side closer to the light exit side of the optical lens section 2a. Note that the optical lenses L3, L4 are arranged such that the centers of these lenses are on the optical axis Ax.

(Optical Lens L3)

The optical lens L3 has a diameter that is at least greater than the diameter of a cross section (maximum) of the optical lens L2 which is perpendicular to the optical axis Ax. A surface of the optical lens L3 on the optical lens L2 side has a concave shape.

More specifically, the thickness in the direction of the optical axis Ax is 10 mm; the diameter of a cross section (maximum) perpendicular to the optical axis Ax is 50 mm; the radius of curvature of the light entry surface (concave) is 78 mm; and the radius of curvature of the light exit surface (convex) is 180 mm.

The optical lens L3 is preferably made of a material of a high Abbe number as are the optical lenses L1, L2. In the present embodiment, PMMA is used, although the present invention is not limited to this example. For example, other candidates than PMMA include the aforementioned crown glass and olefin resins.

The distance between the optical lenses L2, L3 is variable within a range which does not interfere with the optical lenses L2, L4. As shown in FIGS. 57(a) and 57(b), by varying this distance, the light projection angle can be changed to a wider or narrower angle.

FIG. 57(a) shows an arrangement of the lenses in the case where the light projection angle of the projected light is a narrow angle. FIG. 57(b) shows an arrangement of the lenses in the case where the light projection angle of the projected light is a wide angle.

(Optical Lens L4)

The optical lens L4 has a diameter that is at least greater than the maximum diameter of the optical lens L3 that is the first optical lens. A surface of the optical lens L4 on the light exit surface side has a convex shape.

More specifically, the thickness in the direction of the optical axis Ax is 18 mm; the diameter of a cross section (maximum) perpendicular to the optical axis Ax is 100 mm; the radius of curvature of the light entry surface (concave) is 330 mm; and the radius of curvature of the light exit surface (convex) is 90 mm.

In the present embodiment, the optical lens L4 is made of PMMA as is the optical lens L1, although the present invention is not limited to this example. For example, other candidates than PMMA include the aforementioned crown glass and olefin resins.

The distance between the optical lenses L2 and L4 shown in FIG. 56 is about 50 mm.

(Effects of the Lighting Device 11c)

According to the lighting device 11c, it is possible to utilize almost all of light emitted from the emission section so that high light utilization efficiency is achieved, while light emitted from different locations of the emission section can be projected onto generally equal illumination regions so that the uniformity of the illumination region can be significantly improved. And, the projected light can be changed to have a wide or narrow angle while reducing the color shift of the projected light at the edge portion relative to the central portion of the illuminated area (spot).

Next, the optical characteristics of the lighting device 11c are described based on FIG. 58 and FIG. 59.

FIG. 58(a) shows the illuminance distribution in a narrow angle lens configuration in the case where the projected light includes three types of light, light bulb color light (3000 K), blue light (wavelength: 435 nm), and red light (wavelength: 700 nm). FIG. 58(b) shows a color chart. FIG. 59(a) shows the illuminance distribution in a wide angle lens configuration in the case where the projected light includes three types of light, light bulb color light, blue light, and red light. FIG. 59(b) shows a color chart.

As seen from these charts, in the case of the lighting device 11c, the illuminance area is uniform. The difference of the illuminance area between the red light and the blue light is substantially zero even at a position which is 1000 mm ahead. Therefore, the color shift at the edge portion relative to the central portion of the illuminated area (spot) is almost unperceivable.

Embodiment 5-3

Still another embodiment of the present invention is described in the following section. In the example described below, two optical lenses of the optical lens section 2 are integrated together.

Figure 60:
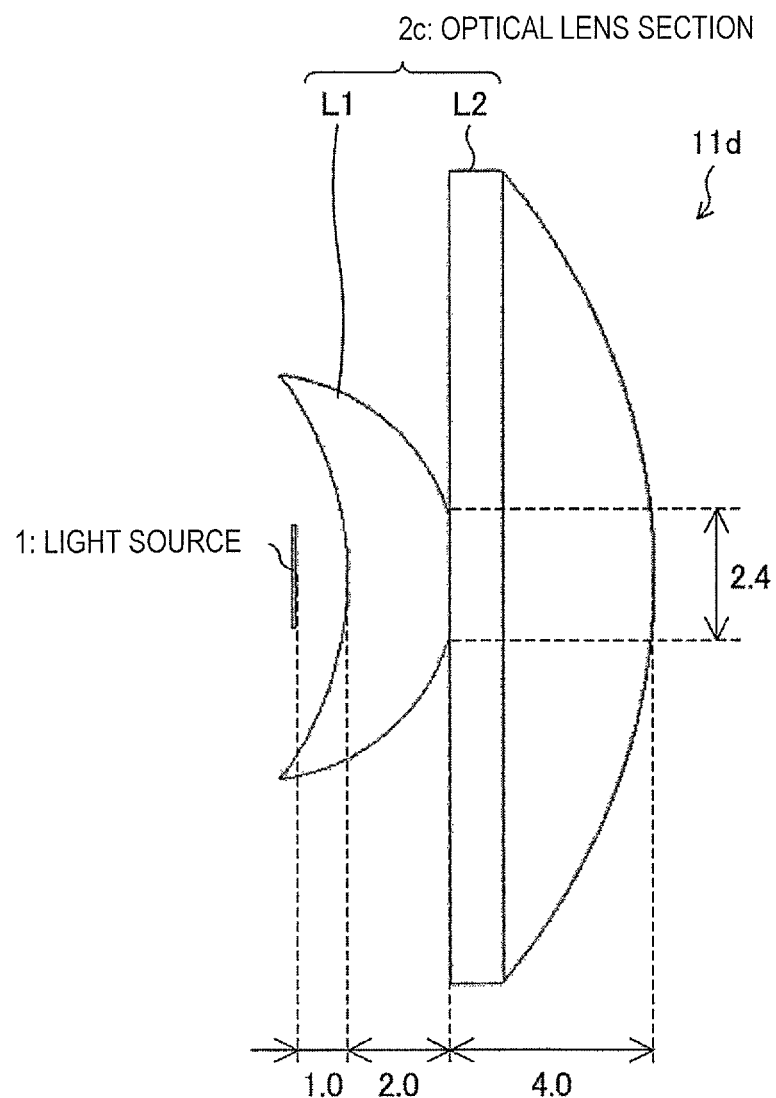
FIG. 60 A general configuration diagram of a lighting device according to still another embodiment of the present invention.
Figure 62:
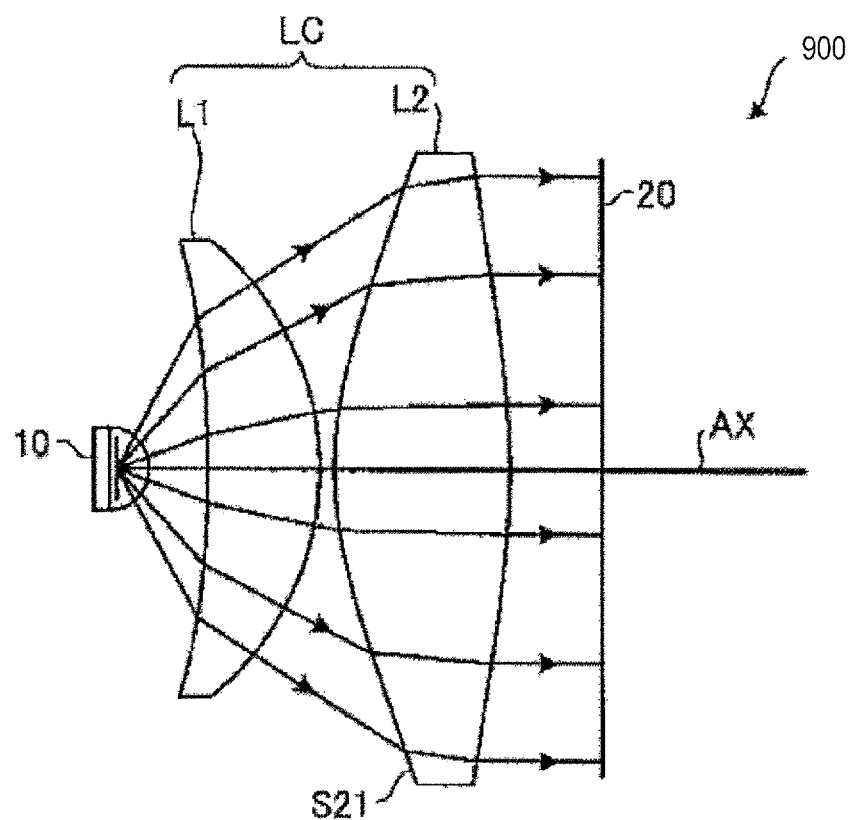
FIG. 62 A cross-sectional view showing a conventional lighting device.

(Configuration of Lighting Device) . . . FIG. 60

FIG. 60 is a diagram showing a general configuration of a lighting device 11d according to the present embodiment.

As shown in FIG. 60, the lighting device 11d includes a light source 1 (emission section) and an optical lens section 2c in which two optical lenses L1, L2 are integrated together.

(Light Source 1)

The light source 1 is formed by LED emitters, each of which is a surface emitter that is capable of surface emission. Note that it is not limited to the LED emitter so long as it is a surface emitter that is capable of surface emission. For example, a configuration may be employed in which the emission section contains a phosphor and the light source and the emission section are separated. Note that the shape of the emission surface of the LED emitters (surface emitters) of the present embodiment is generally circular, and the diameter of this surface is 2 mmφ.

(Optical Lens Section 2c)

Light outgoing in a direction perpendicular to the emission surface of the light source 1 is generally perpendicularly incident upon the respective air interfaces of the optical lens L2. Therefore, even when portions at about the centers of the optical lenses L1, L2 are in contact with each other or joined together as shown in FIG. 60, uniformity of the illumination region is realized without a large effect on the light exit angle distribution.

(Optical Lens L1)

The optical lens L1 has a diameter which is at least greater than the maximum width of the emission surface of the light source 1. A surface of the optical lens L1 on the light source 1 side has a concave surface shape.

More specifically, the thickness in the direction of the optical axis Ax is 2.0 mm; the diameter of a cross section (maximum) perpendicular to the optical axis Ax is 8.0 mm; the radius of curvature of the light entry surface (concave) is 6.6 mm; and the radius of curvature of the light exit surface (convex) is 4.0 mm.

In the present embodiment, the material of the optical lens L1 is PMMA, which is the same as that used in the above-described embodiments, although the present invention is not limited to this example. For example, other candidates than PMMA include the aforementioned crown glass and olefin resins.

(Optical Lens L2)

The optical lens L2 has a diameter which is at least greater than the maximum diameter of the optical lens L1 that is the first optical lens. The light exit surface side of the optical lens L2 has a convex shape.

More specifically, the thickness in the direction of the optical axis Ax is 4.0 mm; the diameter of a cross section (maximum) perpendicular to the optical axis Ax is 16 mm; the light entry surface is a flat surface; the radius of curvature of the light exit surface (convex) is 12 mm; and the conic constant of the light exit surface (convex) is −0.20.

In the present embodiment, the optical lens L2 is made of PMMA as is the optical lens L1, although the present invention is not limited to this example. For example, other candidates than PMMA include the aforementioned crown glass and olefin resins.

(Manufacturing Method)

The lighting device 11d shown in FIG. 60 is an example where the optical lenses L1, L2 are formed by integration molding, or the optical lenses L1, L2 are joined together, whereby the optical lens section 2c is realized.

(1) Integration Molding: Specifically, the optical lenses L1, L2 are formed by integration molding with a die using a resin such as an acrylic material (in the present embodiment, PMMA of Abbe number 58), whereby the optical lens section 2c is realized.

(2) Joining: On the other hand, a lens which is closer to the emission surface of the light source 1 (optical lens L1) and a lens which is distant from the emission surface (optical lens L2) are separately molded, and the lenses are adhered together at their central portions, whereby the optical lens section 2c is realized.

More specifically, the manufacturing method of the lighting device 11d includes the following steps:

(a) Lens production step: A plurality of optical lenses are separately produced using a transparent material whose Abbe number is not less than 54.

(b) Joining step: The plurality of optical lenses produced at the lens production step (a) are joined together with optical axis adjustment such that the focal positions of the respective optical lenses that are constituents of the optical lens section 2c are on a side opposite to a surface facing on the emission section relative to corresponding virtual images formed by the respective optical lenses.

In the present embodiment, as an example of the "joining", two optical lenses are integrated together by adhesion using an adhesive agent, although the present invention is not limited to this example. Other examples of the "joining" include welding and compression bonding.

Next, the optical characteristics of the lighting device 11d are described based on FIG. 61. FIG. 61(a) shows the illuminance distribution in the case where the projected light includes three types of light, light bulb color light (3000 K), blue light (wavelength: 435 nm), and red light (wavelength: 700 nm). FIG. 61(b) shows a color chart.

As seen from these charts, the illuminance area is uniform. Further, the difference of the illuminance area between the red light and the blue light is substantially zero even at a position which is 1000 mm ahead. Therefore, the color shift at the edge portion relative to the central portion is almost unperceivable.

As described hereinabove, the lighting device of the present embodiment is a lighting device in which an optical lens section formed by a plurality of optical lenses is provided on a light extraction side of an emission section, wherein the optical lens section may be configured such that the focal positions of the respective optical lenses are on a side opposite to a surface facing on the emission section relative to corresponding virtual images formed by the respective optical lenses, and the Abbe number of the material of each of the plurality of optical lenses is not less than 54.

The lighting device manufacturing method of the present embodiment is a method for manufacturing a lighting device in which an optical lens section formed by a plurality of optical lenses is provided on a light extraction side of an emission section. The method may include a lens production step of producing the plurality of optical lenses using a transparent material whose Abbe number is not less than 54, and a lens joining step of joining together the plurality of optical lenses produced in the lens production step with optical axis adjustment such that the focal positions of the respective optical lenses that are constituents of the optical lens section are on a side opposite to a surface facing on the emission section relative to corresponding virtual images formed by the respective optical lenses.

According to the above-described configuration and method, the virtual images formed by the respective lenses can occur at positions near the emission section.

As such, light emitted from the center of the emission section which is on the optical axis of the optical lens section and light emitted from a location away from the center of the emission section can outgo from the optical lens section with generally equal angular distributions. Therefore, both the light emitted from the center of the emission section and the light emitted from a location away from the center of the emission section can equally illuminate the entirety of a predetermined illumination region. Thus, the uniformity of the illumination region can be significantly improved.

Furthermore, since the light emitted from the center of the emission section and the light emitted from a location away from the center of the emission section can outgo from the optical lens section with generally equal angular distributions, substantially no part of the light fails to reach the optical lens section, and as a result, high light utilization efficiency can be achieved.

As described above, the present inventors newly found that, when in the case of the light source of Patent Document 1 the illuminated surface is made more uniform, such a phenomenon occurs that the edge of the illuminated area has a different color from that of the central portion (coloring phenomenon). In view of such, the present inventors wholeheartedly carried out extensive research concerning the causes of the coloring phenomenon, and it was newly proved that the degree of coloring increases as the material of the lens has a lower Abbe number. This is probably because, qualitatively, the difference in refractive index which is attributed to the difference in wavelength among a plurality of light rays at different wavelengths passing through the lenses increases as the Abbe number decreases.

In view of the above, in the above-described configuration and method, the Abbe numbers of the materials of the plurality of optical lenses are not less than 54 (relatively high Abbe number). Due to this feature, the difference in refractive index which is attributed to the difference in wavelength among a plurality of light rays at different wavelengths passing through the plurality of optical lenses that are constituents of the optical lens section decreases. Therefore, the deviation of the plurality of light rays at different wavelengths from one another decreases. Thus, the color shift at the edge portion relative to the central portion of the illuminated area can be decreased.

Thus, it is possible to utilize almost all of light emitted from the emission section so that high light utilization efficiency is achieved, while light emitted from different locations of the emission section can be projected onto generally equal illumination regions so that the uniformity of the illumination region can be significantly improved, and the color shift at the edge portion relative to the central portion of the spot of the projected light can be decreased.

In the lighting device of the present embodiment where a lens section formed by a plurality of optical lenses is provided on a light projection surface side of an emission section, an effective focal position determined by totalizing the focal points of the respective optical lenses that are constituents of the optical lens section may be present on a side opposite to surfaces of all the virtual images facing on the light emission section relative to the respective virtual images formed by the optical lenses.

Furthermore, according to the above-described configuration, since an effective focal position determined by totalizing the focal points of the respective optical lenses that are constituents of the optical lens section is present on a side opposite to surfaces of all the virtual images facing on the light emission section relative to the respective virtual images formed by the optical lenses, the virtual images formed by the respective lenses can occur at positions which are still closer to the light emission section. Therefore, the angle of the light outgoing from the optical lens section can be expanded, and thus, the uniformity of a wider illumination region can be significantly improved.

Furthermore, the above-described configuration also enables the virtual image formed by each lens to occur at a position near the light emission section. Therefore, it is possible to utilize almost all of the light emitted from the light emission section, and high light utilization efficiency is achieved, while light emitted from different locations of the light emission section can be projected onto generally equal illumination regions, so that the uniformity of the illumination region can be significantly improved. With the above-described configuration also, the difference in refractive index which is attributed to the difference in wavelength among a plurality of light rays at different wavelengths passing through the plurality of optical lenses that are constituents of the optical lens section decreases. Therefore, the deviation of the plurality of light rays at different wavelengths from one another decreases. Thus, the color shift at the edge portion relative to the central portion of the illuminated area can be decreased.

The material of each of the plurality of optical lenses may be a material which has heat resistance.

In the above configuration, deformation of the plurality of lenses due to increase in temperature of the environment of each of the optical lenses can be prevented.

In the lighting device of the present embodiment, where the above-described optical lens section is the first optical lens section, the second optical lens section may be provided on the light exit side of the first optical lens section.

According to the above-described configuration, the light exit angle of the light outgoing from the first optical lens section can be changed by the second optical lens section. That is, the light exit angle of the light outgoing from the first optical lens section can be narrowed or expanded by changing the optical characteristics of the second optical lens section.

Thus, the area of the light illumination region can be freely changed by controlling the design of the second optical lens section.

In the lighting device of the present embodiment, the above-described second optical lens section may be configured such that a lens which is the closest to the first optical lens section is a concave lens, and a lens which is the second closest to the first optical lens section is a convex lens.

Such a combination of a concave lens and a convex lens enables correction of the aberrations occurring in the respective lenses, and therefore, the characteristics of light outgoing from the first optical lens section can be kept undamaged.

Thus, the light exit angle of the light outgoing from the first optical lens section is adjustable, and it is possible to utilize almost all of the light emitted from the light emission section so that high light utilization efficiency is achieved. Meanwhile, light emitted from different locations of the light emission section can be projected onto generally equal illumination regions, so that the uniformity of the illumination region can be significantly improved.

According to the lighting device of the present embodiment, in the above-described optical lens section, part of the respective lens interfaces may be integrally formed.

Since part of the respective lenses that are constituents of the optical lens section is thus integrally formed, alignment of the emission surface of the light emission section and the optical lens section can be easily achieved.

Further, fixing of the light emission section and the optical lens section can also be easily achieved.

Possible methods of forming an integral structure of two lenses include integral molding with the use of a resin and adhesion with the use of an adhesive agent.

In the lighting device of the present embodiment, the above-described two lenses may be formed of a resin by integral molding.

In this case, since the two lenses are formed of a resin by integral molding, the molding cycles in formation of the optical lens section can be reduced from two cycles (in the case of two lenses) to one cycle. Accordingly, the manufacturing cost can be reduced.

In the lighting device of the present embodiment, of the lenses that are constituents of the above-described optical lens section, in the first optical lens where a lens surface which is the closest to the light emission section is a concave surface which is concaved against the light emission section, $h \leq 2\sqrt{(d(2R-d))}$ may be satisfied where d is the distance from the emission surface of the light emission section to the interface of the first optical lens on the optical axis, R is the radius of curvature of the inner lens of the first optical lens, and h is the arrangement range on the optical axis of the light emission section.

Thus, by placing the light emission section within the above-described arrangement range h, all of the light emitted from the light emission section is brought into the first optical lens, so that the light utilization efficiency can be improved.

In the lighting device of the present embodiment, $a < f/2$ may be satisfied where a is the distance from the center of the optical lens section to the emission surface of the light emission section and f is the distance from the center of the optical lens section to the focal position.

By thus making the distance a from the center of the optical lens section to the emission surface of the light emission section shorter than a half of the distance f from the center of the optical lens section to the focal position, the virtual image position can always be relatively close to the optical lens section as compared with the focal position of the optical lens section.

In the lighting device of the present embodiment, the above-described light emission section may include a plurality of light emitters.

In this case, the plurality of light emitters are arranged over the emission surface of the light emission section. Even when the light emitters emit varying amounts of light, the light is projected such that these variations are canceled at the illuminated surface. That is, light emitted from respective ones of the light emitters are projected onto the same illumination region, and therefore, even when the light emitters emit varying amounts of light, this variation is canceled.

The present invention is not limited to the above-described embodiments but can be variously modified within the scope of the claims. An embodiment which is realized by an appropriate combination of technical features disclosed in different embodiments falls within the technical scope of the present invention.

INDUSTRIAL APPLICABILITY

A lighting device according to an embodiment of the present invention is applicable to a wide variety of lighting products, including lighting devices which are configured to illuminate only a narrow area, such as spotlights, light projectors, or the like, lighting devices which are configured to uniformly illuminate a somewhat large area, such as streetlights, reading lights, indoor indirect lighting devices, vehicle interior roof lights, or the like, vehicle headlights which are configured to emit a larger amount of light, etc. Also, the lighting device can be suitably used as a spotlight which is capable of forming a non-circular illumination region for use in stage lighting devices.

The emission wavelength of the light source is not limited to visible light. The light source can be used for light sources for use in infrared sensors which use infrared light, spot exposure lamps and sterilization lamps which use ultraviolet light, etc.

REFERENCE SIGNS LIST 1 light source (light emission section)
2 optical lens section
3 optical lens
4 optical lens
5 opening section
11 lighting device
12 lighting device
13a lighting device
13b lighting device
22 optical lens section
23 optical lens section
AX optical axis
L1 optical lens (first lens)
L2 optical lens (second lens)
f1 first focal position
f2 second focal position
F1 focal point of first lens
F2 focal point of second lens

The invention claimed is:
1. A lighting device, comprising:
a surface light source having a light exit surface;
a first lens having a first focal point, the first lens being provided on the light exit surface side of the surface light source; and
a second lens having a second focal point, the second lens being provided on a light exit surface side of the first lens,
the surface light source, the first lens, and the second lens being configured such that a first virtual image is formed by the first lens and a second virtual image is formed by the second lens,
wherein the first virtual image is formed between the second focal point and the first lens, the second focal point is on a side opposite to the surface light source relative to a position which is distant from a principal point of the second lens by a predetermined focal length f', and the predetermined focal length f' satisfies $$l' = (D/(\epsilon+D)) \cdot f'$$

where l' is the distance between the principal point of the second lens and a position of the first virtual image, D is an effective diameter of the second lens, and ϵ is a light source size factor which is either one of a size of the light exit surface of the surface light source or an arrangement pitch of a plurality of light-emitting elements included in the surface light source.

2. The lighting device of claim 1, wherein the first virtual image formed by the first lens is closer to the surface light source than is the focal point of the second lens.

3. The lighting device of claim 2, wherein the first virtual image is formed between the first focal point and the first lens, and the second virtual image is formed between the second focal point and the second lens.

4. The lighting device of claim 3, wherein the first virtual image and the second virtual image are formed between an effective focal point of the first lens and the second lens and the first lens.

5. The lighting device of claim 1, further comprising a second optical system provided on a light exit side of a first optical system that includes the first lens and the second lens.

6. The lighting device of claim 5, wherein the second optical system includes a concave lens which is the closest to the first optical system and a convex lens which is next to the concave lens and is the second closest to the first optical system.

7. The lighting device of claim 1, wherein the light exit surface of the first lens and a light entry surface of the second lens are joined together.

8. The lighting device of claim 7, wherein the first lens and the second lens are formed of a resin by integral molding.

9. The lighting device of claim 1, wherein a lens surface of the first lens facing on the surface light source is a concave curved surface, and a width h of a range of a position at which the light exit surface can be placed is represented by the following formula:

$$h \leq 2\sqrt{V(d(2R-d))}$$

where d is a distance along an optical axis from the light exit surface of the surface light source to the concave curved surface of the first lens, and R is a radius of curvature of the concave curved surface of the first lens.

10. The lighting device of claim 1, wherein a<f/2 is satisfied where a is a distance from a principal point of an optical lens section including the first lens and the second lens to the light exit surface, and f is a distance from the principal point to a focal position of the optical lens section.

11. The lighting device of claim 1, wherein the surface light source includes a plurality of light-emitting elements which are arranged so as to be separated from one another.

12. The lighting device of claim 1, wherein the first lens and the second lens are made of a material which has heat resistance.

13. The lighting device of claim 1, wherein at least one of the first lens and the second lens is an achromatic lens.

14. The lighting device of claim 13, wherein the achromatic lens is formed by a concave lens and a convex lens which is in close contact with the concave lens, and a joint interface at central portions of the concave lens and the convex lens is a flat face.

15. The lighting device of claim 1, wherein the surface light source includes a plurality of light-emitting elements which are arranged at pitch P and a phosphor which is arranged so as to overlap the plurality of light-emitting elements, and A≤P is satisfied where A is a distance between an edge of the phosphor and one of the light-emitting elements which is closest to the edge of the phosphor.

16. The lighting device of claim 1, further comprising a hood which is provided on a light exit side of the second lens so as to block only part of light outgoing from the second lens.

17. The lighting device of claim 16, wherein a distance Lf1+Lf2 along an optical axis from a position of an emission surface of the surface light source to an end of the hood satisfies:

$$Rf/\tan\theta2 < Lf1+Lf2 < Rf/\tan\theta1$$

where θ1 is a smallest one of angles at which a gradient of an angle-relative illuminance graph is smaller than −0.1, θ2 is a light exit angle at which a stray light ratio is not more than 1%, the stray light ratio being represented by a luminous flux of a stray light region/(a luminous flux of an illumination region+the luminous flux of the stray light region), and Rf is a radius of the hood.

18. The lighting device of claim 1, wherein an antireflection layer is provided on at least one of a light exit surface and a light entry surface of the first lens and a light exit surface and a light entry surface of the second lens.

19. The lighting device of claim 1, further comprising a casing which has a storage space for containing the surface light source, the first lens, and the second lens, wherein a light absorbing layer is provided on at least part of a portion of the casing which defines an outside of the storage space.

20. The lighting device of claim 1, wherein the first focal point is closer to the surface light source than is the second focal point.

* * * * *